(12) United States Patent
Wright et al.

(10) Patent No.: US 8,966,398 B2
(45) Date of Patent: Feb. 24, 2015

(54) SYSTEM AND METHOD FOR VISUALIZING CONNECTED TEMPORAL AND SPATIAL INFORMATION AS AN INTEGRATED VISUAL REPRESENTATION ON A USER INTERFACE

(75) Inventors: William Wright, Toronto (CA); Thomas Kapler, Toronto (CA)

(73) Assignee: Oculus Info Inc., Toronto (CA)

( * ) Notice: Subject to any disclaimer, the term of this patent is extended or adjusted under 35 U.S.C. 154(b) by 1441 days.

(21) Appl. No.: 12/629,774

(22) Filed: Dec. 2, 2009

(65) Prior Publication Data

US 2010/0185984 A1 Jul. 22, 2010

Related U.S. Application Data

(60) Provisional application No. 61/193,495, filed on Dec. 3, 2008.

(51) Int. Cl.
*G06F 3/048* (2013.01)
*G06T 11/20* (2006.01)
*G06F 17/30* (2006.01)

(52) U.S. Cl.
CPC .......... *G06T 11/206* (2013.01); *G06F 17/3087* (2013.01); *G06F 17/30241* (2013.01)
USPC .......................................... 715/833; 715/736

(58) Field of Classification Search
CPC ....................... G06F 14/30241; G06F 14/3087
USPC .................... 715/833, 736; 701/300
See application file for complete search history.

(56) References Cited

U.S. PATENT DOCUMENTS 7,138,916 B2 * 11/2006 Schwartz et al. .......... 340/572.1

2004/0249565 A1 * 12/2004 Park ............................. 701/200
2006/0106469 A1 * 5/2006 Huang et al. .................. 700/51
2006/0146048 A1 * 7/2006 Wright et al. ................ 345/419

(Continued)

OTHER PUBLICATIONS

Asakura et al; Tracking survey for individual ttravel bahaviour using mobile comminication instruments; Asakura et al., © 2004; Elsevier Ltd; 19 pages.*

Doherty et al; Moving Beyond Observed Outcomes Intergrating Global Positioning Systems and Interactive Computer-Based Travel Behavior Surveys; © 2001; In Transportation research Circular; pp. 449-466.*

(Continued)

*Primary Examiner* — Linh K Pham
(74) *Attorney, Agent, or Firm* — Occhiuti & Rohlicek LLP

(57) ABSTRACT

A system and method for configuring the presentation of a plurality of presentation elements in a visual representation on a user interface, the presentation elements having both temporal and spatial parameters, the method comprising the steps of: defining a time bar with a time scale having time indicators as subdivisions of the time scale and having a first global temporal limit and a second temporal global limit of the time scale for defining a temporal domain of the presentation elements, defining a focus range of the time bar such that the focus range has a first local temporal limit and a second local temporal limit wherein the first local temporal limit is greater than or equal to the first global temporal limit and the second local temporal limit is less than or equal to the second global temporal limit; defining a focus bar having a focus time scale having focus time indicators as subdivisions of the focus time scale and having the first and second local temporal limits as the extents of the focus time scale, such that the focus time scale is an expansion of the time scale; and displaying a set of presentation elements selected from the plurality of presentation elements based on the respective temporal parameter of each of the set of presentation elements is within the first and second local temporal limits.

18 Claims, 73 Drawing Sheets

(56) References Cited

U.S. PATENT DOCUMENTS

| | | | |
|---|---|---|---|
| 2006/0238538 A1* | 10/2006 | Kapler et al. | 345/440 |
| 2007/0244783 A1* | 10/2007 | Wright et al. | 705/35 |
| 2009/0005987 A1* | 1/2009 | Vengroff et al. | 701/300 |
| 2009/0172511 A1* | 7/2009 | Decherd et al. | 715/207 |
| 2009/0210793 A1* | 8/2009 | Yee et al. | 715/723 |

OTHER PUBLICATIONS

Doherty et al_2004; It is possible to automatically Ttrace Activity Scheduling Decisions?; © 2004; in Goulias, L. Transportation System Planning; 29 pages.*

* cited by examiner

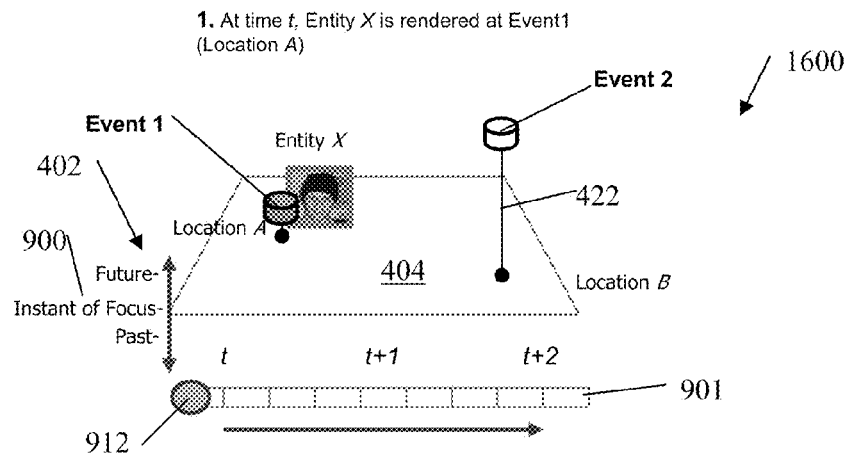
1. At time *t*, Entity *X* is rendered at Event1 (Location *A*)
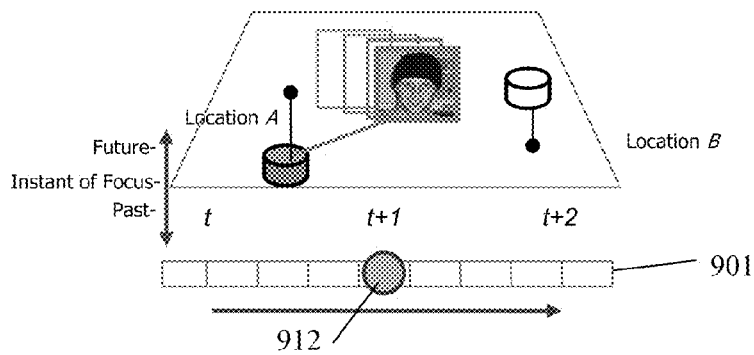
2. At time *t+1*, Entity *X* is shown moving between known locations (Event1 and Event2)
Figure 16
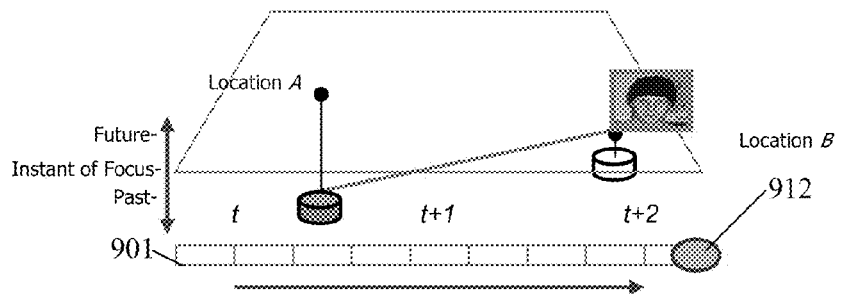
3. At time *t+2*, Entity *X* is rendered at Event2 (Location *B*)

736

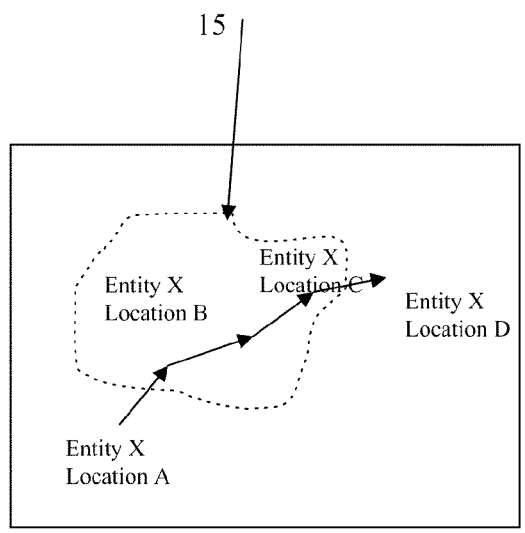
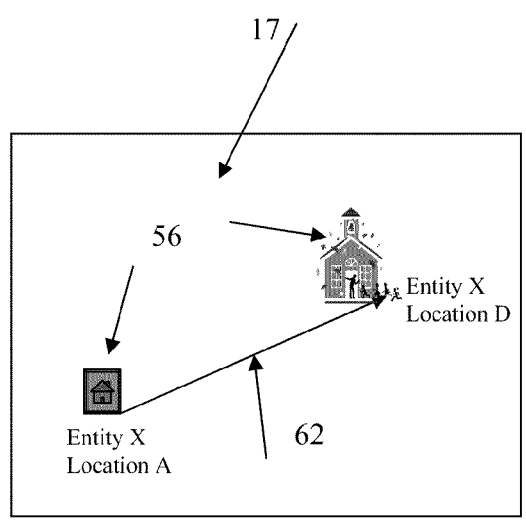
Figure 37a
Figure 37b

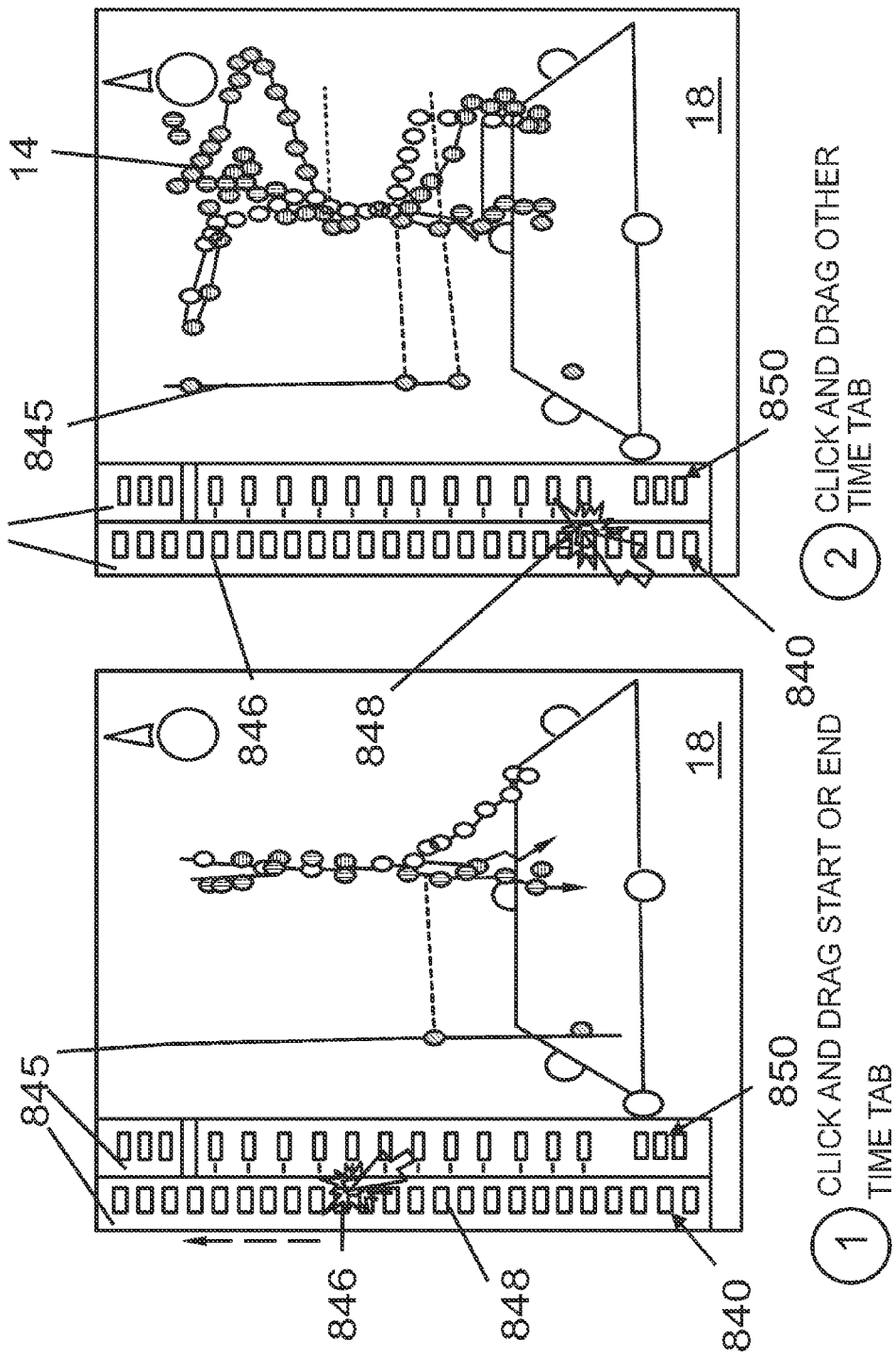

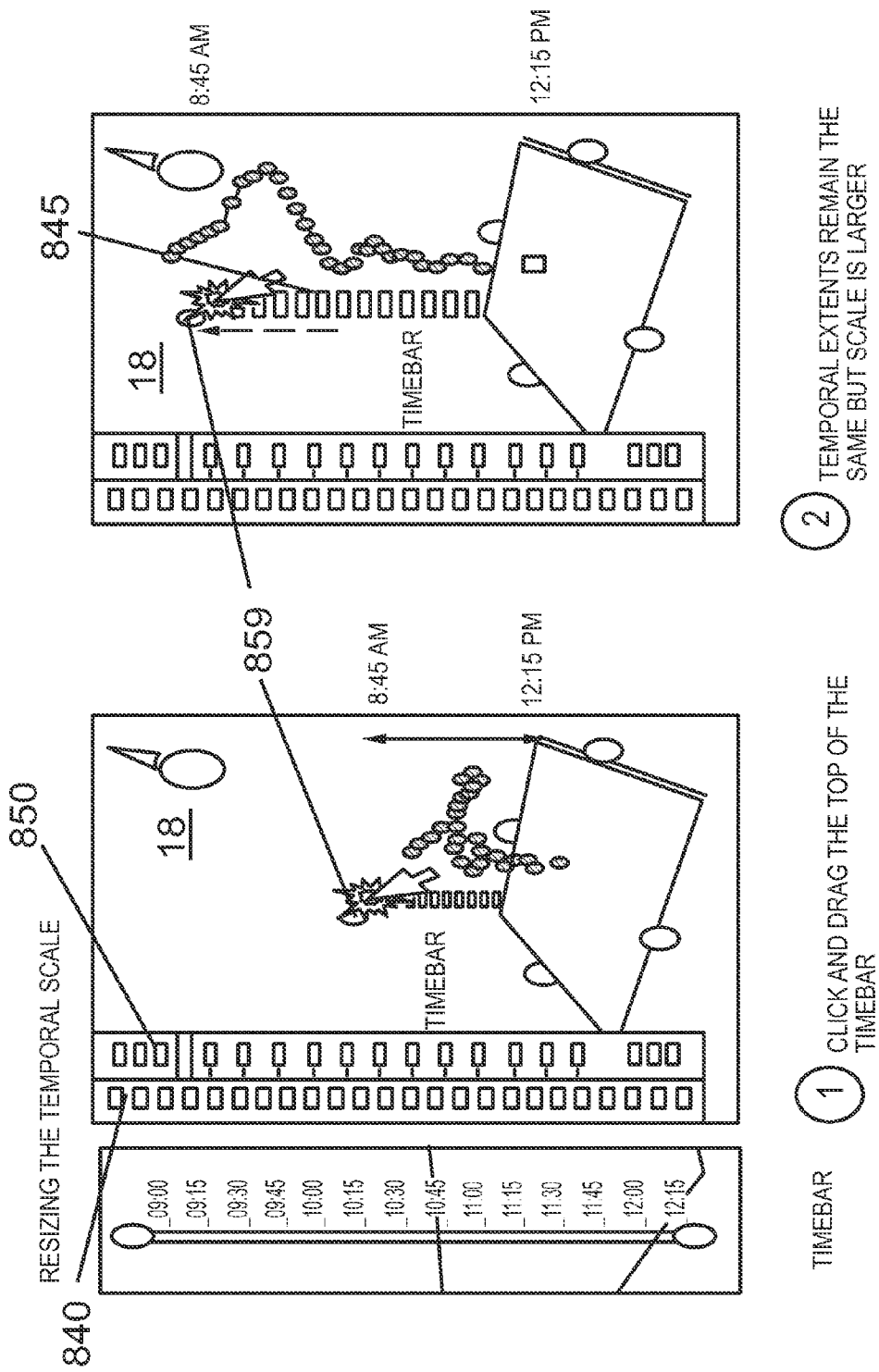

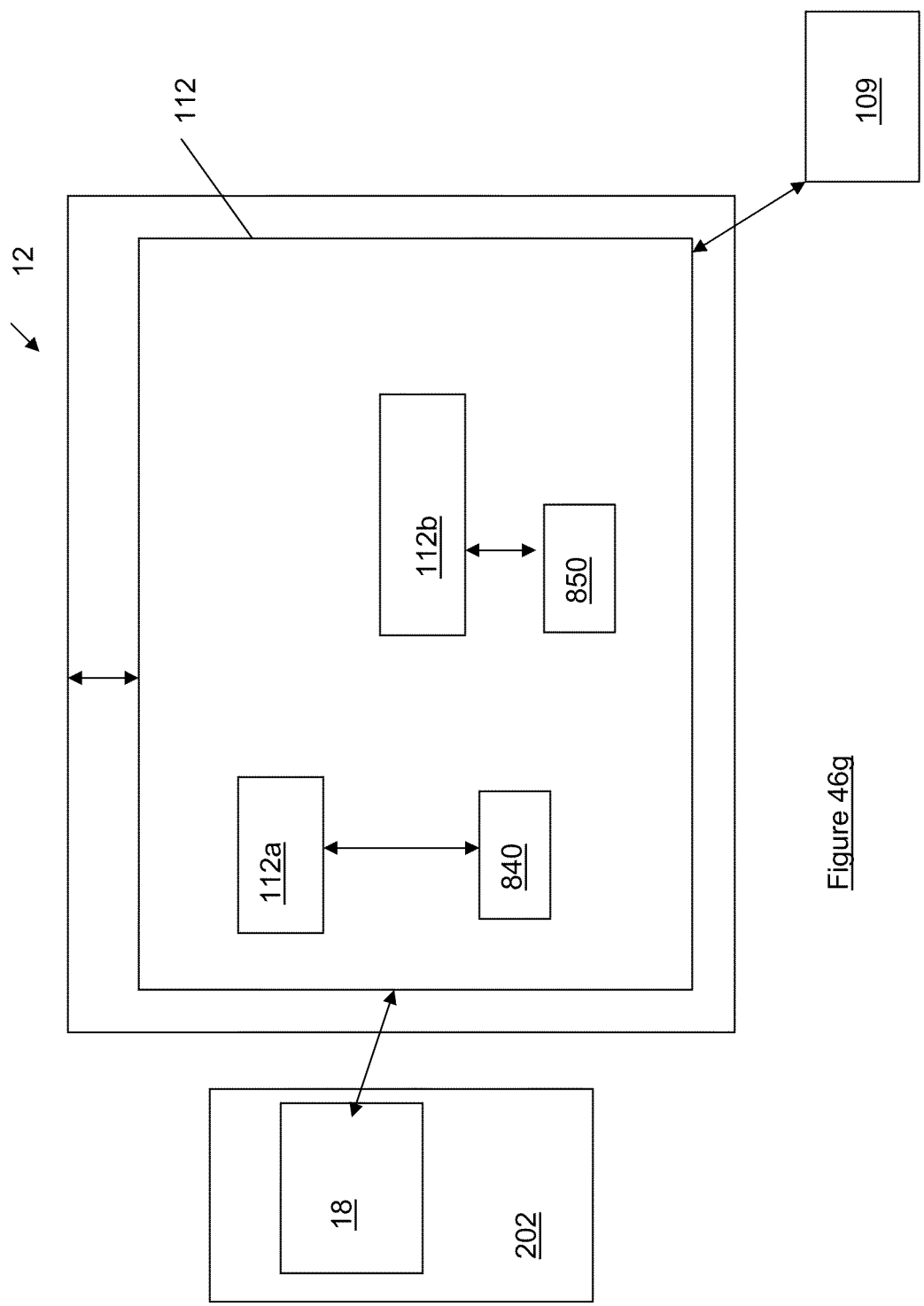

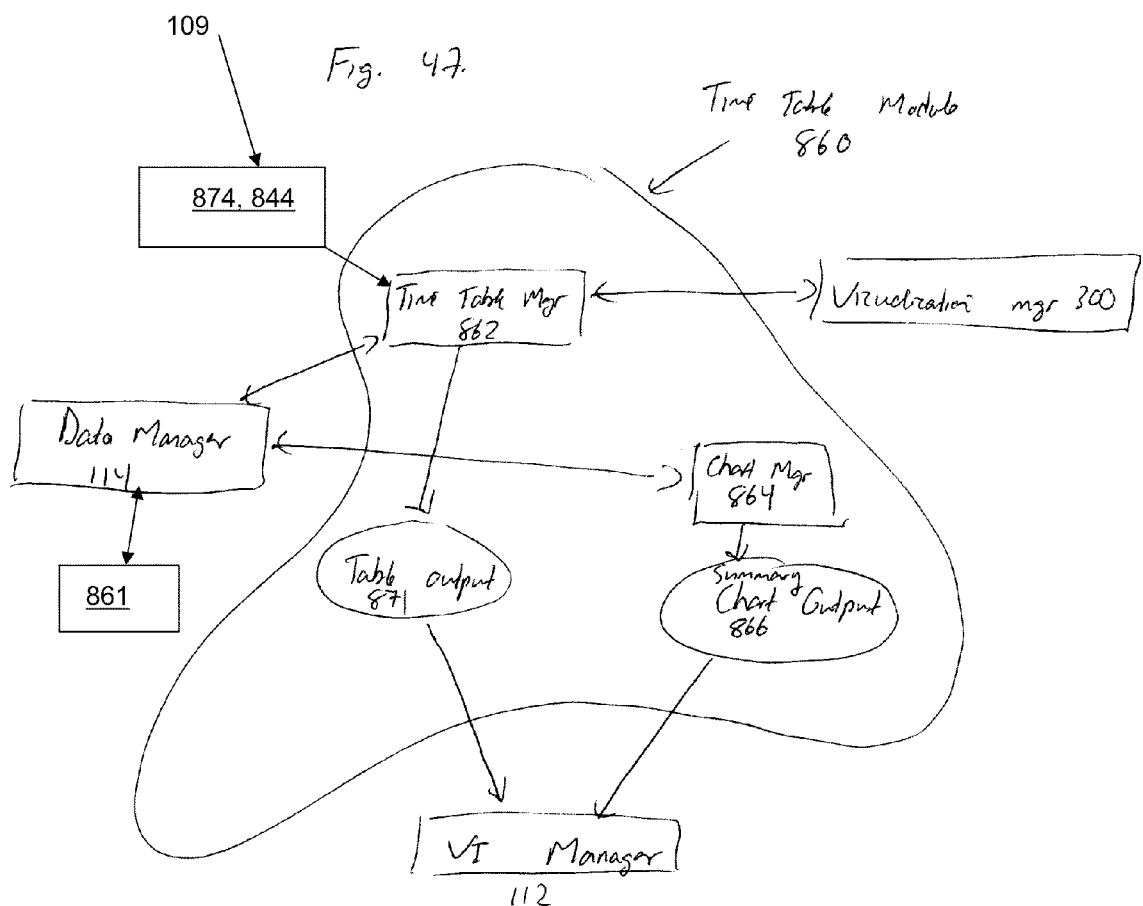

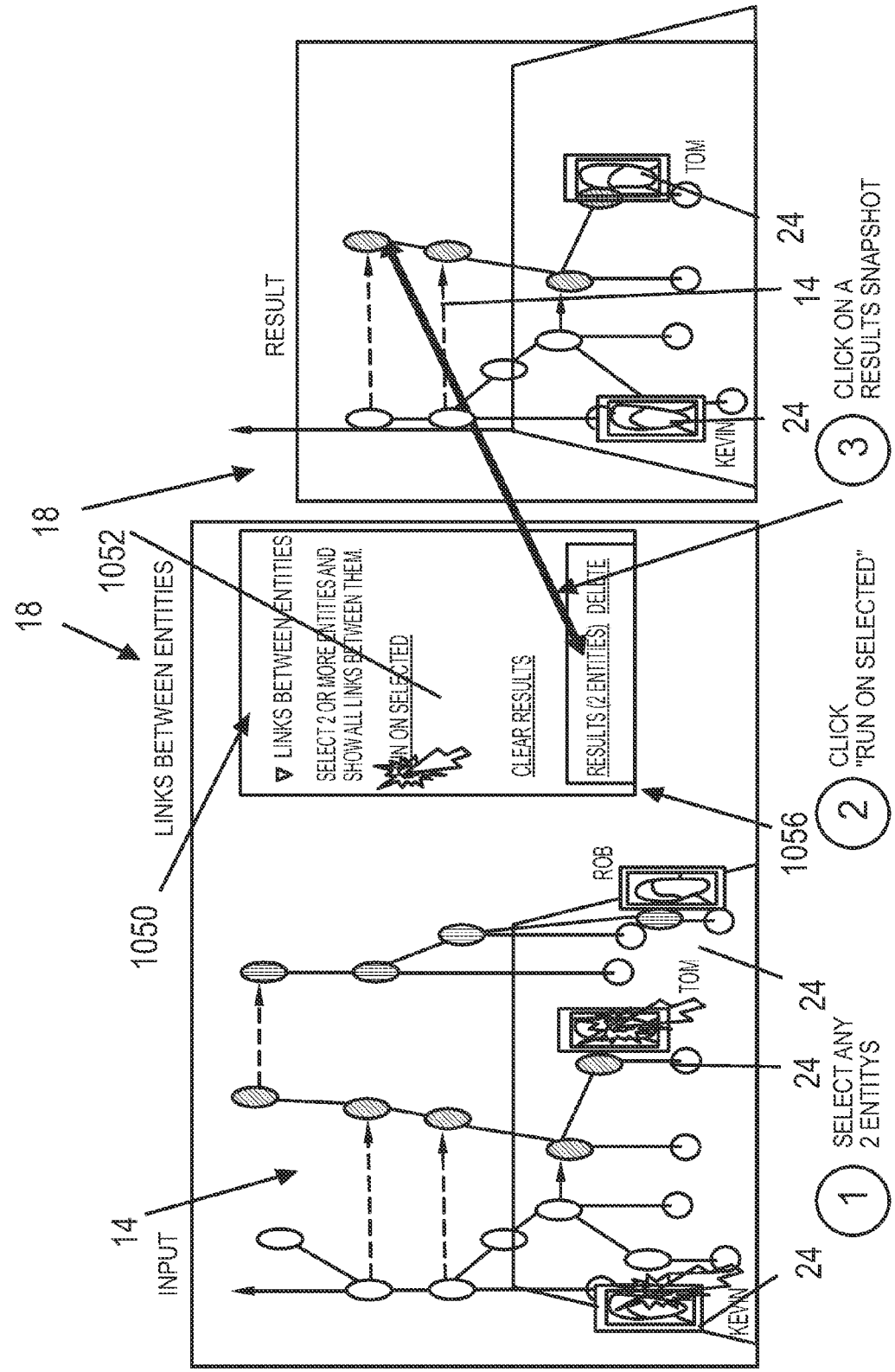

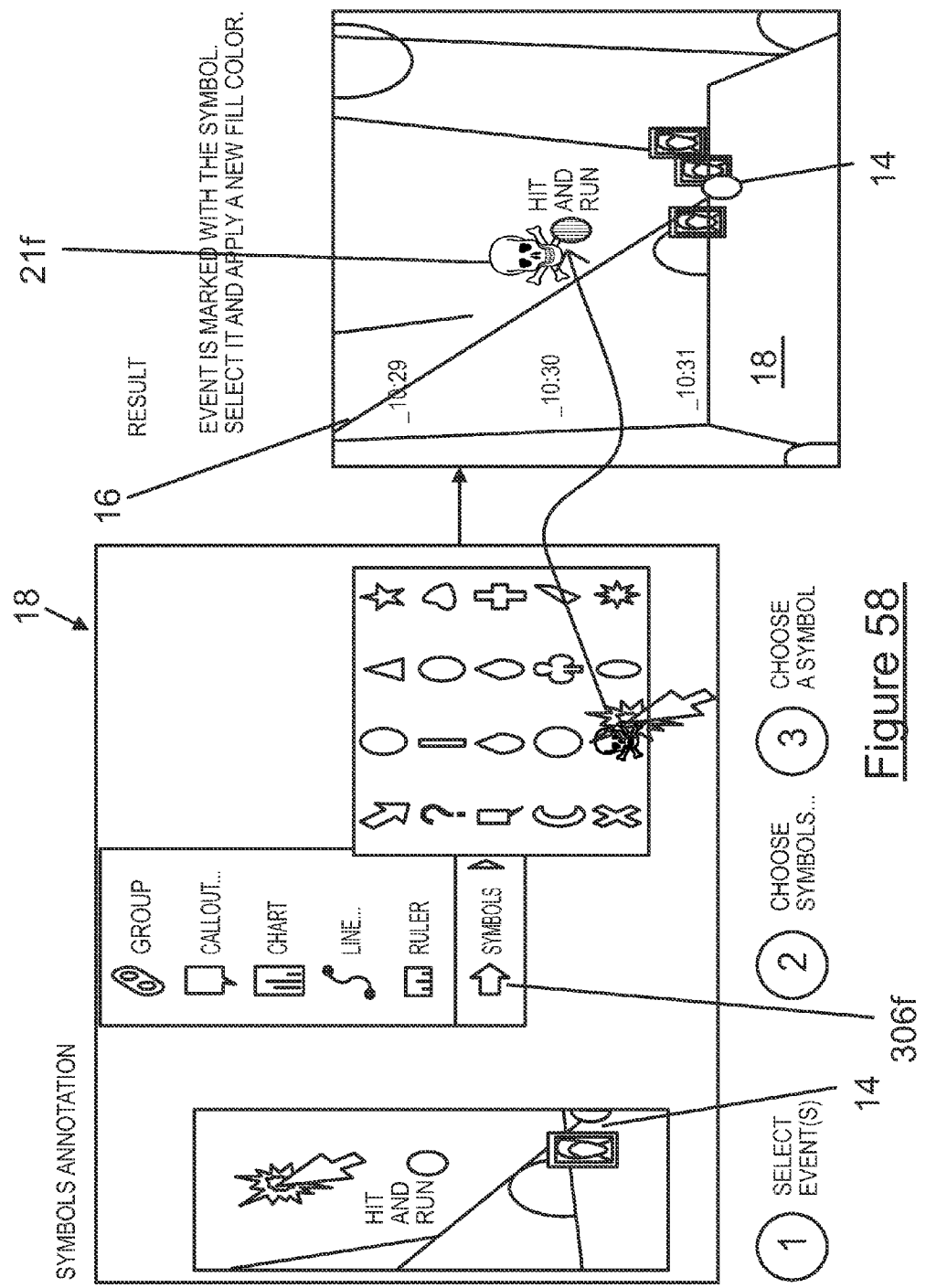

SYSTEM AND METHOD FOR VISUALIZING CONNECTED TEMPORAL AND SPATIAL INFORMATION AS AN INTEGRATED VISUAL REPRESENTATION ON A USER INTERFACE

CROSS-REFERENCE TO RELATED APPLICATION PARAGRAPH

This application claims the benefit of Canadian Patent Application No. 2,646,117, filed Dec. 2, 2008 and claims the benefit of U.S. Provisional Application No. 61/193,495, filed on Dec. 3, 2008. The contents of both applications are incorporated herein in their entirety by reference.

BACKGROUND OF THE INVENTION

The present invention relates to an interactive visual presentation of multidimensional data on a user interface.

Tracking and analyzing entities and streams of events, has traditionally been the domain of investigators, whether that be national intelligence analysts, police services or military intelligence. Business users also analyze events in time and location to better understand phenomenon such as customer behavior or transportation patterns. As data about events and objects become more commonly available, analyzing and understanding of interrelated temporal and spatial information is increasingly a concern for military commanders, intelligence analysts and business analysts. Localized cultures, characters, organizations and their behaviors play an important part in planning and mission execution. In situations of asymmetric warfare and peacekeeping, tracking relatively small and seemingly unconnected events over time becomes a means for tracking enemy behavior. For business applications, tracking of production process characteristics can be a means for improving plant operations. A generalized method to capture and visualize this information over time for use by business and military applications, among others, is needed.

Many visualization techniques and products for analyzing complex event interactions only display information along a single dimension, typically one of time, geography or a network connectivity diagram. Each of these types of visualizations is common and well understood. For example a Time-focused scheduling chart such as Microsoft (MS) Project displays various project events over the single dimension of time, and a Geographic Information System (GIS) product, such as MS MapPoint, or ESRI ArcView, is good for showing events in the single dimension of locations on a map. There are also link analysis tools, such as Netmap (www.netmapanalytics.com) or Visual Analytics (www.visualanalytics.com) that display events as a network diagram, or graph, of objects and connections between objects. Some of these systems are capable of using animation to display another dimension, typically time. Time is played back, or scrolled, and the related spatial image display changes to reflect the state of information at a moment in time. However this technique relies on limited human short term memory to track and then retain temporal changes and patterns in the spatial domain. Another visualization technique called "small multiples" uses repeated frames of a condition or chart, each capturing an increment moment in time, much like looking at sequence of frames from a film laid side by side. Each image must be interpreted separately, and side-by-side comparisons made, to detect differences. This technique is expensive in terms of visual space since an image must be generated for each moment of interest, which can be problematic when trying to simultaneously display multiple images of adequate size that contain complex data content.

A technique has been developed, as described in Interactive Visualization of Spatiotemporal Patterns using Spirals on a Geographical Map—by Hewagamage et al. that uses spiral shaped ribbons as timelines to show isolated sequences of events that have occurred at discrete locations on a geographical map. This technique is limited because it uses spiral timelines exclusively to show the periodic quality of certain types of events, while does not show connectivity between the temporal and spatial information of data objects at multi-locations within the spatial domain. Further, event data objects placed on the spirals can suffer from occlusion, thereby providing for only a limited number of events and locations viewable with the spiral timelines.

Further, the ability for current visualization systems to sort efficiently (i.e. selective visual display of elements) using temporal properties of the presentation elements is lacking

SUMMARY

It is an object of the present invention to provide a system and method for the interactive visual representation of a plurality of presentation objects with spatial and temporal properties to obviate or mitigate at least some of the above-mentioned disadvantages.

A first aspect provided is a method for configuring the presentation of a plurality of presentation elements in a visual representation on a user interface, the presentation elements having both temporal and spatial parameters, the method comprising the steps of: defining a time bar with a time scale having time indicators as subdivisions of the time scale and having a first global temporal limit and a second temporal global limit of the time scale for defining a temporal domain of the presentation elements, defining a focus range of the time bar such that the focus range has a first local temporal limit and a second local temporal limit wherein the first local temporal limit is greater than or equal to the first global temporal limit and the second local temporal limit is less than or equal to the second global temporal limit; defining a focus bar having a focus time scale having focus time indicators as subdivisions of the focus time scale and having the first and second local temporal limits as the extents of the focus time scale, such that the focus time scale is an expansion of the time scale; and displaying a set of presentation elements selected from the plurality of presentation elements based on the respective temporal parameter of each of the set of presentation elements is within the first and second local temporal limits.

A second aspect provided is a system for configuring the presentation of a plurality of presentation elements in a visual representation on a user interface, the presentation elements having both temporal and spatial parameters, the system comprising: a time module configured for defining a time bar with a time scale having time indicators as subdivisions of the time scale and having a first global temporal limit and a second temporal global limit of the time scale for defining a temporal domain of the presentation elements, and for defining a focus range of the time bar such that the focus range has a first local temporal limit and a second local temporal limit wherein the first local temporal limit is greater than or equal to the first global temporal limit and the second local temporal limit is less than or equal to the second global temporal limit; a focus module configured for defining a focus bar having a focus time scale having focus time indicators as subdivisions of the focus time scale and having the first and second local temporal limits as the extents of the focus time scale, such that the focus time scale is an expansion of the time scale; and a visual module configured for displaying a set of presentation elements selected from the plurality of presentation elements based on the respective temporal parameter of each of the set of presentation elements is within the first and second local temporal limits.

BRIEF DESCRIPTION OF THE DRAWINGS

A better understanding of these and other embodiments of the present invention can be obtained with reference to the following drawings and detailed description of the preferred embodiments, in which:

FIG. 16 shows a further example operation of the tool of FIG. 3;

FIGS. 37a,b show example generation of a story element of a story of FIG. 32;

FIG. 47 shows a further embodiment of the tool of FIG. 3;

FIG. 58 shows an example operation of a symbols annotation of the tool of FIG. 3.

DETAILED DESCRIPTION OF THE PREFERRED EMBODIMENT

The following detailed description of the embodiments of the present invention does not limit the implementation of the invention to any particular computer programming language. The present invention may be implemented in any computer programming language provided that the OS (Operating System) provides the facilities that may support the requirements of the present invention. A preferred embodiment is implemented in the Java computer programming language (or other computer programming languages in conjunction with C/C++). Any limitations presented would be a result of a particular type of operating system, computer programming language, or data processing system and would not be a limitation of the present invention.

Visualization Environment

Figure 1:
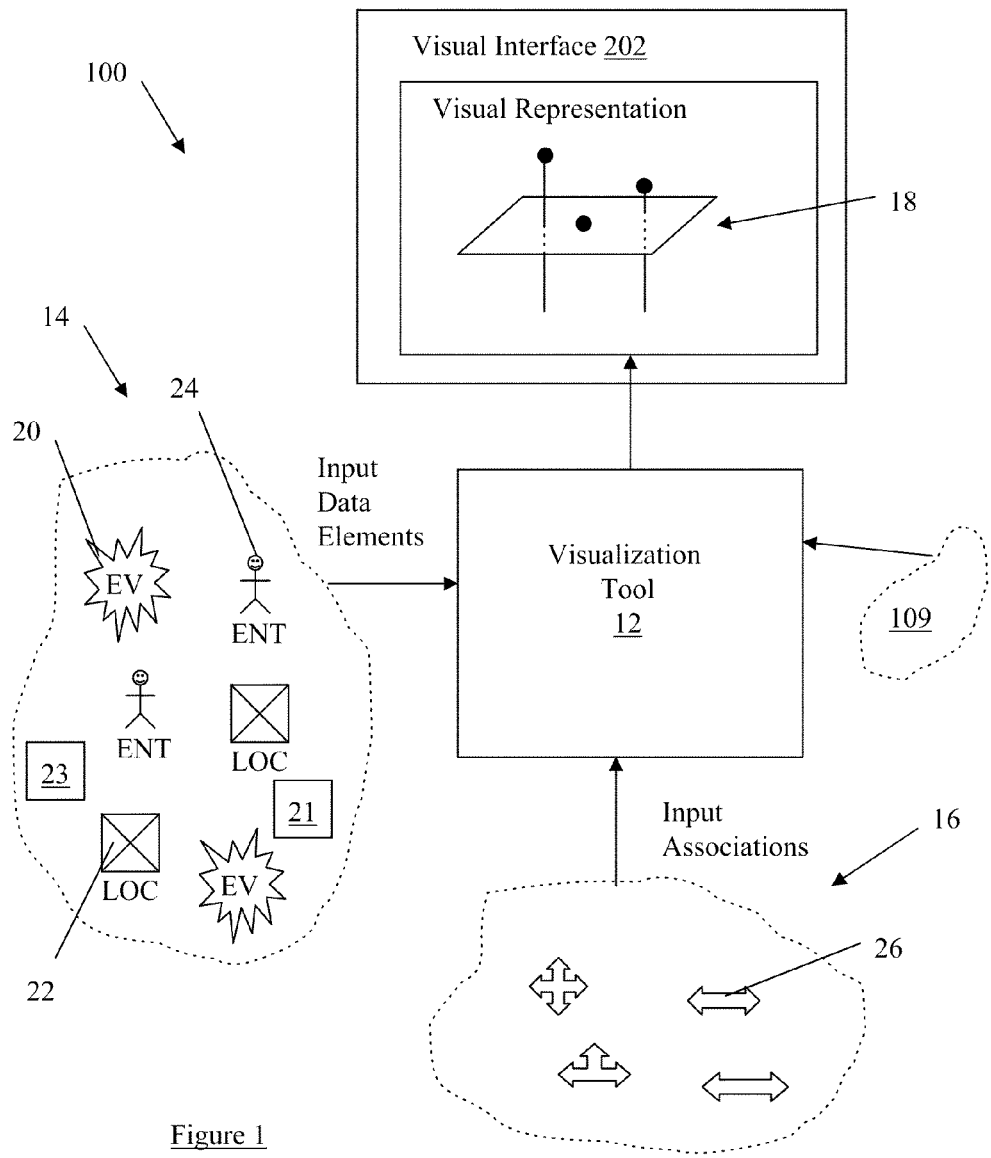
FIG. 1 is a block diagram of a data processing system for a visualization tool.

Referring to FIG. 1, a visualization data processing system 100 includes a visualization tool 12 for processing a collection of data objects 14 as input data elements to a user interface 202. The data objects 14 are combined with a respective set of associations 16 by the tool 12 to generate an interactive visual representation 18 on the visual interface (VI) 202. The data objects 14 include event objects 20, location objects 22, images 23 and entity objects 24, as further described below. The set of associations 16 include individual associations 26 that associate together various subsets of the objects 20, 22, 23, 24, as further described below. Management of the data objects 14 and set of associations 16 are driven by user events 109 of a user (not shown) via the user interface 108 (see FIG. 2) during interaction with the visual representation 18. The representation 18 shows connectivity between temporal and spatial information of data objects 14 at multi-locations within the spatial domain 400 (see FIG. 4).

Data Processing System 100

Figure 2:
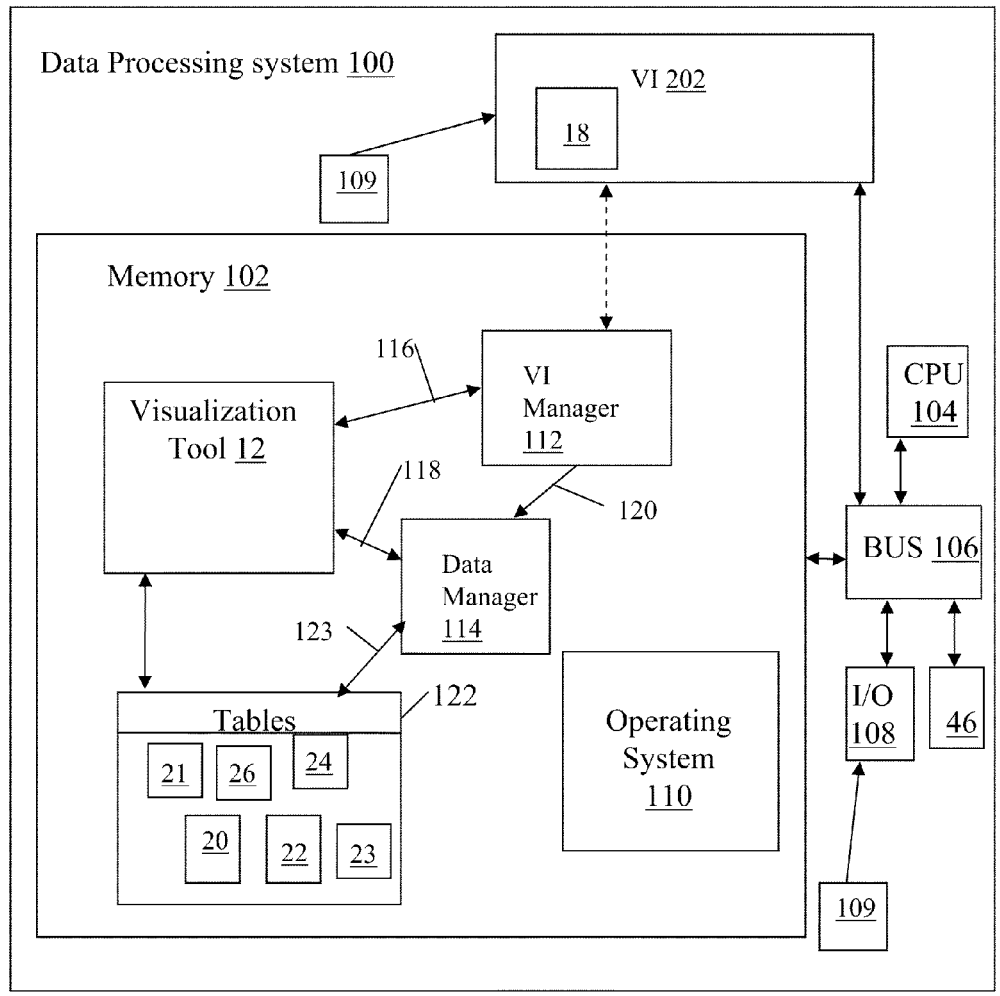
FIG. 2 shows further details of the data processing system of FIG. 1.

Referring to FIG. 2, the data processing system 100 has a user interface 108 for interacting with the tool 12, the user interface 108 being connected to a memory 102 via a BUS 106. The interface 108 is coupled to a processor 104 via the BUS 106, to interact with user events 109 to monitor or otherwise instruct the operation of the tool 12 via an operating system 110. The user interface 108 can include one or more user input devices such as but not limited to a QWERTY keyboard, a keypad, a trackwheel, a stylus, a mouse, and a microphone. The visual interface 202 is considered the user output device, such as but not limited to a computer screen display. If the screen is touch sensitive, then the display can also be used as the user input device as controlled by the processor 104. The operation of the data processing system 100 is facilitated by the device infrastructure including one or more computer processors 104 and can include the memory 102 (e.g. a random access memory). The computer processor(s) 104 facilitates performance of the data processing system 100 configured for the intended task(s) through operation of a network interface, the user interface 202 and other application programs/hardware of the data processing system 100 by executing task related instructions. These task related instructions can be provided by an operating system, and/or software applications located in the memory 102, and/or by operability that is configured into the electronic/digital circuitry of the processor(s) 104 designed to perform the specific task(s).

Further, it is recognized that the data processing system 100 can include a computer readable storage medium 46 coupled to the processor 104 for providing instructions to the processor 104 and/or the tool 12. The computer readable medium 46 can include hardware and/or software such as, by way of example only, magnetic disks, magnetic tape, optically readable medium such as CD/DVD ROMS, and memory cards. In each case, the computer readable medium 46 may take the form of a small disk, floppy diskette, cassette, hard disk drive, solid-state memory card, or RAM provided in the memory 102. It should be noted that the above listed example computer readable mediums 46 can be used either alone or in combination.

Referring again to FIG. 2, the tool 12 interacts via link 116 with a VI manager 112 (also known as a visualization renderer) of the system 100 for presenting the visual representation 18 on the visual interface 202. The tool 12 also interacts via link 118 with a data manager 114 of the system 100 to coordinate management of the data objects 14 and association set 16 from data files or tables 122 of the memory 102. It is recognized that the objects 14 and association set 16 could be stored in the same or separate tables 122, as desired. The data manager 114 can receive requests for storing, retrieving, amending, or creating the objects 14 and association set 16 via the tool 12 and/or directly via link 120 from the VI manager 112, as driven by the user events 109 and/or independent operation of the tool 12. The data manager 114 manages the objects 14 and association set 16 via link 123 with the tables 122. Accordingly, the tool 12 and managers 112, 114 coordinate the processing of data objects 14, association set 16 and user events 109 with respect to the content of the screen representation 18 displayed in the visual interface 202.

The task related instructions can comprise code and/or machine readable instructions for implementing predetermined functions/operations including those of an operating system, tool 12, or other information processing system, for example, in response to command or input provided by a user of the system 100. The processor 104 (also referred to as module(s) for specific components of the tool 12) as used herein is a configured device and/or set of machine-readable instructions for performing operations as described by example above.

As used herein, the processor/modules in general may comprise any one or combination of, hardware, firmware, and/or software. The processor/modules acts upon information by manipulating, analyzing, modifying, converting or transmitting information for use by an executable procedure or an information device, and/or by routing the information with respect to an output device. The processor/modules may use or comprise the capabilities of a controller or microprocessor, for example. Accordingly, any of the functionality provided by the systems and process of FIGS. 1-45 may be implemented in hardware, software or a combination of both. Accordingly, the use of a processor/modules as a device and/or as a set of machine readable instructions is hereafter referred to generically as a processor/module for sake of simplicity.

It will be understood by a person skilled in the art that the memory 102 storage described herein is the place where data is held in an electromagnetic or optical form for access by a computer processor. In one embodiment, storage means the devices and data connected to the computer through input/output operations such as hard disk and tape systems and other forms of storage not including computer memory and other in-computer storage. In a second embodiment, in a more formal usage, storage is divided into: (1) primary storage, which holds data in memory (sometimes called random access memory or RAM) and other "built-in" devices such as the processor's L1 cache, and (2) secondary storage, which holds data on hard disks, tapes, and other devices requiring input/output operations. Primary storage can be much faster to access than secondary storage because of the proximity of the storage to the processor or because of the nature of the storage devices. On the other hand, secondary storage can hold much more data than primary storage. In addition to RAM, primary storage includes read-only memory (ROM) and L1 and L2 cache memory. In addition to hard disks, secondary storage includes a range of device types and technologies, including diskettes, Zip drives, redundant array of independent disks (RAID) systems, and holographic storage. Devices that hold storage are collectively known as storage media.

A database is a further embodiment of memory 102 as a collection of information that is organized so that it can easily be accessed, managed, and updated. In one view, databases can be classified according to types of content: bibliographic, full-text, numeric, and images. In computing, databases are sometimes classified according to their organizational approach. As well, a relational database is a tabular database in which data is defined so that it can be reorganized and accessed in a number of different ways. A distributed database is one that can be dispersed or replicated among different points in a network. An object-oriented programming database is one that is congruent with the data defined in object classes and subclasses.

Computer databases typically contain aggregations of data records or files, such as sales transactions, product catalogs and inventories, and customer profiles. Typically, a database manager provides users the capabilities of controlling read/write access, specifying report generation, and analyzing usage. Databases and database managers are prevalent in large mainframe systems, but are also present in smaller distributed workstation and mid-range systems such as the AS/400 and on personal computers. SQL (Structured Query Language) is a standard language for making interactive queries from and updating a database such as IBM's DB2, Microsoft's Access, and database products from Oracle, Sybase, and Computer Associates.

Memory is a further embodiment of memory 210 storage as the electronic holding place for instructions and data that the computer's microprocessor can reach quickly. When the computer is in normal operation, its memory usually contains the main parts of the operating system and some or all of the application programs and related data that are being used. Memory is often used as a shorter synonym for random access memory (RAM). This kind of memory is located on one or more microchips that are physically close to the microprocessor in the computer.

Figure 27:
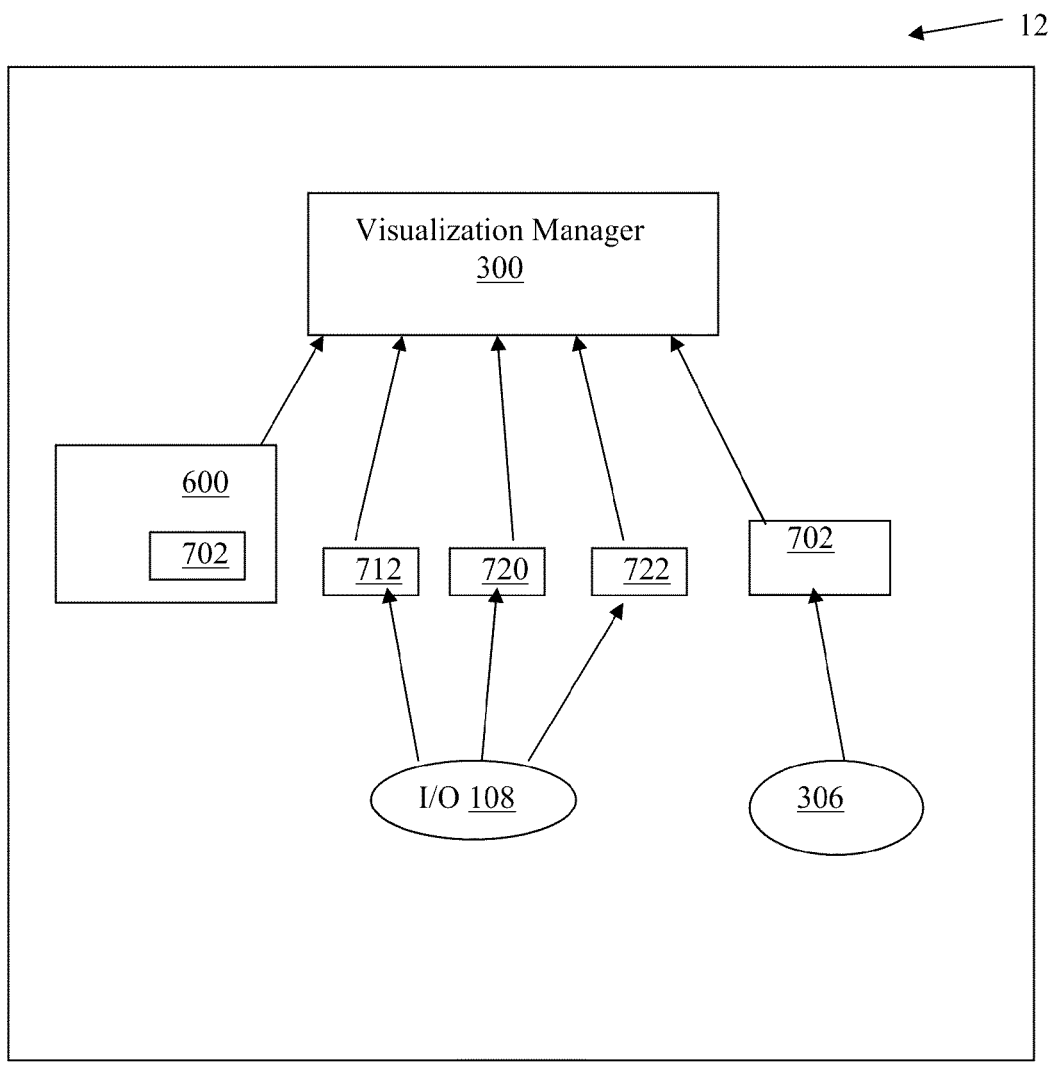
FIG. 27 shows a further embodiment of the tool of FIG. 3.
Figure 29:
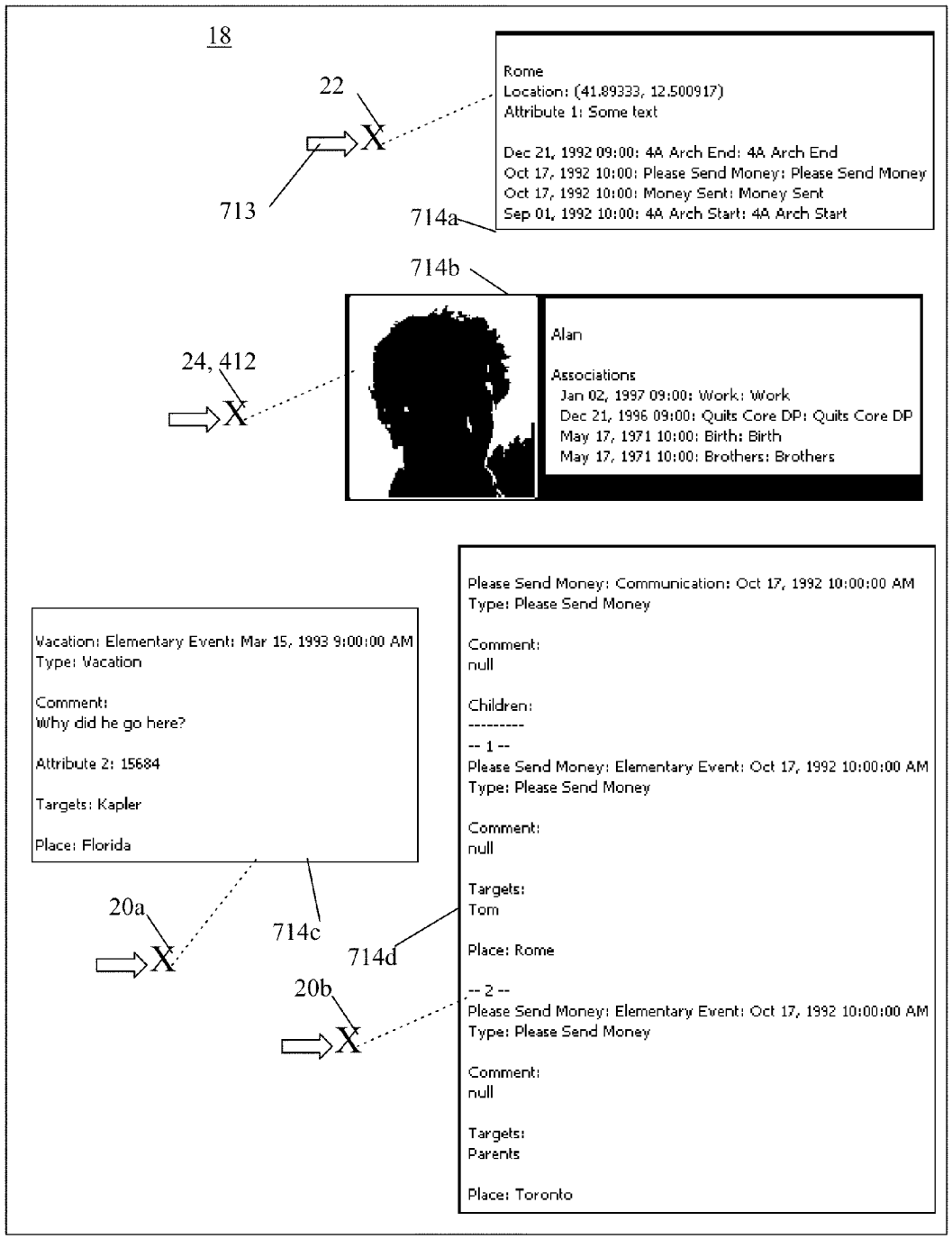
FIG. 29 shows a further example of the visualization representation of FIG. 4.

Referring to FIGS. 27 and 29, the tool 12 can have an information module 712 for generating information 714a,b,c,d for display by the visualization manager 300, in response to user manipulations via the I/O interface 108. For example, when a mouse pointer 713 is held over the visual element 410,412 of the representation 18, some predefined information 714a,b,c,d is displayed about that selected visual element 410,412. The information module 712 is configured to display the type of information dependent upon whether the object is a place 22, target 24, elementary or compound event 20, for example. For example, when the place 22 type is selected, the displayed information 714a is formatted by the information module 712 to include such as but not limited to; Label (e.g. Rome), Attributes attached to the object (if any); and events associated with that place 22. For example, when the target 24/target trail 412 (see FIG. 17) type is selected, the displayed information 714b is formatted by the information module 712 to include such as but not limited to; Label, Attributes (if any), events associated with that target 24, as well as the target's icon (if one is associated with the target 24) is shown. For example, when an elementary event 20a type is selected, the displayed information 714c is formatted by the information module 712 to include such as but not limited to; Label, Class, Date, Type, Comment (including Attributes, if any), associated Targets 24 and Place 22. For example, when a compound event 20b type is selected, the displayed information 714d is formatted by the information module 712 to include such as but not limited to; Label, Class, Date, Type, Comment (including Attributes, if any) and all elementary event popup data for each child event. Accordingly, it is recognized that the information module 712 is configured to select data for display from the database 122 (see FIG. 2) appropriate to the type of visual element 410,412 selected by the user from the visual representation 18.

Tool Information Model

Referring to FIG. 1, a tool information model is composed of the four basic data elements (objects 20, 22, 23, 24 and associations 26) that can have corresponding display elements in the visual representation 18. The four elements are used by the tool 12 to describe interconnected activities and information in time and space as the integrated visual representation 18, as further described below.

Event Data Objects 20

Events are data objects 20 that represent any action that can be described. The following are examples of events;

Bill was at Toms house at 3 pm,

Tom phoned Bill on Thursday,

A tree fell in the forest at 4:13 am, Jun. 3, 1993 and

Tom will move to Spain in the summer of 2004.

The Event is related to a location and a time at which the action took place, as well as several data properties and display properties including such as but not limited to; a short text label, description, location, start-time, end-time, general event type, icon reference, visual layer settings, priority, status, user comment, certainty value, source of information, and default+user-set color. The event data object 20 can also reference files such as images or word documents.

Locations and times may be described with varying precision. For example, event times can be described as "during the week of January $5^{th}$" or "in the month of September". Locations can be described as "Spain" or as "New York" or as a specific latitude and longitude.

Entity Data Objects 24

Entities are data objects 24 that represent any thing related to or involved in an event, including such as but not limited to; people, objects, organizations, equipment, businesses, observers, affiliations etc. Data included as part of the Entity data object 24 can be short text label, description, general entity type, icon reference, visual layer settings, priority, status, user comment, certainty value, source of information, and default+user-set color. The entity data can also reference files such as images or word documents. It is recognized in reference to FIGS. 6 and 7 that the term Entities includes "People", as well as equipment (e.g. vehicles), an entire organization (e.g. corporate entity), currency, and any other object that can be tracked for movement in the spatial domain 400. It is also recognized that the entities 24 could be stationary objects such as but not limited to buildings. Further, entities can be phone numbers and web sites. To be explicit, the entities 24 as given above by example only can be regarded as Actors Location Data Objects 22

Locations are data objects 22 that represent a place within a spatial context/domain, such as a geospatial map, a node in a diagram such as a flowchart, or even a conceptual place such as "Shang-ri-la" or other "locations" that cannot be placed at a specific physical location on a map or other spatial domain. Each Location data object 22 can store such as but not limited to; position coordinates, a label, description, color information, precision information, location type, non-geospatial flag and user comments.

Associations

Event 20, Location 22 and Entity 24 are combined into groups or subsets of the data objects 14 in the memory 102 (see FIG. 2) using associations 26 to describe real-world occurrences. The association is defined as an information object that describes a pairing between 2 data objects 14. For example, in order to show that a particular entity was present when an event occurred, the corresponding association 26 is created to represent that Entity X "was present at" Event A. For example, associations 26 can include such as but not limited to; describing a communication connection between two entities 24, describing a physical movement connection between two locations of an entity 24, and a relationship connection between a pair of entities 24 (e.g. family related and/or organizational related). It is recognised that the associations 26 can describe direct and indirect connections. Other examples can include phone numbers and web sites.

A variation of the association type 26 can be used to define a subclass of the groups 27 to represent user hypotheses. In other words, groups 27 can be created to represent a guess or hypothesis that an event occurred, that it occurred at a certain location or involved certain entities. Currently, the degree of belief/accuracy/evidence reliability can be modeled on a simple 1-2-3 scale and represented graphically with line quality on the visual representation 18.

Image Data Objects 23

Standard icons for data objects 14 as well as small images 23 for such as but not limited to objects 20,22,24 can be used to describe entities such as people, organizations and objects. Icons are also used to describe activities. These can be standard or tailored icons, or actual images of people, places, and/or actual objects (e.g. buildings). Imagery can be used as part of the event description. Images 23 can be viewed in all of the visual representation 18 contexts, as for example shown in FIGS. 20 and 21, which show the use of images 23 in the time lines 422 and the time chart 430 views. Sequences of images 23 can be animated to help the user detect changes in the image over time and space.

Annotations 21

Figure 21:
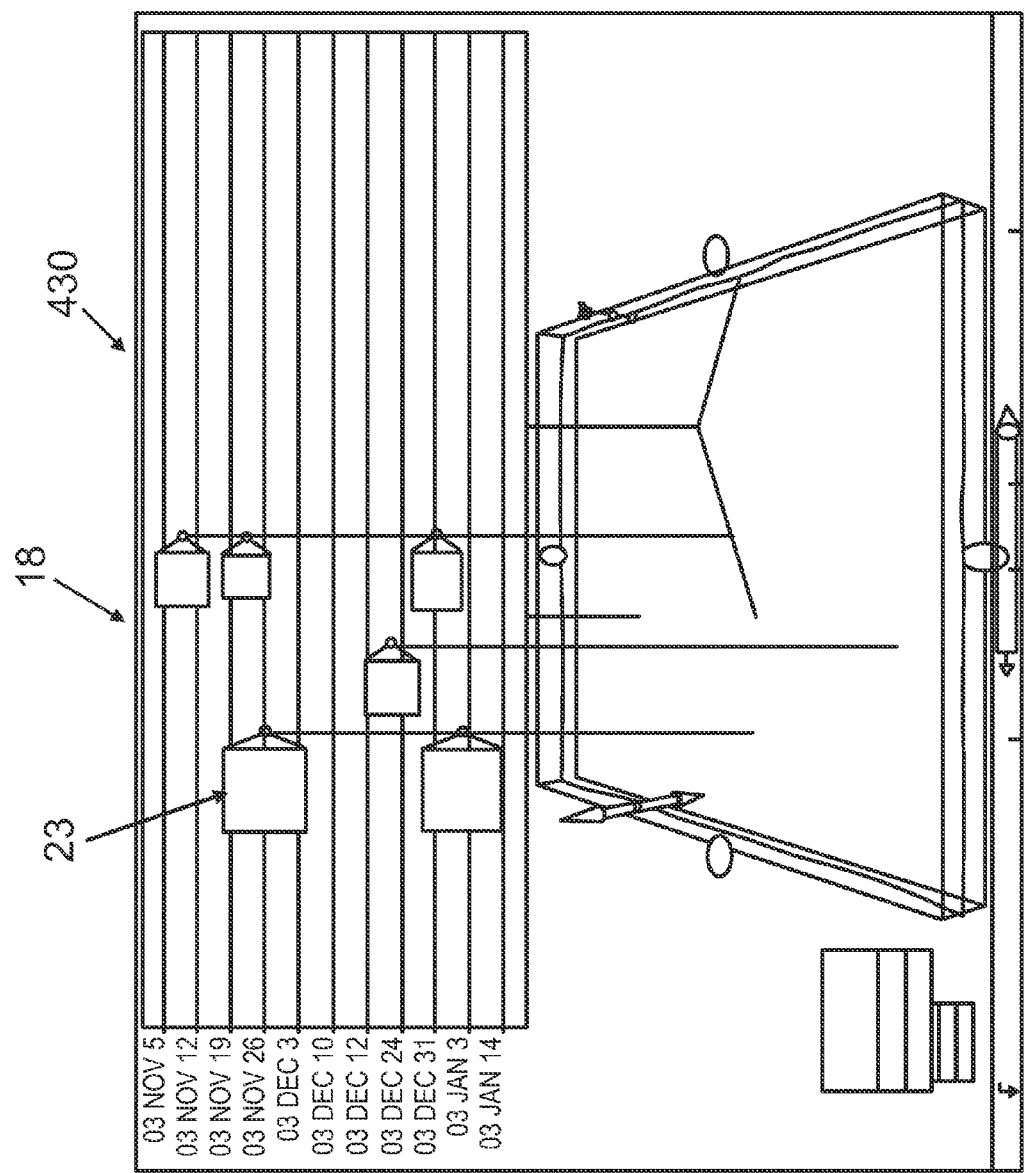
FIG. 21 is a further embodiment of FIG. 18 showing imagery in a time chart view.

Annotations 21 in Geography and Time (see FIG. 22) can be represented as manually placed lines or other shapes (e.g. pen/pencil strokes) can be placed on the visual representation 18 by an operator of the tool 12 and used to annotate elements of interest with such as but not limited to arrows, circles and freeform markings. Some examples are shown in FIG. 21. These annotations 21 are located in geography (e.g. spatial domain 400) and time (e.g. temporal domain 422) and so can appear and disappear on the visual representation 18 as geographic and time contexts are navigated through the user input events 109.

Visualization Tool 12

Figure 3:
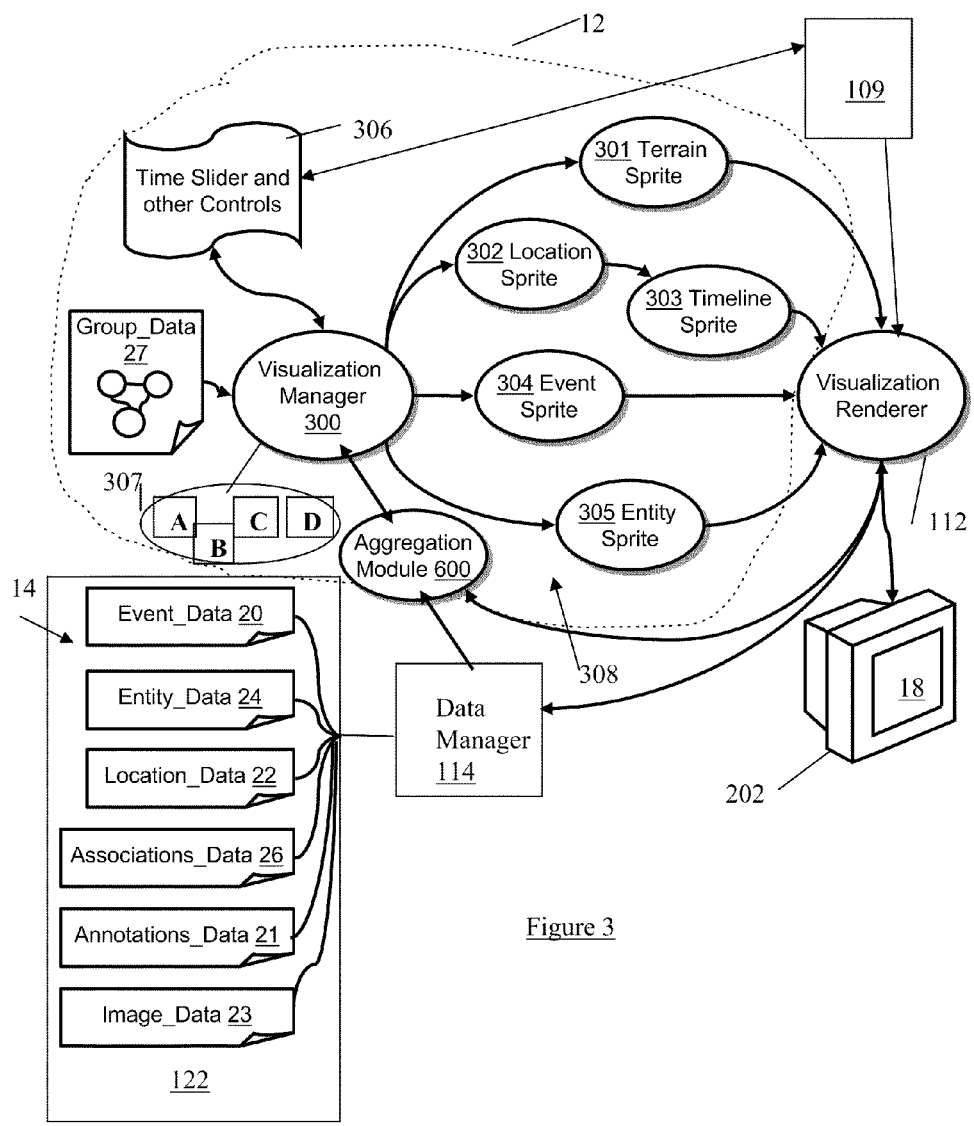
FIG. 3 shows further details of the visualization tool of FIG. 1.

Referring to FIG. 3, the visualization tool 12 has a visualization manager 300 for interacting with the data objects 14 for presentation to the interface 202 via the VI manager 112. The Data Objects 14 are formed into groups 27 through the associations 26 and processed by the Visualization Manager 300. The groups 27 comprise selected subsets of the objects 20, 21, 22, 23, 24 combined via selected associations 26. This combination of data objects 14 and association sets 16 can be accomplished through predefined groups 27 added to the tables 122 and/or through the user events 109 during interaction of the user directly with selected data objects 14 and association sets 16 via the controls 306. It is recognized that the predefined groups 27 could be loaded into the memory 102 (and tables 122) via the computer readable medium 46 (see FIG. 2). The Visualization manager 300 also processes user event 109 input through interaction with a time slider and other controls 306, including several interactive controls for supporting navigation and analysis of information within the visual representation 18 (see FIG. 1) such as but not limited to data interactions of selection, filtering, hide/show and grouping as further described below. Use of the groups 27 is such that subsets of the objects 14 can be selected and grouped through associations 26. In this way, the user of the tool 12 can organize observations into related stories or story fragments.

These groupings 27 can be named with a label and visibility controls, which provide for selected display of the groups 27 on the representation 18, e.g. the groups 27 can be turned on and off with respect to display to the user of the tool 12.

The Visualization Manager 300 processes the translation from raw data objects 14 to the visual representation 18. First, Data Objects 14 and associations 16 can be formed by the Visualization Manager 300 into the groups 27, as noted in the tables 122, and then processed. The Visualization Manager 300 matches the raw data objects 14 and associations 16 with sprites 308 (i.e. visual processing objects/components that know how to draw and render visual elements for specified data objects 14 and associations 16) and sets a drawing sequence for implementation by the VI manager 112. The sprites 308 are visualization components that take predetermined information schema as input and output graphical elements such as lines, text, images and icons to the computers graphics system. Entity 24, event 20 and location 22 data objects each can have a specialized sprite 308 type designed to represent them. A new sprite instance is created for each entity, event and location instance to manage their representation in the visual representation 18 on the display.

The sprites 308 are processed in order by the visualization manager 300, starting with the spatial domain (terrain) context and locations, followed by Events and Timelines, and finally Entities. Timelines are generated and Events positioned along them. Entities are rendered last by the sprites 308 since the entities depend on Event positions. It is recognised that processing order of the sprites 308 can be other than as described above.

The Visualization manager 112 renders the sprites 308 to create the final image including visual elements representing the data objects 14 and associates 16 of the groups 27, for display as the visual representation 18 on the interface 202. After the visual representation 18 is on the interface 202, the user event 109 inputs flow into the Visualization Manager, through the VI manager 112 and cause the visual representation 18 to be updated. The Visualization Manager 300 can be optimized to update only those sprites 308 that have changed in order to maximize interactive performance between the user and the interface 202.

Layout of the Visualization Representation 18

Figure 4:
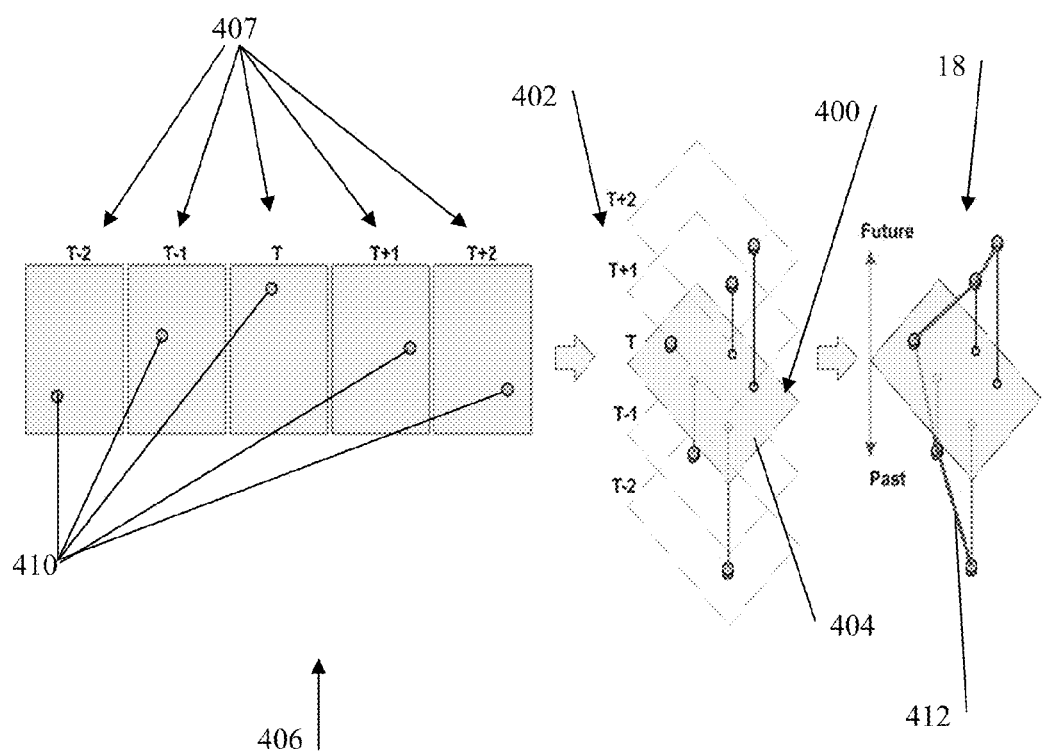
FIG. 4 shows further details of a visualization representation for display on a visualization interface of the system of FIG. 1.

The visualization technique of the visualization tool 12 is designed to improve perception of entity activities, movements and relationships as they change over time in a concurrent time-geographic or time-diagrammatical context. The visual representation 18 of the data objects 14 and associations 16 consists of a combined temporal-spatial display to show interconnecting streams of events over a range of time on a map or other schematic diagram space, both hereafter referred to in common as a spatial domain 400 (see FIG. 4). Events can be represented within an X,Y,T coordinate space, in which the X,Y plane shows the spatial domain 400 (e.g. geographic space) and the Z-axis represents a time series into the future and past, referred to as a temporal domain 402. In addition to providing the spatial context, a reference surface (or reference spatial domain) 404 marks an instant of focus between before and after, such that events "occur" when they meet the surface of the ground reference surface 404. FIG. 4 shows how the visualization manager 300 (see FIG. 3) combines individual frames 406 (spatial domains 400 taken at different times Ti 407) of event/entity/location visual elements 410, which are translated into a continuous integrated spatial and temporal visual representation 18. It should be noted connection visual elements 412 can represent presumed location (interpolated) of Entity between the discrete event/entity/location represented by the visual elements 410.

Another interpretation for connections elements 412 could be signifying communications between different Entities at different locations, which are related to the same event as further described below.

Figure 5:
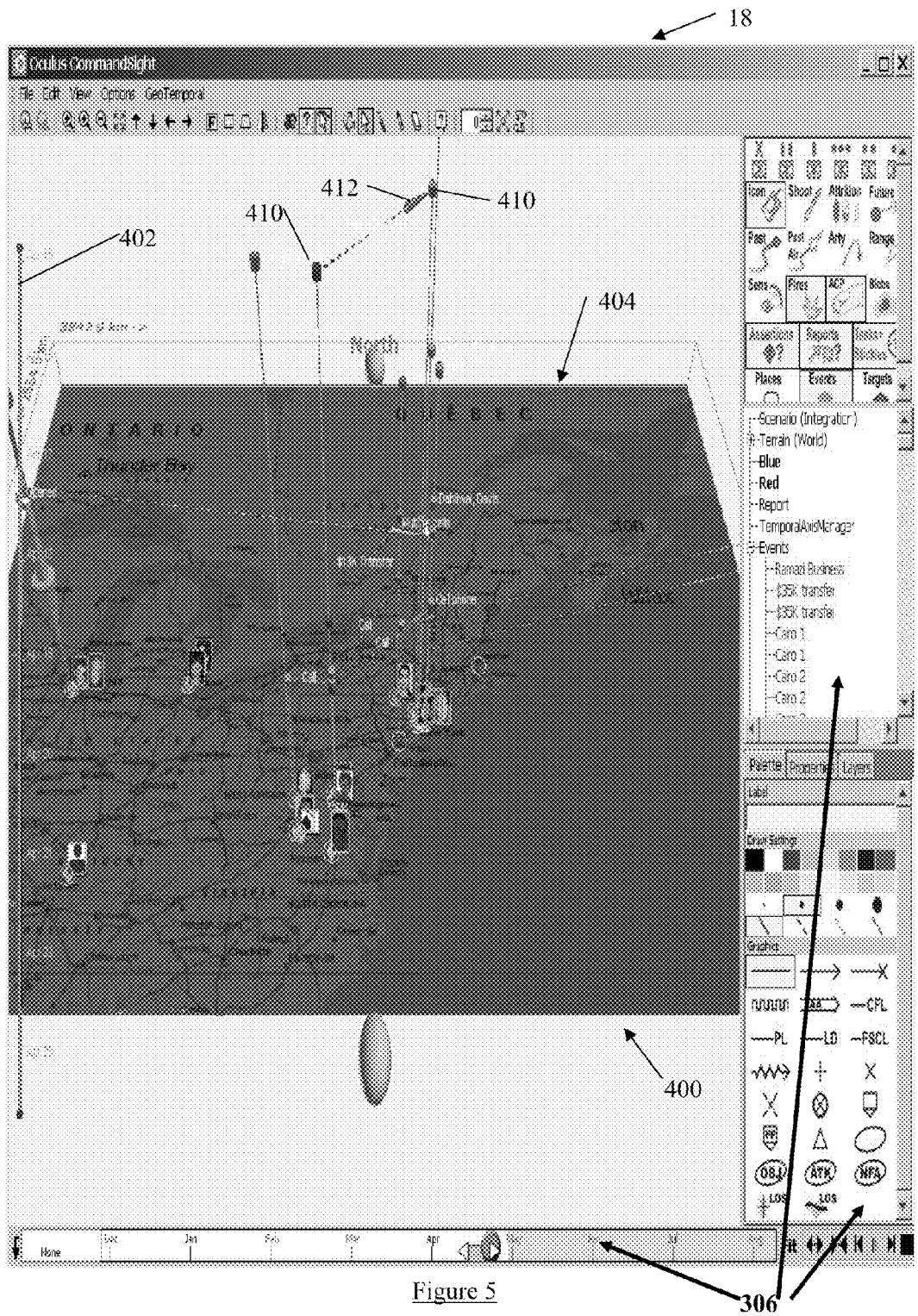
FIG. 5 is an example visualization representation of FIG. 1 showing Events in Concurrent Time and Space.

Referring to FIG. 5, an example visual representation 18 visually depicts events over time and space in an x, y, t space (or x, y, z, t space with elevation data). The example visual representation 18 generated by the tool 12 (see FIG. 2) is shown having the time domain 402 as days in April, and the spatial domain 400 as a geographical map providing the instant of focus (of the reference surface 404) as sometime around noon on April 23—the intersection point between the timelines 422 and the reference surface 404 represents the instant of focus. The visualization representation 18 represents the temporal 402, spatial 400 and connectivity elements 412 (between two visual elements 410) of information within a single integrated picture on the interface 202 (see FIG. 1). Further, the tool 12 provides an interactive analysis tool for the user with interface controls 306 to navigate the temporal, spatial and connectivity dimensions. The tool 12 is suited to the interpretation of any information in which time, location and connectivity are key dimensions that are interpreted together. The visual representation 18 is used as a visualization technique for displaying and tracking events, people, and equipment within the combined temporal and spatial domains 402, 400 display. Tracking and analyzing entities 24 and streams has traditionally been the domain of investigators, whether that be police services or military intelligence. In addition, business users also analyze events 20 in time and spatial domains 400, 402 to better understand phenomenon such as customer behavior or transportation patterns. The visualization tool 12 can be applied for both reporting and analysis.

The visual representation 18 can be applied as an analyst workspace for exploration, deep analysis and presentation for such as but not limited to:

Situations involving people and organizations that interact over time and in which geography or territory plays a role;
  Storing and reviewing activity reports over a given period. Used in this way the representation 18 could provide a means to determine a living history, context and lessons learned from past events; and
  As an analysis and presentation tool for long term tracking and surveillance of persons and equipment activities.

The visualization tool 12 provides the visualization representation 18 as an interactive display, such that the users (e.g. intelligence analysts, business marketing analysts) can view, and work with, large numbers of events. Further, perceived patterns, anomalies and connections can be explored and subsets of events can be grouped into "story" or hypothesis fragments. The visualization tool 12 includes a variety of capabilities such as but not limited to:

An event-based information architecture with places, events, entities (e.g. people) and relationships;
  Past and future time visibility and animation controls;
  Data input wizards for describing single events and for loading many events from a table;
  Entity and event connectivity analysis in time and geography;
  Path displays in time and geography;
  Configurable workspaces allowing ad hoc, drag and drop arrangements of events;
  Search, filter and drill down tools;
  Creation of sub-groups and overlays by selecting events and dragging them into sets (along with associated spatial/time scope properties); and
  Adaptable display functions including dynamic show/hide controls.

Example Objects 14 with Associations 16

In the visualization tool 12, specific combinations of associated data elements (objects 20, 22, 24 and associations 26) can be defined. These defined groups 27 are represented visually as visual elements 410 in specific ways to express various types of occurrences in the visual representation 18. The following are examples of how the groups 27 of associated data elements can be formed to express specific occurrences and relationships shown as the connection visual elements 412.

Figure 6:
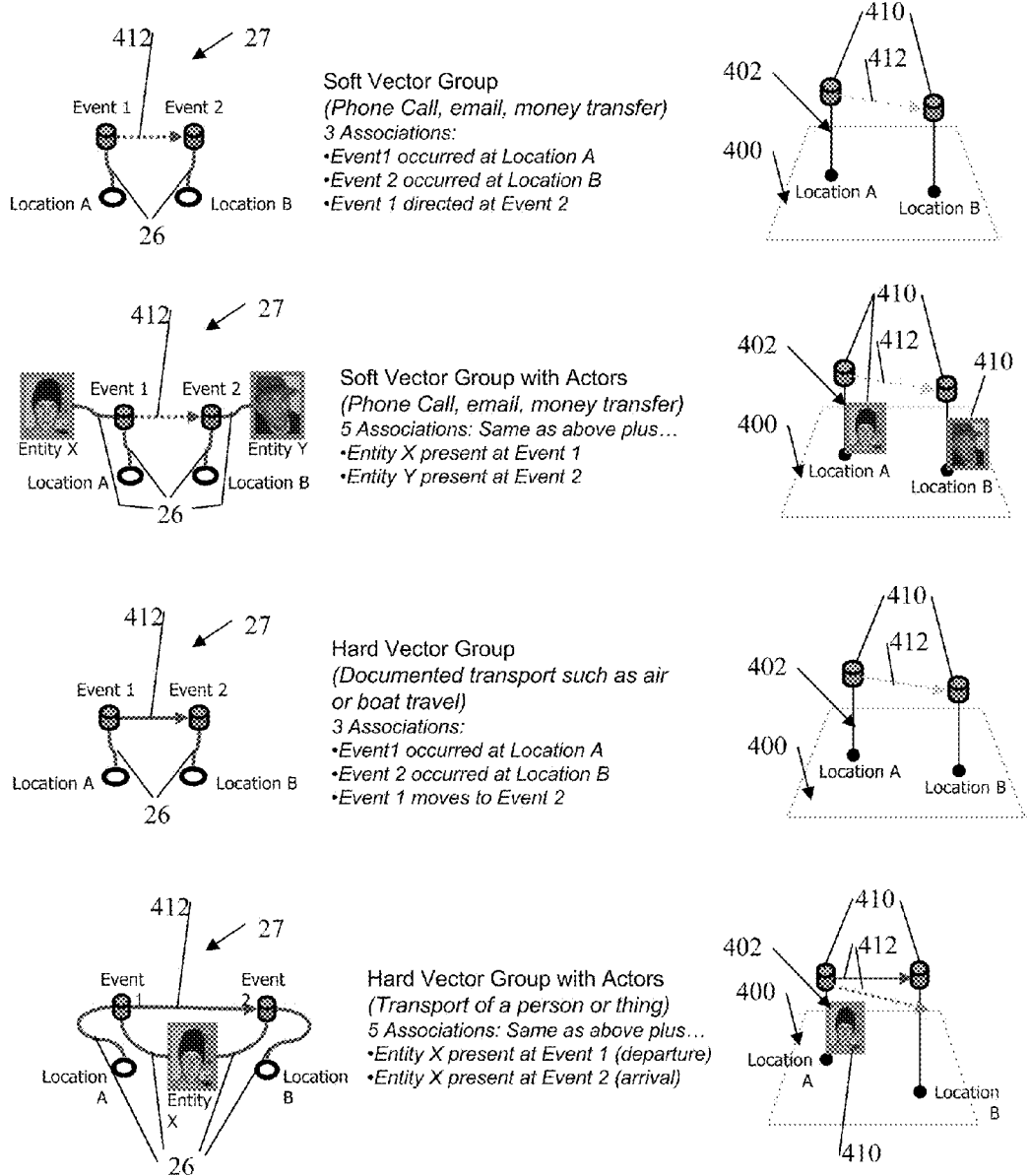
FIG. 6 shows example data objects and associations of FIG. 1.
Figure 7:
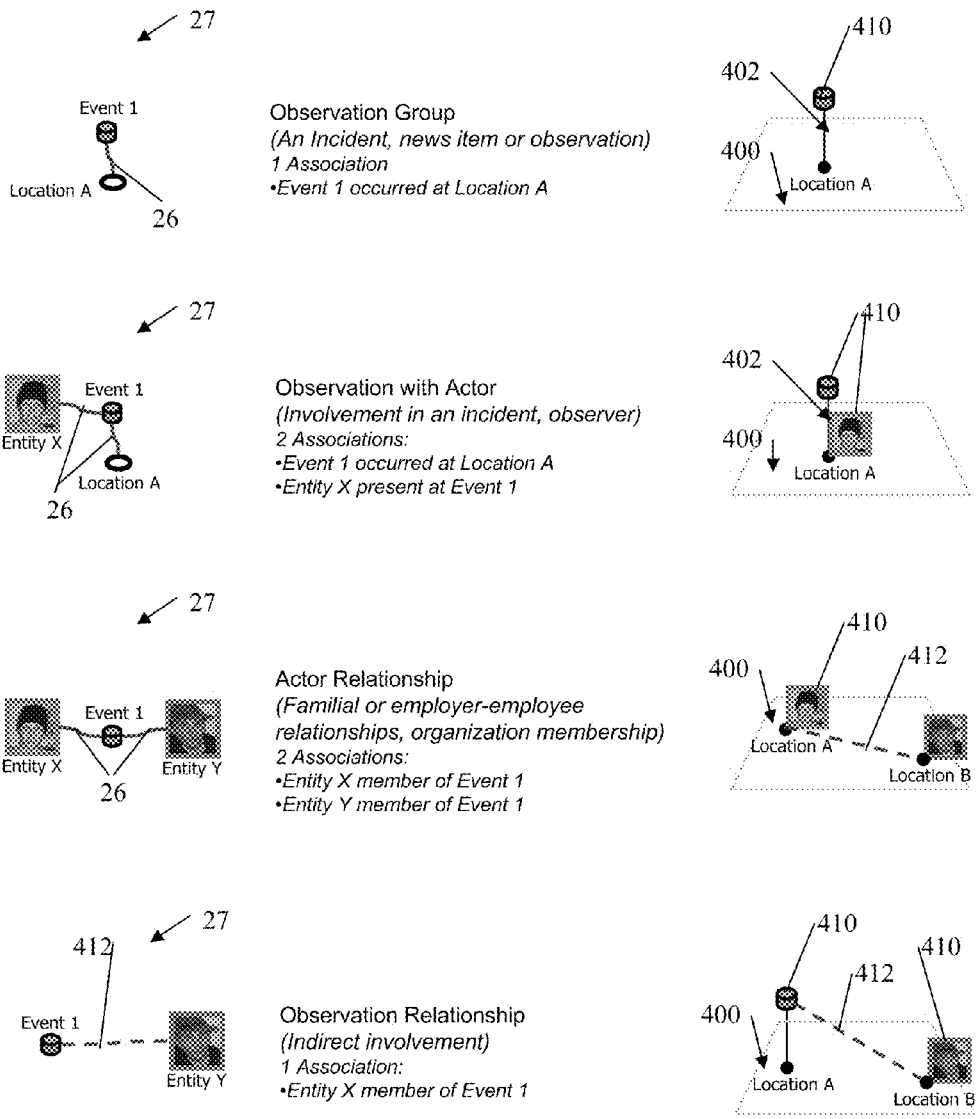
FIG. 7 shows further example data objects and associations of FIG. 1.

Referring to FIGS. 6 and 7, example groups 27 (denoting common real world occurrences) are shown with selected subsets of the objects 20, 22, 24 combined via selected associations 26. The corresponding visualization representation 18 is shown as well including the temporal domain 402, the spatial domain 400, connection visual elements 412 and the visual elements 410 representing the event/entity/location combinations. It is noted that example applications of the groups 27 are such as but not limited to those shown in FIGS. 6 and 7. In the FIGS. 6 and 7 it is noted that event objects 20 are labeled as "Event 1", "Event 2", location objects 22 are labeled as "Location A", "Location B", and entity objects 24 are labeled as "Entity X", "Entity Y". The set of associations 16 are labeled as individual associations 26 with connections labeled as either solid or dotted lines 412 between two events, or dotted in the case of an indirect connection between two locations.

Visual Elements Corresponding to Spatial and Temporal Domains

The visual elements 410 and 412, their variations and behavior facilitate interpretation of the concurrent display of events in the time 402 and space 400 domains. In general, events reference the location at which they occur and a list of Entities and their role in the event. The time at which the event occurred or the time span over which the event occurred are stored as parameters of the event.

Spatial Domain Representation

Figure 8:
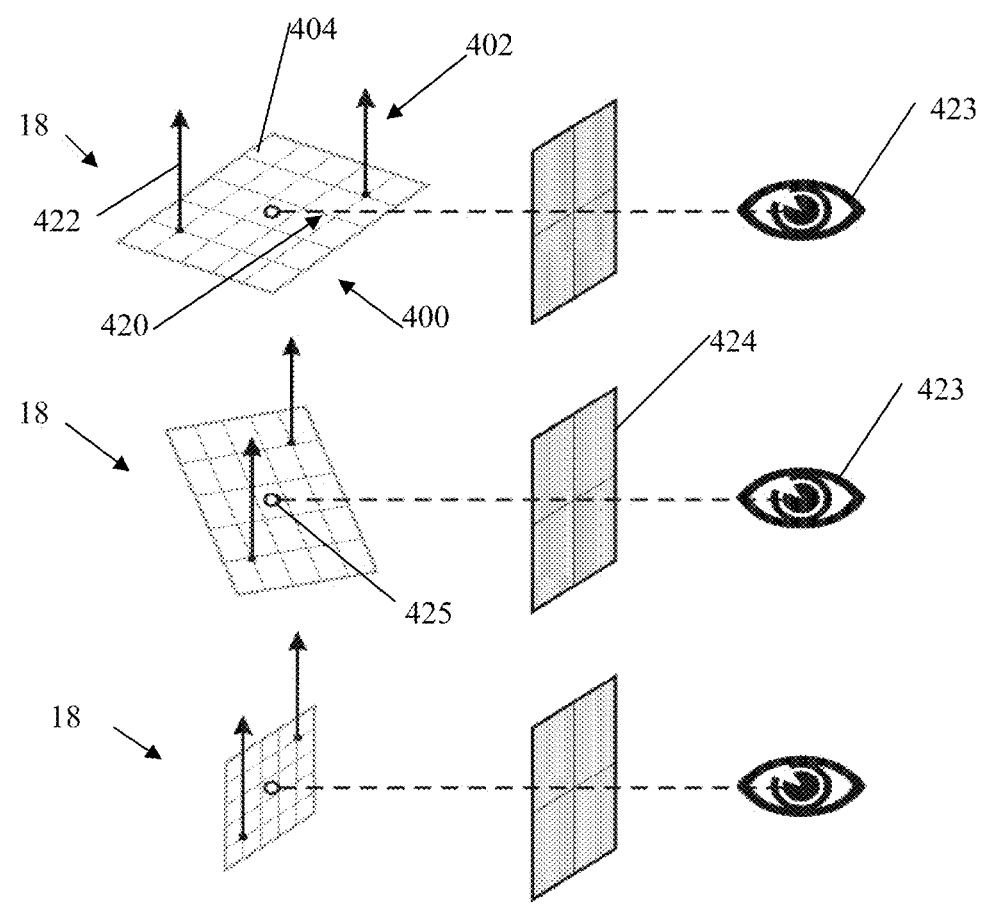
FIG. 8 shows changes in orientation of a reference surface of the visualization representation of FIG. 1.

Referring to FIG. 8, the primary organizing element of the visualization representation 18 is the 2D/3D spatial reference frame (subsequently included herein with reference to the spatial domain 400). The spatial domain 400 consists of a true 2D/3D graphics reference surface 404 in which a 2D or 3 dimensional representation of an area is shown. This spatial domain 400 can be manipulated using a pointer device (not shown—part of the controls 306—see FIG. 3) by the user of the interface 108 (see FIG. 2) to rotate the reference surface 404 with respect to a viewpoint 420 or viewing ray extending from a viewer 423. The user (i.e. viewer 423) can also navigate the reference surface 404 by scrolling in any direction, zooming in or out of an area and selecting specific areas of focus. In this way the user can specify the spatial dimensions of an area of interest the reference surface 404 in which to view events in time. The spatial domain 400 represents space essentially as a plane (e.g. reference surface 404), however is capable of representing 3 dimensional relief within that plane in order to express geographical features involving elevation. The spatial domain 400 can be made transparent so that timelines 422 of the temporal domain 402 can extend behind the reference surface 404 are still visible to the user. FIG. 8 shows how the viewer 423 facing timelines 422 can rotate to face the viewpoint 420 no matter how the reference surface 404 is rotated in 3 dimensions with respect to the viewpoint 420.

The spatial domain 400 includes visual elements 410, 412 (see FIG. 4) that can represent such as but not limited to map information, digital elevation data, diagrams, and images used as the spatial context. These types of spaces can also be combined into a workspace. The user can also create diagrams using drawing tools (of the controls 306—see FIG. 3) provided by the visualization tool 12 to create custom diagrams and annotations within the spatial domain 400.

Event Representation and Interactions

Referring to FIGS. 4 and 8, events are represented by a glyph, or icon as the visual element 410, placed along the timeline 422 at the point in time that the event occurred. The glyph can be actually a group of graphical objects, or layers, each of which expresses the content of the event data object 20 (see FIG. 1) in a different way. Each layer can be toggled and adjusted by the user on a per event basis, in groups or across all event instances. The graphical objects or layers for event visual elements 410 are such as but not limited to:

1. Text Label

The Text label is a text graphic meant to contain a short description of the event content. This text always faces the viewer 423 no matter how the reference surface 404 is oriented. The text label incorporates a de-cluttering function that separates it from other labels if they overlap. When two events are connected with a line (see connections 412 below) the label will be positioned at the midpoint of the connection line between the events. The label will be positioned at the end of a connection line that is clipped at the edge of the display area.

2. Indicator—Cylinder, Cube or Sphere

The indicator marks the position in time. The color of the indicator can be manually set by the user in an event properties dialog. Color of event can also be set to match the Entity that is associated with it. The shape of the event can be changed to represent different aspect of information and can be set by the user. Typically it is used to represent a dimension such as type of event or level of importance.

3. Icon

An icon or image can also be displayed at the event location. This icon/image 23 may used to describe some aspect of the content of the event. This icon/image 23 may be user-specified or entered as part of a data file of the tables 122 (see FIG. 2).

4. Connection Elements 412

Connection elements 412 can be lines, or other geometrical curves, which are solid or dashed lines that show connections from an event to another event, place or target. A connection element 412 may have a pointer or arrowhead at one end to indicate a direction of movement, polarity, sequence or other vector-like property. If the connected object is outside of the display area, the connection element 412 can be coupled at the edge of the reference surface 404 and the event label will be positioned at the clipped end of the connection element 412.

5. Time Range Indicator

A Time Range Indicator (not shown) appears if an event occurs over a range of time. The time range can be shown as a line parallel to the timeline 422 with ticks at the end points. The event Indicator (see above) preferably always appears at the start time of the event.

The Event visual element 410 can also be sensitive to interaction. The following user events 109 via the user interface 108 (see FIG. 2) are possible, such as but not limited to:

Mouse-Left-Click:

Selects the visual element 410 of the visualization representation 18 on the VI 202 (see FIG. 2) and highlights it, as well as simultaneously deselecting any previously selected visual element 410, as desired.

Ctrl-Mouse-Left-Click and Shift-Mouse-Left-Click

Adds the visual element 410 to an existing selection set.

Mouse-Left-Double-Click:

Opens a file specified in an event data parameter if it exists. The file will be opened in a system-specified default application window on the interface 202 based on its file type.

Mouse-Right-Click:

Displays an in-context popup menu with options to hide, delete and set properties.

Mouse Over Drilldown:

When the mouse pointer (not shown) is placed over the indicator, a text window is displayed next to the pointer, showing information about the visual element 410. When the mouse pointer is moved away from the indicator, the text window disappears.

Location Representation

Locations are visual elements 410 represented by a glyph, or icon, placed on the reference surface 404 at the position specified by the coordinates in the corresponding location data object 22 (see FIG. 1). The glyph can be a group of graphical objects, or layers, each of which expresses the content of the location data object 22 in a different way. Each layer can be toggled and adjusted by the user on a per Location basis, in groups or across all instances. The visual elements 410 (e.g. graphical objects or layers) for Locations are such as but not limited to:

1. Text Label

The Text label is a graphic object for displaying the name of the location. This text always faces the viewer 422 no matter how the reference surface 404 is oriented. The text label incorporates a de-cluttering function that separates it from other labels if they overlap.

2. Indicator

The indicator is an outlined shape that marks the position or approximate position of the Location data object 22 on the reference surface 404. There are, such as but not limited to, 7 shapes that can be selected for the locations visual elements 410 (marker) and the shape can be filled or empty. The outline thickness can also be adjusted. The default setting can be a circle and can indicate spatial precision with size. For example, more precise locations, such as addresses, are smaller and have thicker line width, whereas a less precise location is larger in diameter, but uses a thin line width.

The Location visual elements 410 are also sensitive to interaction. The following interactions are possible:

Mouse-Left-Click:

Selects the location visual element 410 and highlights it, while deselecting any previously selected location visual elements 410.

Ctrl-Mouse-Left-Click and Shift-Mouse-Left-Click

Adds the location visual element 410 to an existing selection set.

Mouse-Left-Double-Click:

Opens a file specified in a Location data parameter if it exists. The file will be opened in a system-specified default application window based on its file type.

Mouse-Right-Click:

Displays an in-context popup menu with options to hide, delete and set properties of the location visual element 410.

Mouseover Drilldown:

When the Mouse pointer is placed over the location indicator, a text window showing information about the location visual element 410 is displayed next to the pointer. When the mouse pointer is moved away from the indicator, the text window disappears.

Mouse-Left-Click-Hold-and-Drag:
Interactively repositions the location visual element 410 by dragging it across the reference surface 404.

Non-Spatial Locations

Locations 22 have the ability to represent indeterminate position. These are referred to as non-spatial locations 22. Locations 22 tagged as non-spatial can be displayed at the edge of the reference surface 404 just outside of the spatial context of the spatial domain 400. These non-spatial or virtual locations 22 can be always visible no matter where the user is currently zoomed in on the reference surface 404. Events and Timelines 422 that are associated with non-spatial Locations 22 can be rendered the same way as Events with spatial Locations 22.

Further, it is recognized that spatial locations 22 can represent actual, physical places, such that if the latitude/longitude is known the location 22 appears at that position on the map or if the latitude/longitude is unknown the location 22 appears on the bottom corner of the map (for example). Further, it is recognized that non-spatial locations 22 can represent places with no real physical location and can always appear off the right side of map (for example). For events 20, if the location 22 of the event 20 is known, the location 22 appears at that position on the map. However, if the location 22 is unknown, the location 22 can appear halfway (for example) between the geographical positions of the adjacent event locations 22 (e.g. part of target tracking)

Entity Representation

Entity visual elements 410 are represented by a glyph, or icon, and can be positioned on the reference surface 404 or other area of the spatial domain 400, based on associated Event data that specifies its position at the current Moment of Interest 900 (see FIG. 9) (i.e. specific point on the timeline 422 that intersects the reference surface 404). If the current Moment of Interest 900 lies between 2 events in time that specify different positions, the Entity position will be interpolated between the 2 positions. Alternatively, the Entity could be positioned at the most recent known location on the reference surface 404. The Entity glyph is actually a group of the entity visual elements 410 (e.g. graphical objects, or layers) each of which expresses the content of the event data object 20 in a different way. Each layer can be toggled and adjusted by the user on a per event basis, in groups or across all event instances. The entity visual elements 410 are such as but not limited to:

1. Text Label
   The Text label is a graphic object for displaying the name of the Entity. This text always faces the viewer no matter how the reference surface 404 is oriented. The text label incorporates a de-cluttering function that separates it from other labels if they overlap.

2. Indicator
   The indicator is a point showing the interpolated or real position of the Entity in the spatial context of the reference surface 404. The indicator assumes the color specified as an Entity color in the Entity data model.

3. Image Icon
   An icon or image is displayed at the Entity location. This icon may used to represent the identity of the Entity. The displayed image can be user-specified or entered as part of a data file. The Image Icon can have an outline border that assumes the color specified as the Entity color in the Entity data model. The Image Icon incorporates a de-cluttering function that separates it from other Entity Image Icons if they overlap.

4. Past Trail
   The Past Trail is the connection visual element 412, as a series of connected lines that trace previous known positions of the Entity over time, starting from the current Moment of Interest 900 and working backwards into past time of the timeline 422. Previous positions are defined as Events where the Entity was known to be located. The Past Trail can mark the path of the Entity over time and space simultaneously.

5. Future Trail
   The Future Trail is the connection visual element 412, as a series of connected lines that trace future known positions of the Entity over time, starting from the current Moment of Interest 900 and working forwards into future time. Future positions are defined as Events where the Entity is known to be located. The Future Trail can mark the future path of the Entity over time and space simultaneously.

The Entity representation is also sensitive to interaction. The following interactions are possible, such as but not limited to:

Mouse-Left-Click:
   Selects the entity visual element 410 and highlights it and deselects any previously selected entity visual element 410.

Ctrl-Mouse-Left-Click and Shift-Mouse-Left-Click
   Adds the entity visual element 410 to an existing selection set Mouse-Left-Double-Click:
   Opens the file specified in an Entity data parameter if it exists. The file will be opened in a system-specified default application window based on its file type.

Mouse-Right-Click:
   Displays an in-context popup menu with options to hide, delete and set properties of the entity visual element 410.

Mouseover Drilldown:
   When the Mouse pointer is placed over the indicator, a text window showing information about the entity visual element 410 is displayed next to the pointer. When the mouse pointer is moved away from the indicator, the text window disappears.

Temporal Domain Including Timelines

Figure 9:
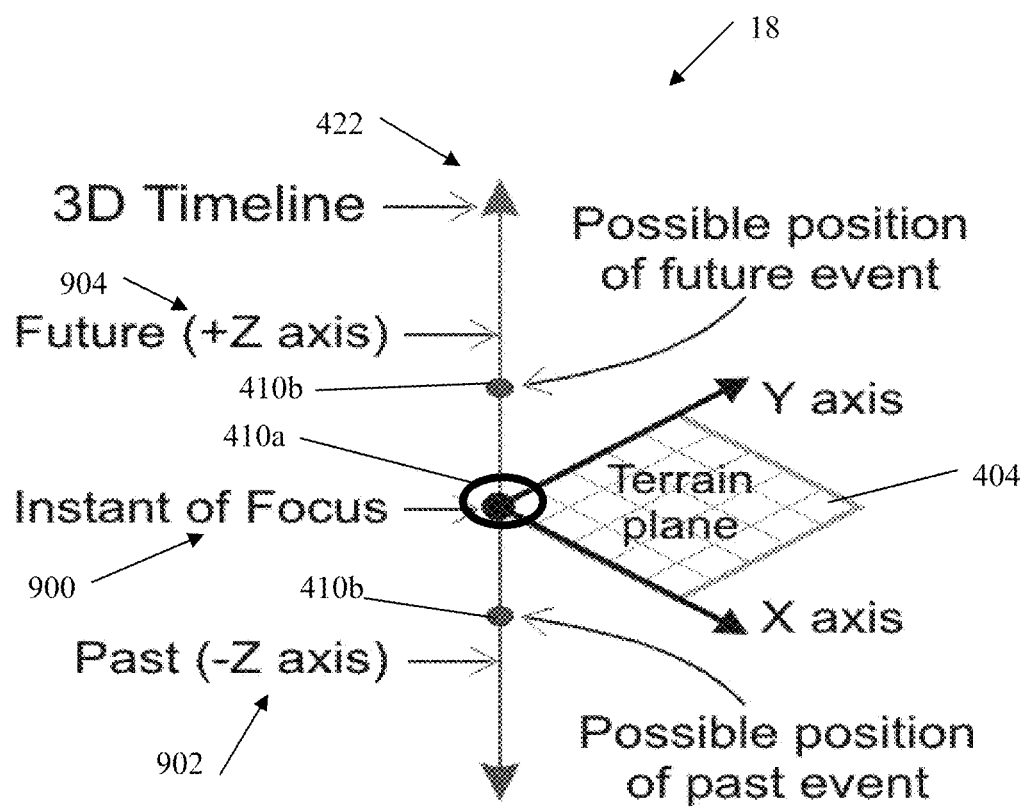
FIG. 9 is an example timeline of FIG. 8.

Referring to FIGS. 8 and 9, the temporal domain provides a common temporal reference frame for the spatial domain 400, whereby the domains 400, 402 are operatively coupled to one another to simultaneously reflect changes in interconnected spatial and temporal properties of the data elements 14 and associations 16. Timelines 422 (otherwise known as time tracks) represent a distribution of the temporal domain 402 over the spatial domain 400, and are a primary organizing element of information in the visualization representation 18 that make it possible to display events across time within the single spatial display on the VI 202 (see FIG. 1). Timelines 422 represent a stream of time through a particular Location visual element 410a positioned on the reference surface 404 and can be represented as a literal line in space. Other options for representing the timelines/time tracks 422 are such as but not limited to curved geometrical shapes (e.g. spirals) including 2D and 3D curves when combining two or more parameters in conjunction with the temporal dimension. Each unique Location of interest (represented by the location visual element 410a) has one Timeline 422 that passes through it. Events (represented by event visual elements 410b) that occur at that Location are arranged along this timeline 422 according to the exact time or range of time at which the event occurred. In this way multiple events (represented by respective event visual elements 410b) can be arranged along the timeline 422 and the sequence made visually apparent. A single spatial view will have as many timelines 422 as necessary to show every Event at every location within the current spatial and temporal scope, as defined in the spatial 400 and temporal 402 domains (see FIG. 4) selected by the user. In order to make comparisons between events and sequences of event between locations, the time range represented by multiple timelines 422 projecting through the reference surface 404 at different spatial locations is synchronized. In other words the time scale is the same across all timelines 422 in the time domain 402 of the visual representation 18. Therefore, it is recognised that the timelines 422 are used in the visual representation 18 to visually depict a graphical visualization of the data objects 14 over time with respect to their spatial properties/attributes.

For example, in order to make comparisons between events 20 and sequences of events 20 between locations 410 of interest (see FIG. 4), the time range represented by the timelines 422 can be synchronized. In other words, the time scale can be selected as the same for every timeline 422 of the selected time range of the temporal domain 402 of the representation 18.

Representing Current, Past and Future

Three distinct strata of time are displayed by the timelines 422, namely;

1. The "moment of interest" 900 or browse time, as selected by the user, 2. a range 902 of past time preceding the browse time called "past", and 3. a range 904 of time after the moment of interest 900, called "future"

On a 3D Timeline 422, the moment of focus 900 is the point at which the timeline intersects the reference surface 404. An event that occurs at the moment of focus 900 will appear to be placed on the reference surface 404 (event representation is described above). Past and future time ranges 902, 904 extend on either side (above or below) of the moment of interest 900 along the timeline 422. Amount of time into the past or future is proportional to the distance from the moment of focus 900. The scale of time may be linear or logarithmic in either direction. The user may select to have the direction of future to be down and past to be up or vice versa.

There are three basic variations of Spatial Timelines 422 that emphasize spatial and temporal qualities to varying extents. Each variation has a specific orientation and implementation in terms of its visual construction and behavior in the visualization representation 18 (see FIG. 1). The user may choose to enable any of the variations at any time during application runtime, as further described below.

3D Z-Axis Timelines

Figure 10:
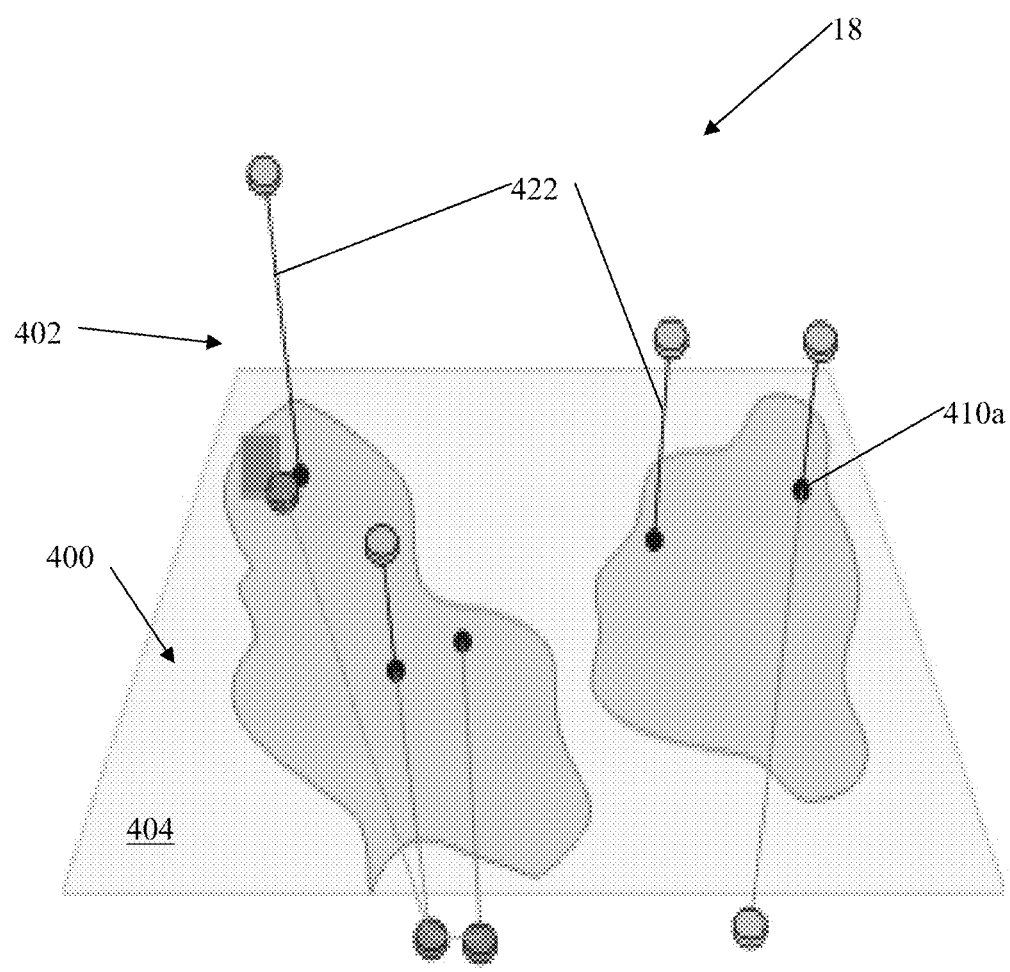
FIG. 10 is a further example timeline of FIG. 8.

FIG. 10 shows how 3D Timelines 422 pass through reference surface 404 locations 410a. 3D timelines 422 are locked in orientation (angle) with respect to the orientation of the reference surface 404 and are affected by changes in perspective of the reference surface 404 about the viewpoint 420 (see FIG. 8). For example, the 3D Timelines 422 can be oriented normal to the reference surface 404 and exist within its coordinate space. Within the 3D spatial domain 400, the reference surface 404 is rendered in the X-Y plane and the timelines 422 run parallel to the Z-axis through locations 410a on the reference surface 404. Accordingly, the 3D Timelines 422 move with the reference surface 404 as it changes in response to user navigation commands and viewpoint changes about the viewpoint 420, much like flag posts are attached to the ground in real life. The 3D timelines 422 are subject to the same perspective effects as other objects in the 3D graphical window of the VI 202 (see FIG. 1) displaying the visual representation 18. The 3D Timelines 422 can be rendered as thin cylindrical volumes and are rendered only between events 410a with which it shares a location and the location 410a on the reference surface 404. The timeline 422 may extend above the reference surface 404, below the reference surface 404, or both. If no events 410b for its location 410a are in view the timeline 422 is not shown on the visualization representation 18.

3D Viewer Facing Timelines

Referring to FIG. 8, 3D Viewer-facing Timelines 422 are similar to 3D Timelines 422 except that they rotate about a moment of focus 425 (point at which the viewing ray of the viewpoint 420 intersects the reference surface 404) so that the 3D Viewer-facing Timeline 422 always remain perpendicular to viewer 423 from which the scene is rendered. 3D Viewer-facing Timelines 422 are similar to 3D Timelines 422 except that they rotate about the moment of focus 425 so that they are always parallel to a plane 424 normal to the viewing ray between the viewer 423 and the moment of focus 425. The effect achieved is that the timelines 422 are always rendered to face the viewer 423, so that the length of the timeline 422 is always maximized and consistent. This technique allows the temporal dimension of the temporal domain 402 to be read by the viewer 423 indifferent to how the reference surface 404 many be oriented to the viewer 423. This technique is also generally referred to as "billboarding" because the information is always oriented towards the viewer 423. Using this technique the reference surface 404 can be viewed from any direction (including directly above) and the temporal information of the timeline 422 remains readable.

Linked TimeChart Timelines

Figure 11:
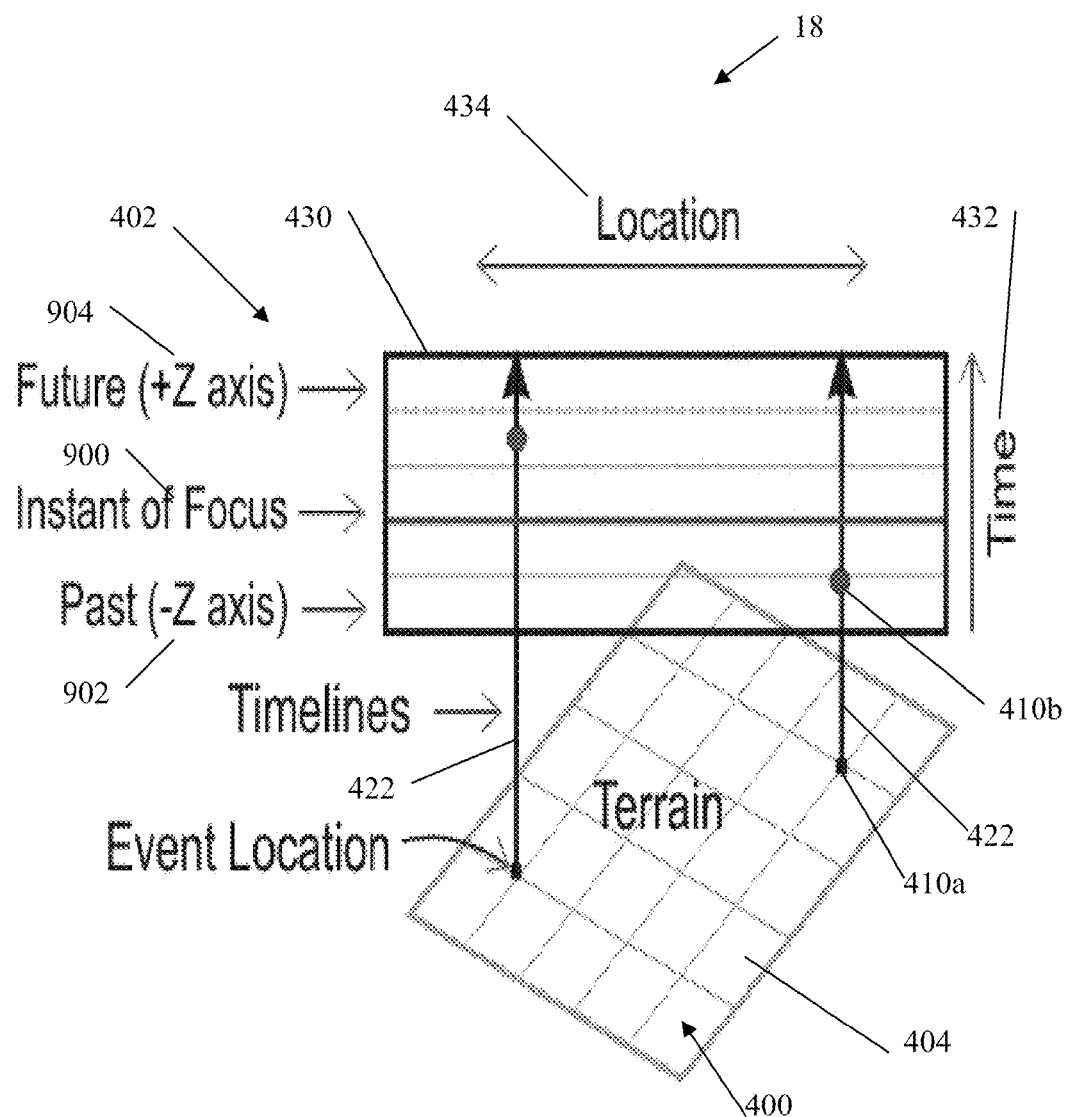
FIG. 11 is a further example timeline of FIG. 8 showing a time chart.

Referring to FIG. 11, showing how an overlay time chart 430 is connected to the reference surface 404 locations 410a by timelines 422. The timelines 422 of the Linked TimeChart 430 are timelines 422 that connect the 2D chart 430 (e.g. grid) in the temporal domain 402 to locations 410a marked in the 3D spatial domain 400. The timeline grid 430 is rendered in the visual representation 18 as an overlay in front of the 2D or 3D reference surface 404. The timeline chart 430 can be a rectangular region containing a regular or logarithmic time scale upon which event representations 410b are laid out. The chart 430 is arranged so that one dimension 432 is time and the other is location 434 based on the position of the locations 410a on the reference surface 404. As the reference surface 404 is navigated or manipulated the timelines 422 in the chart 430 move to follow the new relative location 410a positions. This linked location and temporal scrolling has the advantage that it is easy to make temporal comparisons between events since time is represented in a flat chart 430 space. The position 410b of the event can always be traced by following the timeline 422 down to the reference surface 404 to the location 410a.

Figure 12:
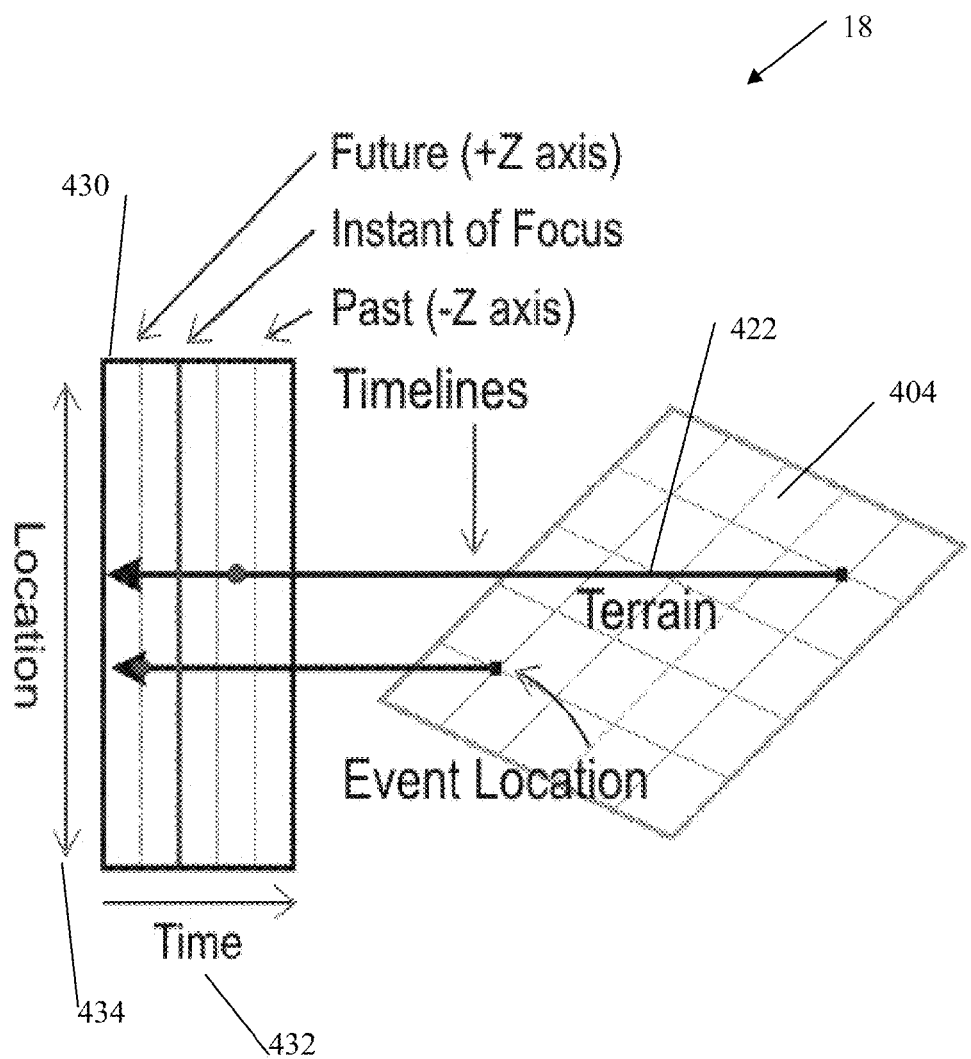
FIG. 12 is a further example of the time chart of FIG. 11.

Referring to FIGS. 11 and 12, the TimeChart 430 can be rendered in 2 orientations, one vertical and one horizontal. In the vertical mode of FIG. 11, the TimeChart 430 has the location dimension 434 shown horizontally, the time dimension 432 vertically, and the timelines 422 connect vertically to the reference surface 404. In the horizontal mode of FIG. 12, the TimeChart 430 has the location dimension 434 shown vertically, the time dimension 432 shown horizontally and the timelines 422 connect to the reference surface 404 horizontally. In both cases the TimeChart 430 position in the visualization representation 18 can be moved anywhere on the screen of the VI 202 (see FIG. 1), so that the chart 430 may be on either side of the reference surface 404 or in front of the reference surface 404. In addition, the temporal directions of past 902 and future 904 can be swapped on either side of the focus 900.

Interaction Interface Descriptions

Figure 13:
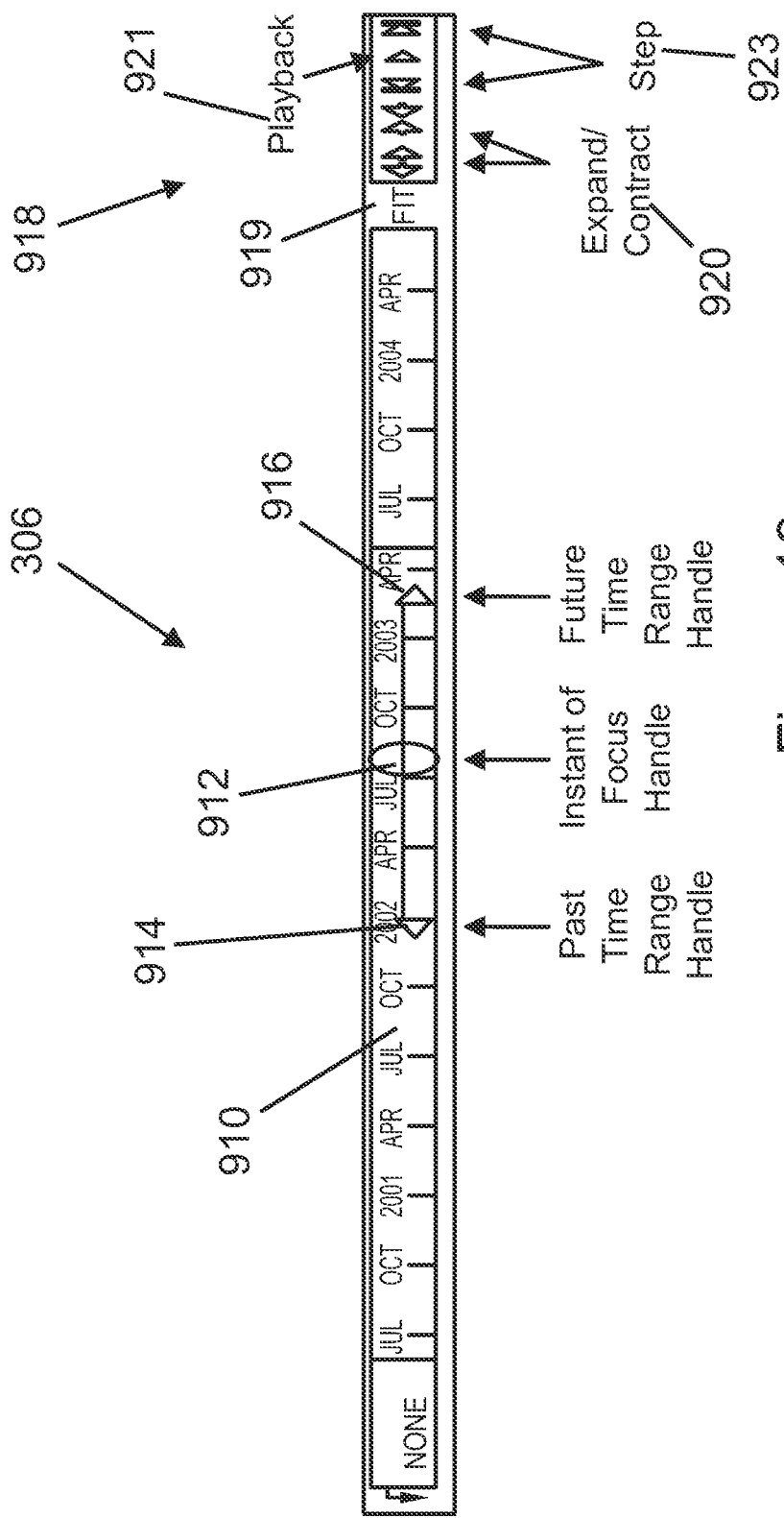
FIG. 13 shows example user controls for the visualization representation of FIG. 5.

Referring to FIGS. 3 and 13, several interactive controls 306 support navigation and analysis of information within the visualization representation 12, as monitored by the visualization manger 300 in connection with user events 109. Examples of the controls 306 are such as but not limited to a time slider 910, an instant of focus selector 912, a past time range selector 914, and a future time selector 916. It is recognized that these controls 306 can be represented on the VI 202 (see FIG. 1) as visual based controls, text controls, and/or a combination thereof.

Time and Range Slider 901

The timeline slider 910 is a linear time scale that is visible underneath the visualization representation 18 (including the temporal 402 and spatial 400 domains). The control 910 contains sub controls/selectors that allow control of three independent temporal parameters: the Instant of Focus, the Past Range of Time and the Future Range of Time.

Continuous animation of events 20 over time and geography can be provided as the time slider 910 is moved forward and backwards in time. Example, if a vehicle moves from location A at t1 to location B at t2, the vehicle (object 23,24) is shown moving continuously across the spatial domain 400 (e.g. map). The timelines 422 can animate up and down at a selected frame rate in association with movement of the slider 910.

Instant of Focus

The instant of focus selector 912 is the primary temporal control. It is adjusted by dragging it left or right with the mouse pointer across the time slider 910 to the desired position. As it is dragged, the Past and Future ranges move with it. The instant of focus 900 (see FIG. 12) (also known as the browse time) is the moment in time represented at the reference surface 404 in the spatial-temporal visualization representation 18. As the instant of focus selector 912 is moved by the user forward or back in time along the slider 910, the visualization representation 18 displayed on the interface 202 (see FIG. 1) updates the various associated visual elements of the temporal 402 and spatial 400 domains to reflect the new time settings. For example, placement of Event visual elements 410 animate along the timelines 422 and Entity visual elements 410 move along the reference surface 404 interpolating between known locations visual elements 410 (see FIGS. 6 and 7). Examples of movement are given with reference to FIGS. 14, 15, and 16 below.

Past Time Range

The Past Time Range selector 914 sets the range of time before the moment of interest 900 (see FIG. 11) for which events will be shown. The Past Time range is adjusted by dragging the selector 914 left and right with the mouse pointer. The range between the moment of interest 900 and the Past time limit can be highlighted in red (or other colour codings) on the time slider 910. As the Past Time Range is adjusted, viewing parameters of the spatial-temporal visualization representation 18 update to reflect the change in the time settings.

Future Time Range

The Future Time Range selector 914 sets the range of time after the moment of interest 900 for which events will be shown. The Future Time range is adjusted by dragging the selector 916 left and right with the mouse pointer. The range between the moment of interest 900 and the Future time limit is highlighted in blue (or other colour codings) on the time slider 910. As the Future Time Range is adjusted, viewing parameters of the spatial-temporal visualization representation 18 update to reflect the change in the time settings.

The time range visible in the time scale of the time slider 910 can be expanded or contracted to show a time span from centuries to seconds. Clicking and dragging on the time slider 910 anywhere except the three selectors 912, 914, 916 will allow the entire time scale to slide to translate in time to a point further in the future or past. Other controls 918 associated with the time slider 910 can be such as a "Fit" button 919 for automatically adjusting the time scale to fit the range of time covered by the currently active data set displayed in the visualization representation 18. Controls 918 can include a Fit control 919, a scale-expand-contract controls 920, a step control 923, and a play control 922, which allow the user to expand or contract the time scale. A step control 918 increments the instant of focus 900 forward or back. The "playback" button 920 causes the instant of focus 900 to animate forward by a user-adjustable rate. This "playback" causes the visualization representation 18 as displayed to animate in sync with the time slider 910.

Simultaneous Spatial and Temporal Navigation can be provided by the tool 12 using, for example, interactions such as zoom-box selection and saved views. In addition, simultaneous spatial and temporal zooming can be used to provide the user to quickly move to a context of interest. In any view of the representation 18, the user may select a subset of events 20 and zoom to them in both time 402 and space 400 domains using a Fit Time and a Fit Space functions. These functions can happen simultaneously by dragging a zoom-box on to the time chart 430 itself. The time range and the geographic extents of the selected events 20 can be used to set the bounds of the new view of the representation 18, including selected domain 400,402 view formats.

Referring again to FIGS. 13 and 27, the Fit control 919 of the timer slider and other controls 306 can be further subdivided into separate fit time and fit geography/space functions as performed by a fit module 700. For example, with a single click via the controls 306, for the fit to geography function the fit module 700 can instruct the visualization manager 300 to zoom in to user selected objects 20,21,22,23,24 (i.e. visual elements 410) and/or connection elements 412 (see FIG. 17) in both/either space (FG) and/or time (FT), as displayed in a re-rendered "fit" version of the representation 18. For example, for fit to geography, after the user has selected places, targets and/or events (i.e. elements 410,412) from the representation 18, the fit module 700 instructs the visualization manager 300 to reduce/expand the displayed map of the representation 18 to only the geographic area that includes those selected elements 410,412. If nothing is selected, the map is fitted to the entire data set (i.e. all geographic areas) included in the representation 18. For example, for fit to time, after the user has selected places, targets and/or events (i.e. elements 410,412) from the representation 18, the fit module 700 instructs the visualization manager 300 to reduce/expand the past portion of the timeline(s) 422 to encompass only the period that includes the selected visual elements 410,412. Further, the fit module 700 can instruct the visualization manager 300 to adjust the display of the browse time slider as moved to the end of the period containing the selected visual elements 410,412 and the future portion of the timeline 422 can account for the same proportion of the visible timeline 422 as it did before the timeline(s) 422 were "time fitted". If nothing is selected, the timeline is fitted to the entire data set (i.e. all temporal areas) included in the representation 18. Further, it is recognized, for both Fit to Geography and Fit to Timeline, if only targets are selected, the fit module 700 coordinates the display of the map/timeline to fit to the targets' entire set of events. Further for example, if a target is selected in addition to events, only those events selected are used in the fit calculation of the fit module 700.

Association Analysis Tools

Referring to FIGS. 1 and 3, an association analysis module 307 has functions that have been developed that take advantage of the association-based connections between Events, Entities and Locations. These functions 307 are used to find groups of connected objects 14 during analysis. The associations 16 connect these basic objects 20, 22, 24 into complex groups 27 (see FIGS. 6 and 7) representing actual occurrences. The functions are used to follow the associations 16 from object 14 to object 14 to reveal connections between objects 14 that are not immediately apparent. Association analysis functions are especially useful in analysis of large data sets where an efficient method to find and/or filter connected groups is desirable. For example, an Entity 24 maybe be involved in events 20 in a dozen places/locations 22, and each of those events 20 may involve other Entities 24. The association analysis function 307 can be used to display only those locations 22 on the visualization representation 18 that the entity 24 has visited or entities 24 that have been contacted.

The analysis functions A,B,C,D provide the user with different types of link analysis that display connections between 14 of interest, such as but limited to:

1. Expanding Search A, e.g. a Link Analysis Tool

The expanding search function A of the module 307 allows the user to start with a selected object(s) 14 and then incrementally show objects 14 that are associated with it by increasing degrees of separation. The user selects an object 14 or group of objects 14 of focus and clicks on the Expanding search button 920 this causes everything in the visualization representation 18 to disappear except the selected items. The user then increments the search depth (e.g. via an appropriate depth slider control) and objects 14 connected by the specified depth are made visible the display. In this way, sets of connected objects 14 are revealed as displayed using the visual elements 410 and 412.

Accordingly, the function A of the module 307 displays all objects 14 in the representation 18 that are connected to a selected object 14, within the specified range of separation. The range of separation of the function A can be selected by the user using the I/O interface 108, using a links slider 730 in a dialog window (see FIG. 31*a*). For example, this link analysis can be performed when a single place 22, target 24 or event 20 is first selected. An example operation of the depth slider is as follows, when the function A is first selected via the I/O interface 108, a dialog opens, and the links slider is initially set to 0 and only the selected object 14 is displayed in the representation 18. Using the slider (or entry field), when the links slider is moved to 1, any object 14 directly linked (i.e. 1 degree of separation such as all elementary events 20) to the initially selected object 14 appears on the representation 18 in addition to the initially selected object 14. As the links slider is positioned higher up the slider scale, additional connected objects are added at each level to the representation 18, until all objects connected to the initially selected object 14 are displayed.

2. Connection Search B, e.g. a Join Analysis Tool

The Connection Search function B of the module 307 allows the user to connect any pair of objects 14 by their web of associations 26. The user selects any two objects 14 and clicks on the Connection Search function B. The connection search function B works by automatically scanning the extents of the web of associations 26 starting from one of the initially selected objects 14 of the pair. The search will continue until the second object 14 is found as one of the connected objects 14 or until there are no more connected objects 14. If a path of associated objects 14 between the target objects 14 exists, all of the objects 14 along that path are displayed and the depth is automatically displayed showing the minimum number of links between the objects 14.

Accordingly, the Join Analysis function B looks for and displays any specified connection path between two selected objects 14. This join analysis is performed when two objects 14 are selected from the representation 18. It is noted that if the two selected objects 14 are not connected, no events 20 are displayed and the connection level is set to zero on the display 202 (see FIG. 1). If the paired objects 14 are connected, the shortest path between them is automatically displayed, for example. It is noted that the Join Analysis function B can be generalized for three or more selected objects 14 and their connections. An example operation of the Join Analysis function B is a selection of the targets 24 Alan and Rome. When the dialog opens, the number of links 732 (e.g. 4—which is user adjustable—see FIG. 31*b*) required to make a connection between the two targets 24 is displayed to the user, and only the objects 14 involved in that connection (having 4 links) are visible on the representation 18.

3. A Chain Analysis Tool C

The Chain Analysis Tool C displays direct and/or indirect connections between a selected target 24 and other targets 24. For example, in a direct connection, a single event 20 connects target A and target B (who are both on the terrain 400). In an indirect connection, some number of events 20 (chain) connect A and B, via a target C (who is located off the terrain 400 for example). This analysis C can be performed with a single initial target 24 selected. For example, the tool C can be associated with a chaining slider 736—see FIG. 31*c* (accessed via the I/O interface 108) with the selections of such as but not limited to direct, indirect, and both. For example, the target TOM is first selected on the representation 18 and then when the target chaining slider is set to Direct, the targets ALAN and PARENTS are displayed, along with the events that cause TOM to be directly connected to them. In the case where TOM does not have any indirect target 24 connections, so moving the slider to Both and to Indirect does not change the view as generated on the representation 18 for the Direct chaining slider setting.

4. A Move Analysis Tool D

This tool D finds, for a single target 24, all sets of consecutive events 20, that are located at different places 22 that happened within the specific time range of the temporal domain 402. For example, this analysis of tool D may be performed with a single target 24 selected from the representation 18. In example operation of the tool D, the initial target 24 is selected, when a slider 736 opens, the time range slider 736 is set to one Year and quite a few connected events 20 may be displayed on the representation 18, which are connected to the initially selected target 24. When the slider 736 selection is changed to the unit type of one Week, the number of events 20 displayed will drop accordingly. Similarly, as the time range slider 736 is positioned higher, the number of events 20 are added to the representation 18 as the time range increases.

It is recognized that the functions of the module 307 can be used to implement filtering via such as but not limited to criteria matching, algorithmic methods and/or manual selection of objects 14 and associations 16 using the analytical properties of the tool 12. This filtering can be used to highlight/hide/show (exclusively) selected objects 14 and associations 16 as represented on the visual representation 18. The functions are used to create a group (subset) of the objects 14 and associations 16 as desired by the user through the specified criteria matching, algorithmic methods and/or manual selection. Further, it is recognized that the selected group of objects 14 and associations 16 could be assigned a specific name, which is stored in the table 122.

Operation of Visual Tool to Generate Visualization Representation

Figure 14:
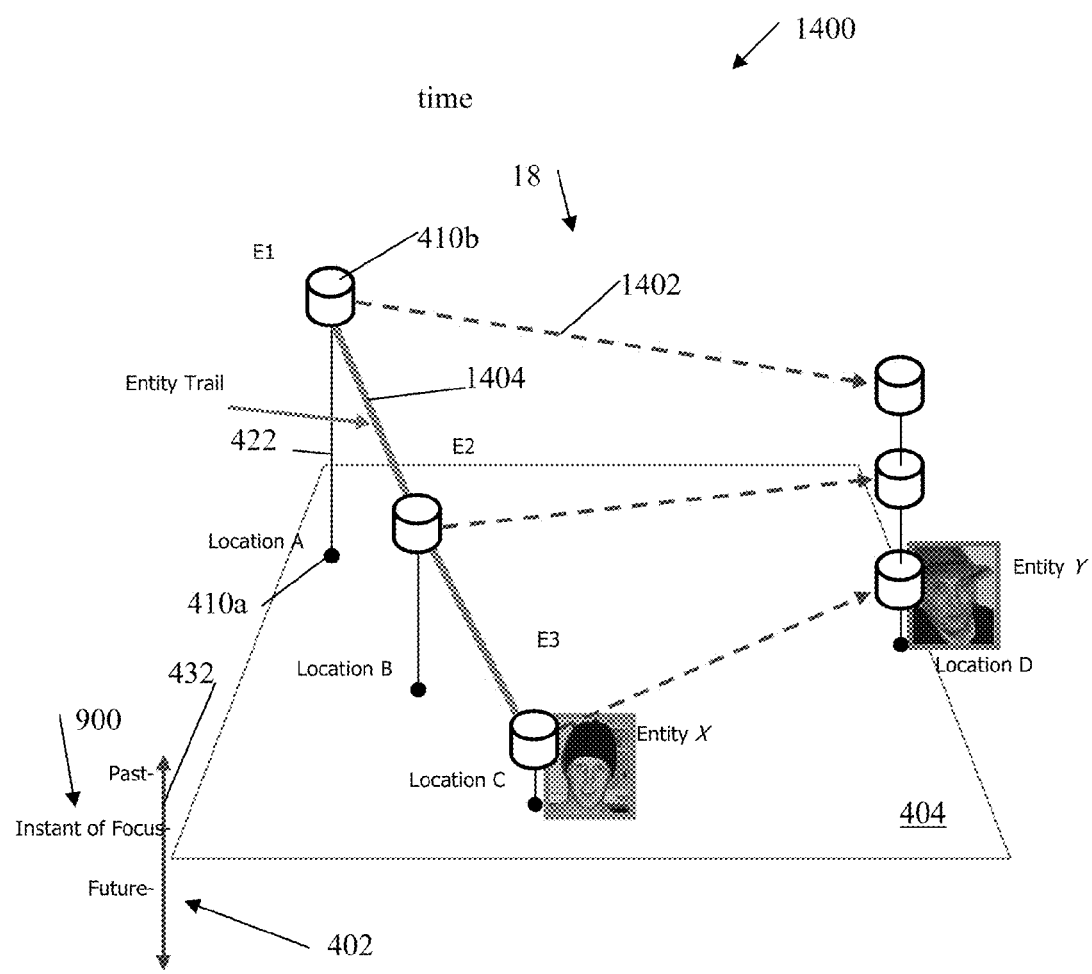
FIG. 14 shows an example operation of the tool of FIG. 3.

Referring to FIG. 14, example operation 1400 shows communications 1402 and movement events 1404 (connection visual elements 412—see FIGS. 6 and 7) between Entities "X" and "Y" over time on the visualization representation 18. This FIG. 14 shows a static view of Entity X making three phone call communications 1402 to Entity Y from 3 different locations 410a at three different times. Further, the movement events 1404 are shown on the visualization representation 18 indicating that the entity X was at three different locations 410a (location A,B,C), which each have associated timelines 422. The timelines 422 indicate by the relative distance (between the elements 410b and 410a) of the events (E1,E2,E3) from the instant of focus 900 of the reference surface 404 that these communications 1404 occurred at different times in the time dimension 432 of the temporal domain 402. Arrows on the communications 1402 indicate the direction of the communications 1402, i.e. from entity X to entity Y. Entity Y is shown as remaining at one location 410a (D) and receiving the communications 1402 at the different times on the same timeline 422.

Figure 15:
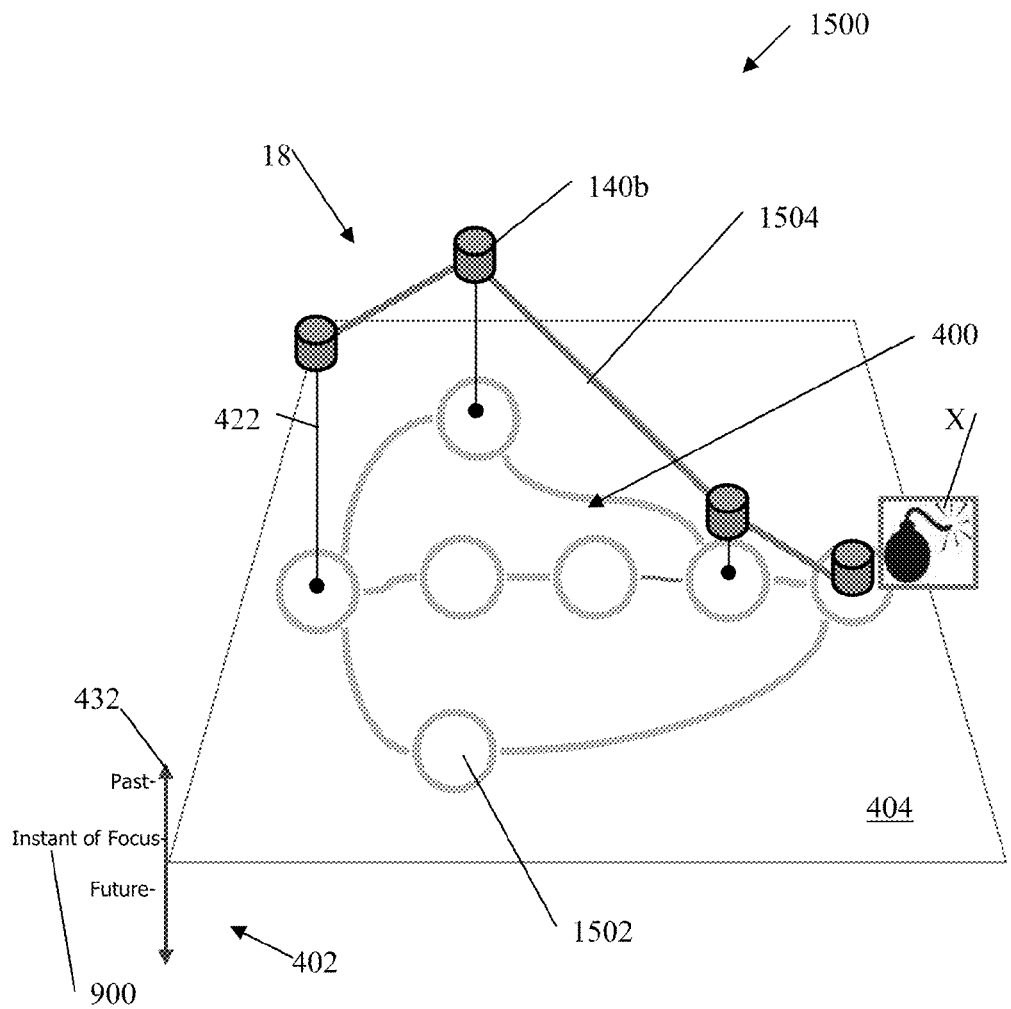
FIG. 15 shows a further example operation of the tool of FIG. 3.

Referring to FIG. 15, example operation 1500 for shows Events 140b occurring within a process diagram space domain 400 over the time dimension 432 on the reference surface 404. The spatial domain 400 represents nodes 1502 of a process. This FIG. 14 shows how a flowchart or other graphic process can be used as a spatial context for analysis. In this case, the object (entity) X has been tracked through the production process to the final stage, such that the movements 1504 represent spatial connection elements 412 (see FIGS. 6 and 7).

Figure 19:
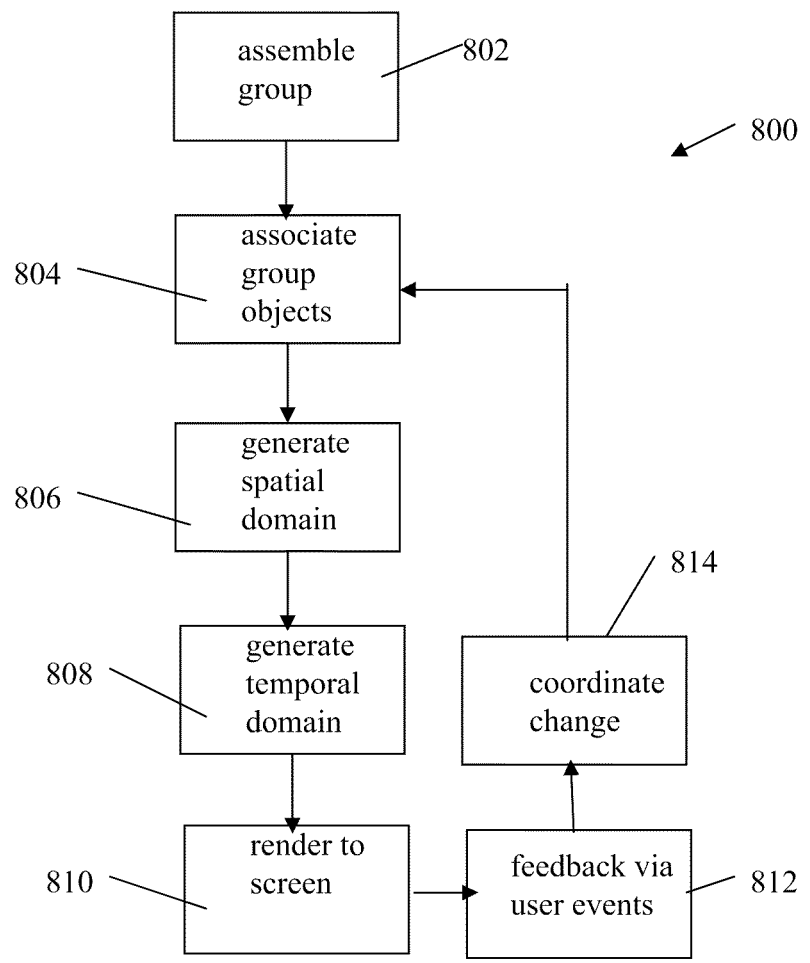
FIG. 19 is an example operation of the visualization tool of FIG. 3.
Figure 20:
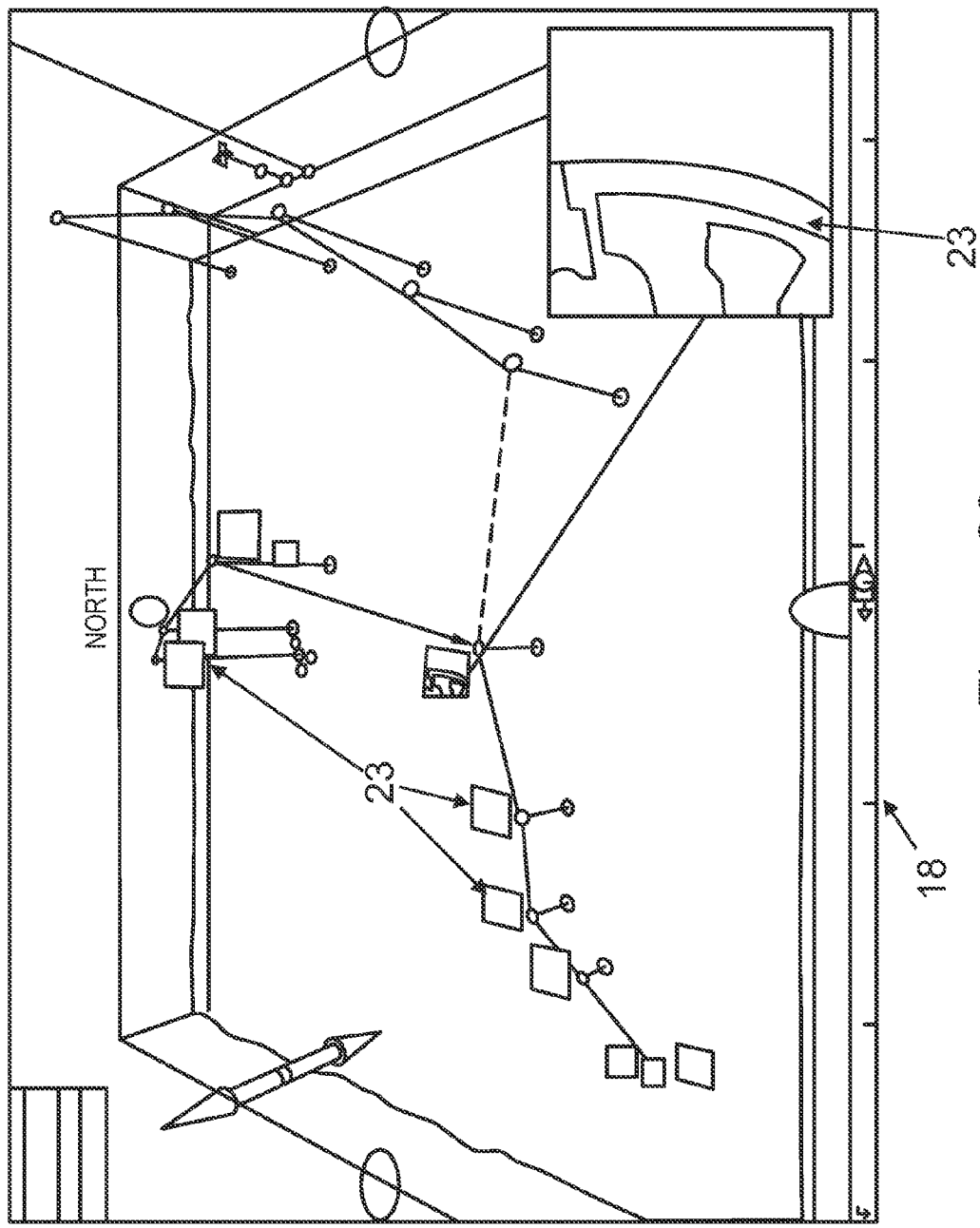
FIG. 20 is a further embodiment of FIG. 18 showing imagery.

Referring to FIGS. 3 and 19, operation 800 of the tool 12 begins by the manager 300 assembling 802 the group of objects 14 from the tables 122 via the data manager 114. The selected objects 14 are combined 804 via the associations 16, including assigning the connection visual element 412 (see FIGS. 6 and 7) for the visual representation 18 between selected paired visual elements 410 corresponding to the selected correspondingly paired data elements 14 of the group. The connection visual element 412 represents a distributed association 16 in at least one of the domains 400, 402 between the two or more paired visual elements 410. For example, the connection element 412 can represent movement of the entity object 24 between locations 22 of interest on the reference surface 404, communications (money transfer, telephone call, email, etc. . . . ) between entities 24 different locations 22 on the reference surface 404 or between entities 24 at the same location 22, or relationships (e.g. personal, organizational) between entities 24 at the same or different locations 22.

Next, the manager 300 uses the visualization components 308 (e.g. sprites) to generate 806 the spatial domain 400 of the visual representation 18 to couple the visual elements 410 and 412 in the spatial reference frame at various respective locations 22 of interest of the reference surface 404. The manager 300 then uses the appropriate visualization components 308 to generate 808 the temporal domain 402 in the visual representation 18 to include various timelines 422 associated with each of the locations 22 of interest, such that the timelines 422 all follow the common temporal reference frame. The manager 112 then takes the input of all visual elements 410, 412 from the components 308 and renders them 810 to the display of the user interface 202. The manager 112 is also responsible for receiving 812 feedback from the user via user events 109 as described above and then coordinating 814 with the manager 300 and components 308 to change existing and/or create (via steps 806, 808) new visual elements 410, 412 to correspond to the user events 109. The modified/new visual elements 410, 412 are then rendered to the display at step 810.

Referring to FIG. 16, an example operation 1600 shows animating entity X movement between events (Event 1 and Event 2) during time slider 901 interactions via the selector 912. First, the Entity X is observed at Location A at time t. As the slider selector 912 is moved to the right, at time t+1 the Entity X is shown moving between known locations (Event1 and Event2). It should be noted that the focus 900 of the reference surface 404 changes such that the events 1 and 2 move along their respective timelines 422, such that Event 1 moves from the future into the past of the temporal domain 402 (from above to below the reference surface 404). The length of the timeline 422 for Event 2 (between the Event 2 and the location B on the reference surface 404 decreases accordingly. As the slider selector 912 is moved further to the right, at time t+2, Entity X is rendered at Event2 (Location B). It should be noted that the Event 1 has moved along its respective timeline 422 further into the past of the temporal domain 402, and event 2 has moved accordingly from the future into the past of the temporal domain 402 (from above to below the reference surface 404), since the representation of the events 1 and 2 are linked in the temporal domain 402. Likewise, the entity X is linked spatially in the spatial domain 400 between event 1 at location A and event 2 at location B. It is also noted that the Time Slider selector 912 could be dragged along the time slider 910 by the user to replay the sequence of events from time t to t+2, or from t+2 to t, as desired.

Referring to FIG. 27, a further feature of the tool 12 is a target tracing module 722, which takes user input from the I/O interface 108 for tracing of a selected target/entity 24 through associated events 20. For example, the user of the tool 12 selects one of the events 20 from the representation 18 associated with one or more entities/target 24, whereby the module 722 provides for a selection icon to be displayed adjacent to the selected event 20 on the representation 18. Using the interface 108 (e.g. up/down arrows), the user can navigate the representation 18 by scrolling back and forward (in terms of time and/or geography) through the events 20 associated with that target 24, i.e. the display of the representation 18 adapts as the user scrolls through the time domain 402, as described already above. For example, the display of the representation 18 moves between consecutive events 20 associated with the target 24. In an example implementation of the I/O interface 108, the Page Up key moves the selection icon upwards (back in time) and the Page Down key moves the selection icon downwards (forward in time), such that after selection of a single event 20 with an associated target 24, the Page Up keyboard key would move the selection icon to the next event 20 (back in time) on the associated target's trail while selecting the Page Down key would return the selection icon to the first event 20 selected. The module 722 coordinates placement of the selection icon at consecutive events 20 connected with the associated target 24 while skipping over those events 20 (while scrolling) not connected with the associated target 24.

Figure 17:
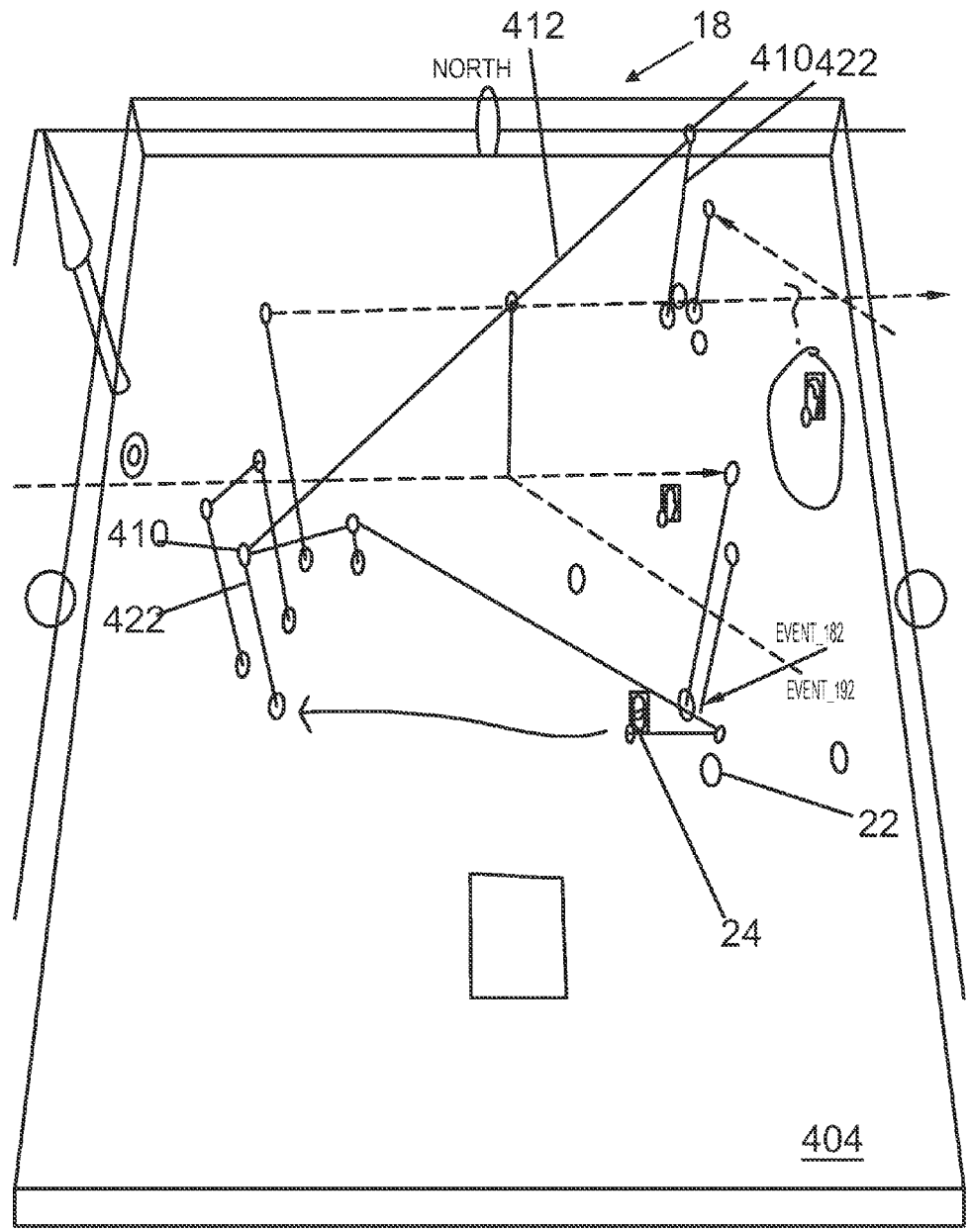
FIG. 17 shows an example visualization representation of FIG. 4 containing events and target tracking over space and time showing connections between events.

Referring to FIG. 17, the visual representation 18 shows connection visual elements 412 between visual elements 410 situated on selected various timelines 422. The timelines 422 are coupled to various locations 22 of interest on the geographical reference frame 404. In this case, the elements 412 represent geographical movement between various locations 22 by entity 24, such that all travel happened at some time in the future with respect to the instant of focus represented by the reference plane 404.

Figure 18:
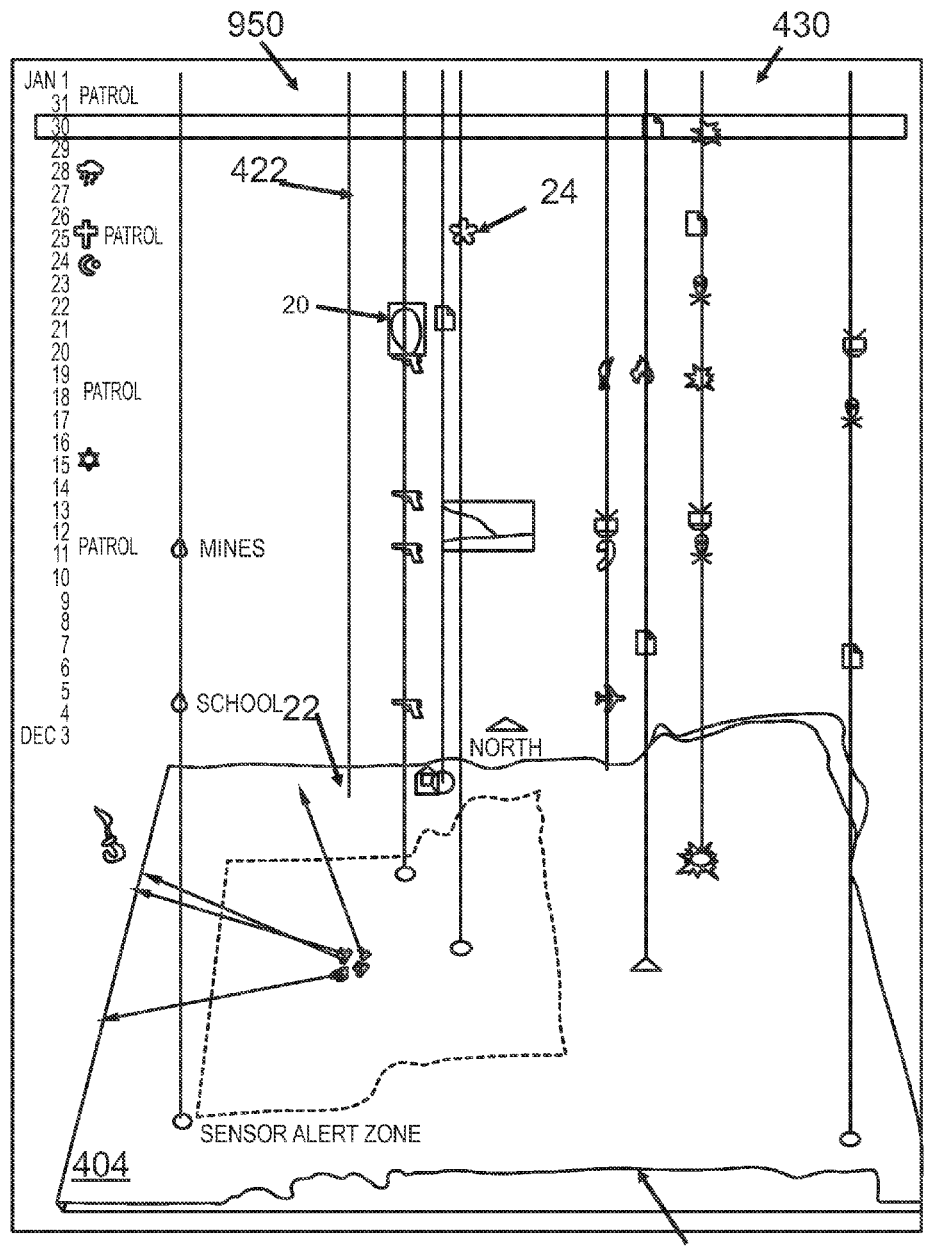
FIG. 18 shows an example visualization representation containing events and target tracking over space and time showing connections between events on a time chart of FIG. 11.

Referring to FIG. 18, the spatial domain 400 is shown as a geographical relief map. The timechart 430 is superimposed over the spatial domain of the visual representation 18, and shows a time period spanning from December $3^{rd}$ to January $1^{st}$ for various events 20 and entities 24 situated along various timelines 422 coupled to selected locations 22 of interest. It is noted that in this case the user can use the presented visual representation to coordinate the assignment of various connection elements 412 to the visual elements 410 (see FIG. 6) of the objects 20, 22, 24 via the user interface 202 (see FIG. 1), based on analysis of the displayed visual representation 18 content. A time selection 950 is January 30, such that events 20 and entities 24 within the selection box can be further analysed. It is recognised that the time selection 950 could be used to represent the instant of focus 900 (see FIG. 9).

Aggregation Module 600

Referring to FIG. 3, an Aggregation Module 600 is for, such as but not limited to, summarizing or aggregating the data objects 14, providing the summarized or aggregated data objects 14 to the Visualization Manager 300 which processes the translation from data objects 14 and group of data elements 27 to the visual representation 18, and providing the creation of summary charts 200 (see FIG. 26) for displaying information related to summarised/aggregated data objects 14 as the visual representation 18 on the display 108.

Figure 22:
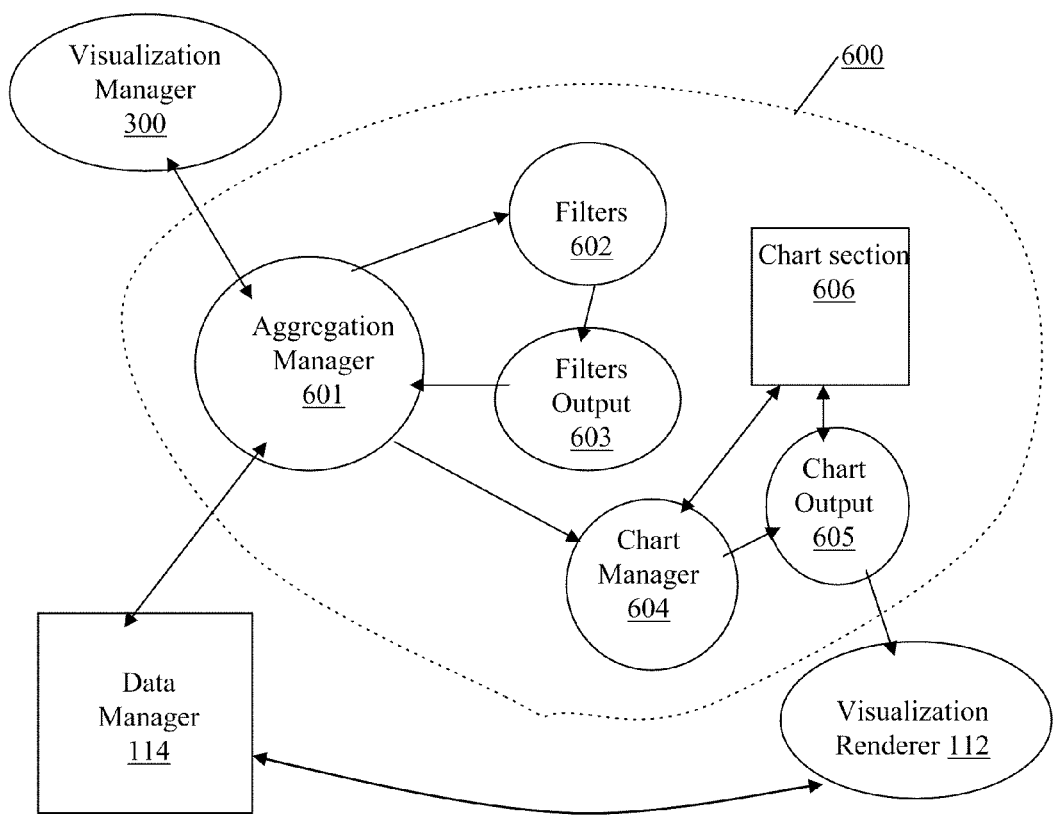
FIG. 22 shows further detail of the aggregation module of FIG. 3.

Referring to FIGS. 3 and 22, the spatial inter-connectedness of information over time and geography within a single, highly interactive 3-D view of the representation 18 is beneficial to data analysis (of the tables 122). However, when the number of data objects 14 increases, techniques for aggregation become more important. Many individual locations 22 and events 20 can be combined into a respective summary or aggregated output 603. Such outputs 603 of a plurality of individual events 20 and locations 22 (for example) can help make trends in time and space domains 400, 402 more visible and comparable to the user of the tool 12. Several techniques can be implemented to support aggregation of data objects 14 such as but not limited to techniques of hierarchy of locations, user defined geo-relations, and automatic LOD level selection, as further described below. The tool 12 combines the spatial and temporal domains 400, 402 on the display 108 for analysis of complex past and future events within a selected spatial (e.g. geographic) context.

Figure 23:
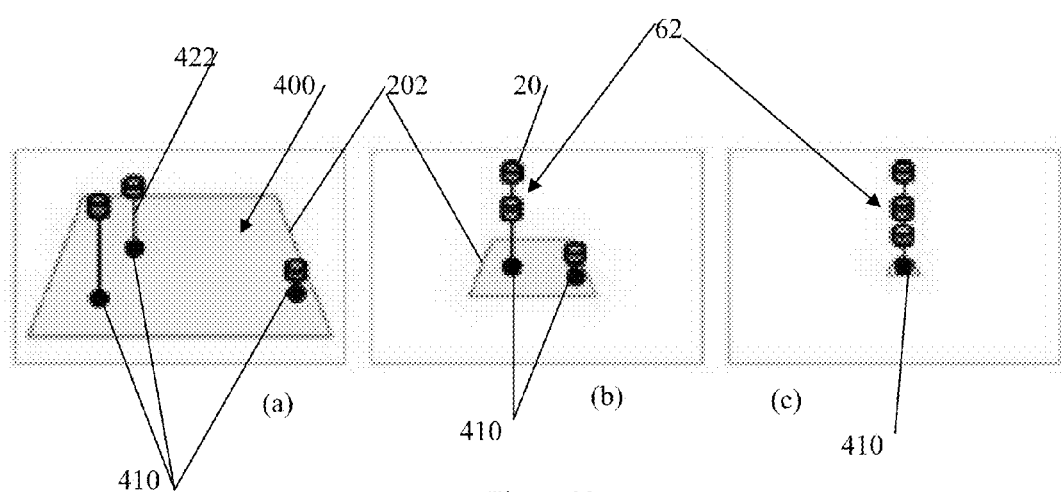
FIG. 23 shows an example aggregation result of the module of FIG. 22.
Figure 24:
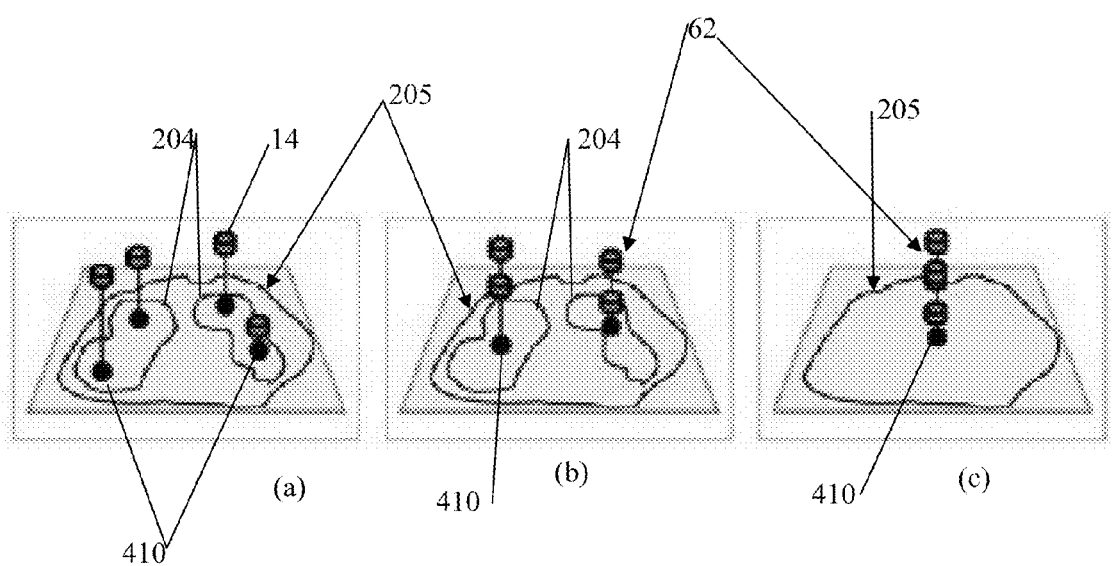
FIG. 24 is a further embodiment of the result of FIG. 23.

Referring to FIG. 22, the Aggregation Module 600 has an Aggregation Manager 601 that communicates with the Visualization Manager 300 for receiving aggregation parameters used to formulate the output 603 as a pattern aggregate 62 (see FIGS. 23, 24). The parameters can be either automatic (e.g. tool pre-definitions) manual (entered via events 109) or a combination thereof. The manager 601 accesses all possible data objects 14 through the Data Manager 114 (related to the aggregation parameters—e.g. time and/or spatial ranges and/or object 14 types/combinations) from the tables 122, and then applies aggregation tools or filters 602 for generating the output 603. The Visualization Manager 300 receives the output 603 from the Aggregation Manager 601, based on the user events 109 and/or operation of the Time Slider and other Controls 306 by the user for providing the aggregation parameters. As described above, once the output 603 is requested by the Visualization Manager 114, the Aggregation Manager 601 communicates with the Data Manager 114 access all possible data objects 14 for satisfying the most general of the aggregation parameters and then applies the filters 602 to generate the output 603. It is recognised however, that the filters 602 could be used by the manager 601 to access only those data objects 14 from the tables 122 that satisfy the aggregation parameters, and then copy those selected data objects 14 from the tables 122 for storing/mapping as the output 603.

Accordingly, the Aggregation Manager 601 can make available the data elements 14 to the Filters 602. The filters 602 act to organize and aggregate (such as but not limited to selection of data objects 14 from the global set of data in the tables 122 according to rules/selection criteria associated with the aggregation parameters) the data objects 14 according the instructions provided by the Aggregation Manager 601. For example, the Aggregation Manager 601 could request that the Filters 602 summarize all data objects 14 with location data 22 corresponding to Paris to compose the pattern aggregate 62. Or, in another example, the Aggregation Manager 601 could request that the Filters 602 summarize all data objects 14 with event data 20 corresponding to Wednesdays to compose the pattern aggregate 62. Once the data objects 14 are selected by the Filters 602, the aggregated data is summarised as the output 603. The Aggregation Manager 601 then communicates the output 603 to the Visualization Manager 300, which processes the translation from the selected data objects 14 (of the aggregated output 603) for rendering as the visual representation 18 to include these to compose the pattern aggregates 62. It is recognised that the content of the representation 18 is modified to display the output 603 to the user of the tool 12, according to the aggregation parameters.

Further, the Aggregation Manager 601 provides the aggregated data objects 14 of the output 603 to a Chart Manager 604. The Chart Manager 604 compiles the data in accordance with the commands it receives from the Aggregation Manager 601 and then provides the formatted data to a Chart Output 605. The Chart Output 605 provides for storage of the aggregated data in a Chart section 606 of the display (see FIG. 25). Data from the Chart Output 605 can then be sent directly to the Visualization Renderer 112 or to the visualisation manager 300 for inclusion in the visual representation 18, as further described below.

Referring to FIG. 23, an example aggregation of data objects 14 as the pattern aggregate 62 by the Aggregation Module 601 is shown. The event data 20 (for example) is aggregated according to spatial proximity (threshold) of the data objects 14 with respect to a common point (e.g. particular location 410 or other newly specified point of the spatial domain 400), difference threshold between two adjacent locations 410, or other spatial criteria as desired. For example, as depicted in FIG. 23a, the three data objects 20 at three locations 410 are aggregated to two objects 20 at one location 410 and one object at another location 410 (e.g. combination of two locations 410) as a user-defined field 202 of view is reduced in FIG. 23b, and ultimately to one location 410 with all three objects 20 in FIG. 23c. It is recognised in this example of aggregated output 603 that timelines 422 of the locations 410 are combined as dictated by the aggregation of locations 410.

For example, the user may desire to view an aggregate of data objects 14 related within a set distance of a fixed location, e.g., aggregate of events 20 occurring within 50 km of the Golden Gate Bridge. To accomplish this, the user inputs their desire to aggregate the data according to spatial proximity, by use of the controls 306, indicating the specific aggregation parameters. The Visualization Manager 300 communicates these aggregation parameters to the Aggregation Module 600, in order for filtering of the data content of the representation 18 shown on the display 108. The Aggregation Module 600 uses the Filters 602 to filter the selected data from the tables 122 based on the proximity comparison between the locations 410. In another example, a hierarchy of locations can be implemented by reference to the association data 26 which can be used to define parent-child relationships between data objects 14 related to specific locations within the representation 18. The parent-child relationships can be used to define superior and subordinate locations that determine the level of aggregation of the output 603.

Referring to FIG. 24, an example aggregation of data objects 14 to compose the pattern aggregate 62 by the Aggregation Module 601 is shown. The data 14 is aggregated according to defined spatial boundaries 204. To accomplish this, the user inputs their desire to aggregate the data 14 according to specific spatial boundaries 204, by use of the controls 306, indicating the specific aggregation parameters of the filtering 602. For example, a user may wish to aggregate all event 20 objects located within the city limits of Toronto. The Visualization Manager 300 then requests to the Aggregation Module 600 to filter the data objects 14 of the current representation according to the aggregation parameters. The Aggregation Module 600 provides implements or otherwise applies the filters 602 to filter the data based on a comparison between the location data objects 14 and the city limits of Toronto, for generating the aggregated output 603 as the pattern aggregate 62. In FIG. 24*a*, within the spatial domain 205 the user has specified two regions of interest 204, each containing two locations 410 with associated data objects 14. In FIG. 24*b*, once filtering has been applied, the locations 410 of each region 204 have been combined such that now two locations 410 are shown with each having the aggregated result (output 603) of two data objects 14 respectively. In FIG. 24*c*, the user has defined the region of interest to be the entire domain 205, thereby resulting in the displayed output 603 of one location 410 with three aggregated data objects 14 (as compared to FIG. 24*a*). It is noted that the positioning of the aggregated location 410 is at the center of the regions of interest 204, however other positioning can be used such as but not limited to spatial averaging of two or more locations 410 or placing aggregated object data 14 at one of the retained original locations 410, or other positioning techniques as desired.

In addition to the examples in illustrated in FIGS. 21 and 22, the aggregation of the data objects can be accomplished automatically based on the geographic view scale provided in the visual representations. Aggregation can be based on level of detail (LOD) used in mapping geographical features at various scales. On a 1:25,000 map, for example, individual buildings may be shown, but a 1:500,000 map may show just a point for an entire city. The aggregation module 600 can support automatic LOD aggregation of objects 14 based on hierarchy, scale and geographic region, which can be supplied as aggregation parameters as predefined operation of the controls 306 and/or specific manual commands/criteria via user input events 109. The module 600 can also interact with the user of the tool 12 (via events 109) to adjust LOD behaviour to suit the particular analytical task at hand.

Figure 28:
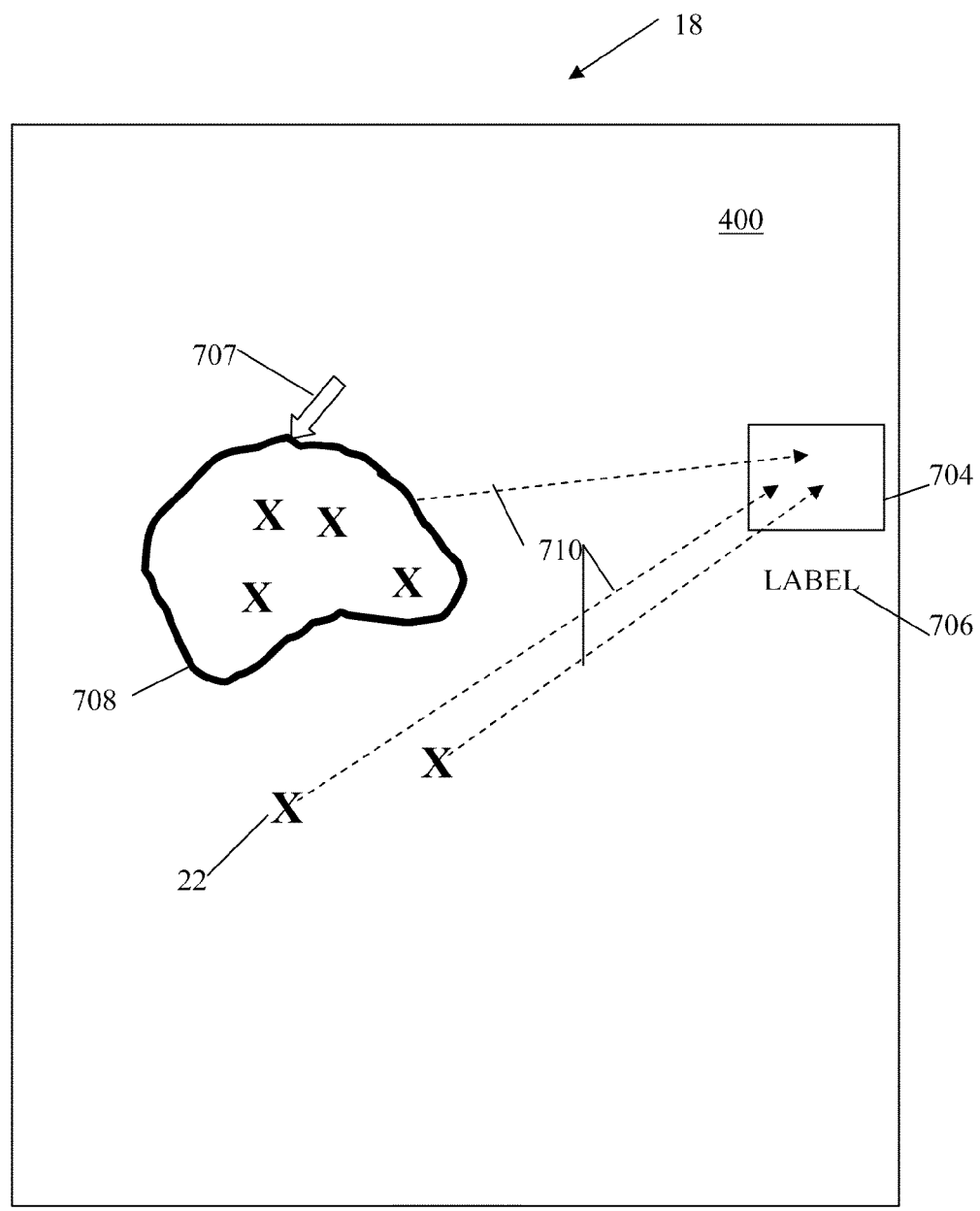
FIG. 28 shows an example operation of the tool of FIG. 27.

Referring to FIG. 27 and FIG. 28, the aggregation module 600 can also have a place aggregation module 702 for assigning visual elements 410,412 (e.g. events 20) of several places/locations 22 to one common aggregation location 704, for the purpose of analyzing data for an entire area (e.g. a convoy route or a county). It is recognised that the place aggregation function can be turned on and off for each aggregation location 704, so that the user of the tool 12 can analyze data with and without the aggregation(s) active. For example, the user creates the aggregation location 704 in a selected location of the spatial domain 400 of the representation 18. The user then gives the created aggregation location 704 a label 706 (e.g. North America). The user then selects a plurality of locations 22 from the representation, either individually or as a group using a drawing tool 707 to draw around all desired locations 22 within a user defined region 708. Once selected, the user can drag or toggle the selected regions 708 and individual locations 22 to be included in the created aggregation location 704 by the aggregation module 702. The aggregation module 702 could instruct the visualization manager 300 to refresh the display of the representation 18 to display all selected locations 22 and related visual elements 410,412 in the created aggregation location 704. It is recognised that the aggregation module 702 could be used to configure the created aggregation location 704 to display other selected object types (e.g. entities 24) as a displayed group. In the case of selected entities 24, the created aggregation location 704 could be labelled the selected entities' name and all visual elements 410,412 associated with the selected entity (or entities) would be displayed in the created aggregation location 704 by the aggregation module 702. It is recognised that the above-described same aggregation operation could be done for selected event 20 types, as desired.

Figure 25:
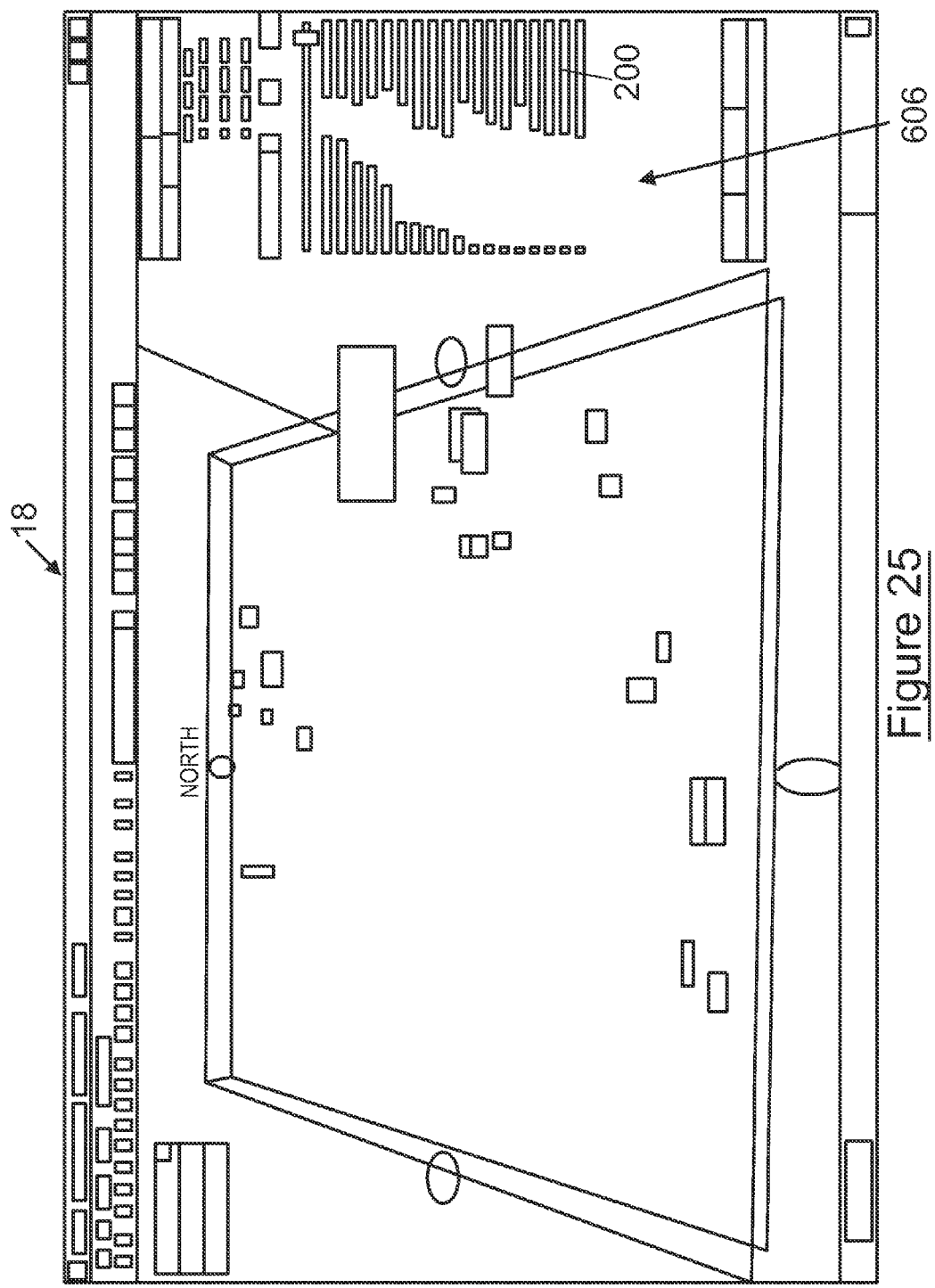
FIG. 25 shows a summary chart view of a further embodiment of the representation of FIG. 20.

Referring to FIG. 25, an example of a spatial and temporal visual representation 18 with summary chart 200 depicting event data 20 is shown. For example, a user may wish to see the quantitative information relating to a specific event object. The user would request the creation of the chart 200 using the controls 306, which would submit the request to the Visualization Manager 300. The Visualization Manager 300 would communicate with the Aggregation Module 600 and instruct the creation of the chart 200 depicting all of the quantitative information associated with the data objects 14 associated with the specific event object 20, and represent that on the display 108 (see FIG. 2) as content of the representation 18. The Aggregation Module 600 would communicate with the Chart Manager 604, which would list the relevant data and provide only the relevant information to the Chart Output 605. The Chart Output 605 provides a copy of the relevant data for storage in the Chart Comparison Module, and the data output is communicated from the Chart Output 605 to the Visualization Renderer 112 before being included in the visual representation 18. The output data stored in the Chart Comparison section 606 can be used to compare to newly created charts 200 when requested from the user. The comparison of data occurs by selecting particular charts 200 from the chart section 606 for application as the output 603 to the Visual Representation 18.

The charts 200 rendered by the Chart Manager 604 can be created in a number of ways. For example, all the data objects 14 from the Data Manager 114 can be provided in the chart 200. Or, the Chart Manager 604 can filter the data so that only the data objects 14 related to a specific temporal range will appear in the chart 200 provided to the Visual Representation 18. Or, the Chart Manager 604 can filter the data so that only the data objects 14 related to a specific spatial and temporal range will appear in the chart 200 provided to the Visual Representation 18.

Figure 30:
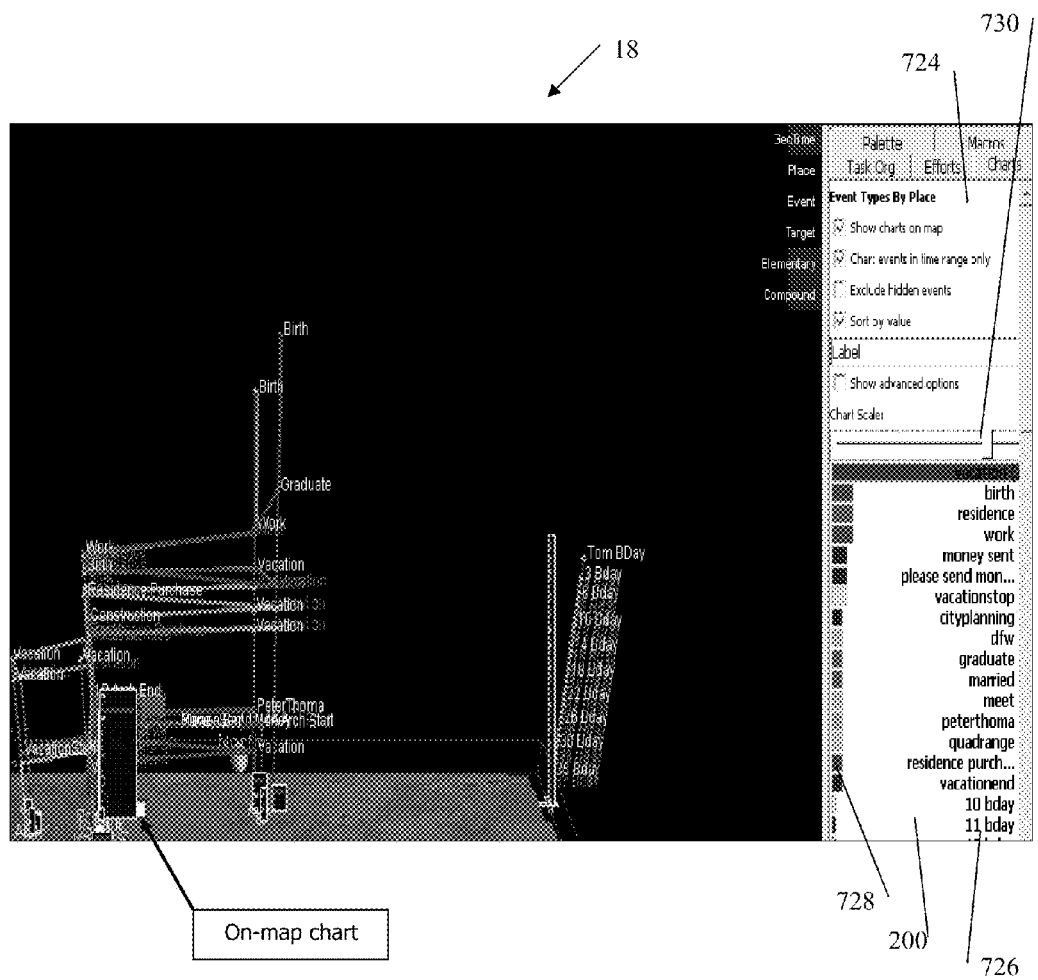
FIG. 30 is a further example of the charts of FIG. 25.
Figure 31A:
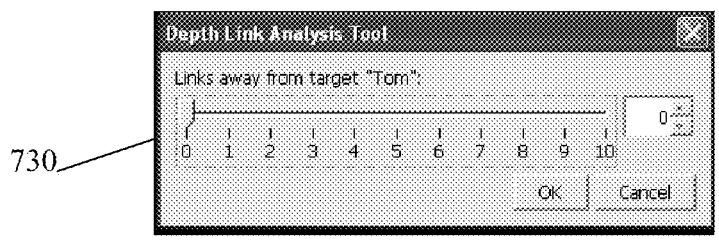
FIGS. 31a,b,c,d show example control sliders of analysis functions of the tool of FIG. 3.
Figure 31B:
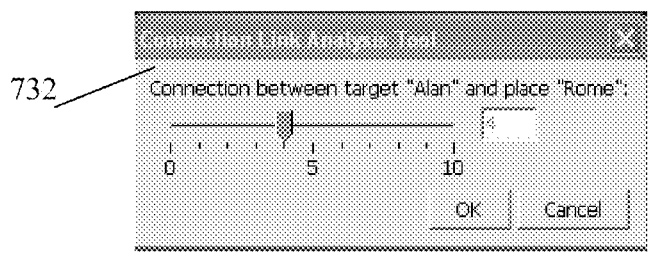
Figure 31C:
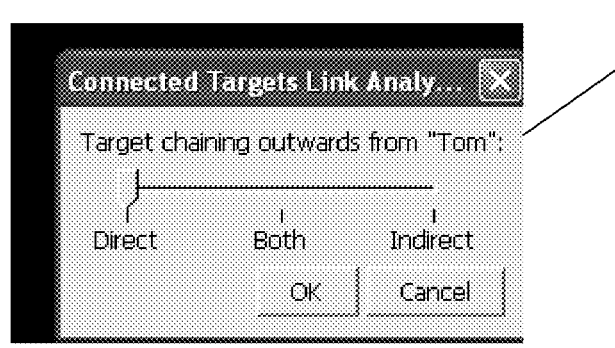
Figure 31D:
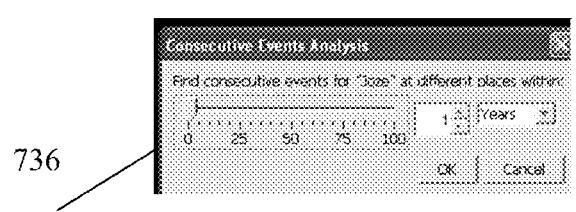

Referring to FIG. 30, a further embodiment of event aggregation charts 200 calculates and displays (both visually and numerically) the count objects by various classifications 726. When charts 200 are displayed on the map (e.g. on-map chart), one chart 200 is created for each place 22 that is associated with relevant events 20. Additional options become available by clicking on the colored chart bars 728 (e.g. Hide selected objects, Hide target). By default, the chart manager 604 (see FIG. 22) can assign colors to chart bars 728 randomly, except for example when they are for targets 24, in which case the chart manager 604 uses existing target 24 colors, for convenience. It is noted that a Chart scale slider 730 can be used to to increase or decrease the scale of on-map charts 200, e.g. slide right or left respectively. The chart manager 604 can generate the charts 200 based on user selected options 724, such as but not limited to:

1) Show Charts on Map—presents a visual display on the map, one chart 200 for each place 22 that has relevant events 20;

2) Chart Events in Time Range Only—includes only events 20 that happened during the currently selected time range;

3) Exclude Hidden Events—excludes events 20 that are not currently visible on the display (occur within current time range, but are hidden);

4) Color by Event—when this option is turned on, event 20 color is used for any bar 728 that contains only events 20 of that one color. When a bar 728 contains events 20 of more than one color, it is displayed gray;

5) Sort by Value—when turned on, results are displayed in the Charts 200 panel, sorted by their value, rather than alphabetically; and 6) Show Advanced Options—gives access to additional statistical calculations.

Figure 26:
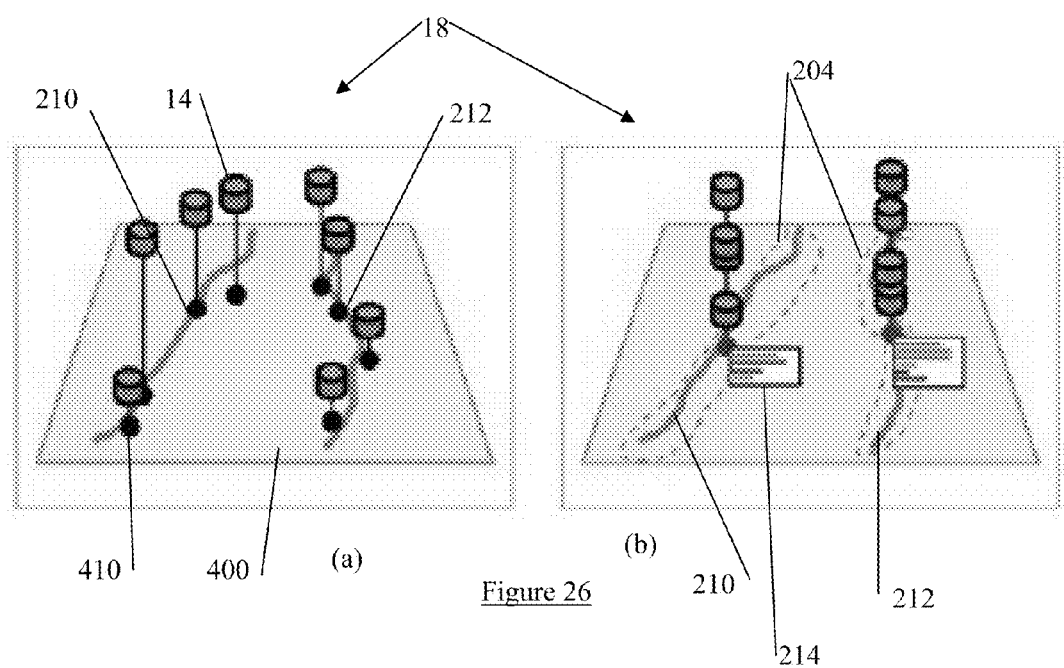
FIG. 26 shows an event comparison for the aggregation module of FIG. 23.

In a further example of the aggregation module 601, user-defined location boundaries 204 can provide for aggregation of data 14 across an arbitrary region. Referring to FIG. 26, to compare a summary of events along two separate routes 210 and 212, aggregation output 603 of the data 14 associated with each route 210,212 would be created by drawing an outline boundary 204 around each route 210,212 and then assigning the boundaries 204 to the respective locations 410 contained therein, as depicted in FIG. 26*a*. By the user adjusting the aggregation level in the Filters 602 through specification of the aggregation parameters of the boundaries 204 and associated locations 410, the data 14 is the aggregated as output 603 (see FIG. 26*b*) within the outline regions into the newly created locations 410, with the optional display of text 214 providing analysis details for those new aggregated locations 410. For example, the text 214 could summarise that the number of bad events 20 (e.g. bombings) is greater for route 210 than route 212 and therefore route 212 would be the route of choice based on the aggregated output 603 displayed on the representation 18.

It will be appreciated that variations of some elements are possible to adapt the invention for specific conditions or functions. The concepts of the present invention can be further extended to a variety of other applications that are clearly within the scope of this invention.

For example, one application of the tool 12 is in criminal analysis by the "information producer". An investigator, such as a police officer, could use the tool 12 to review an interactive log of events 20 gathered during the course of long-term investigations. Existing reports and query results can be combined with user input data 109, assertions and hypotheses, for example using the annotations 21. The investigator can replay events 20 and understand relationships between multiple suspects, movements and the events 20. Patterns of travel, communications and other types of events 20 can be analysed through viewing of the representation 18 of the data in the tables 122 to reveal such as but not limited to repetition, regularity, and bursts or pauses in activity.

Subjective evaluations and operator trials with four subject matter experts have been conducted using the tool 12. These initial evaluations of the tool 12 were run against databases of simulated battlefield events and analyst training scenarios, with many hundreds of events 20. These informal evaluations show that the following types of information can be revealed and summarised. What significant events happened in this area in the last X days? Who was involved? What is the history of this person? How are they connected with other people? Where are the activity hot spots? Has this type of event occurred here or elsewhere in the last Y period of time?

With respect to potential applications and the utility of the tool 12, encouraging and positive remarks were provided by military subject matter experts in stability and support operations. A number of those remarks are provided here. Preparation for patrolling involved researching issues including who, where and what. The history of local belligerent commanders and incidents. Tracking and being aware of history, for example, a ceasefire was organized around a religious calendar event. The event presented an opportunity and knowing about the event made it possible. In one campaign, the head of civil affairs had been there twenty months and had detailed appreciation of the history and relationships. Keeping track of trends. What happened here? What keeps happening here? There are patterns. Belligerents keep trying the same thing with new rotations [a rotation is typically six to twelve months tour of duty]. When the attack came, it did come from the area where many previous earlier attacks had also originated. The discovery of emergent trends . . . persistent patterns . . . sooner rather than later could be useful. For example, the XXX Colonel that tends to show up in an area the day before something happens. For every rotation a valuable knowledge base can be created, and for every rotation, this knowledge base can be retained using the tool 12 to make the knowledge base a valuable historical record. The historical record can include events, factions, populations, culture, etc.

Referring to FIG. 27, the tool 12 could also have a report generation module 720 that saves a JPG format screenshot (or other picture format), with a title and description (optional—for example entered by the user) included in the screenshot image, of the visual representation 18 displayed on the visual interface 202 (see FIG. 1). For example, the screenshot image could include all displayed visual elements 410,412, including any annotations 21 or other user generated analysis related to the displayed visual representation 18, as selected or otherwise specified by the user. A default mode could be all currently displayed information is captured by the report generation module 720 and saved in the screenshot image, along with the identifying label (e.g. title and/or description as noted above) incorporated as part of the screenshot image (e.g. superimposed on the lower right-hand corner of the image). Otherwise the user could select (e.g. from a menu) which subset of the displayed visual elements 410,412 (on a category/individual basis) is for inclusion by the module 720 in the screenshot image, whereby all non-selected visual elements 410,412 would not be included in the saved screenshot image. The screenshot image would then be given to the data manager 114 (see FIG. 3) for storing in the database 122. For further information detail of the visual representation 18 not captured in the screenshot image, a filename (or other link such as a URL) to the non-displayed information could also be superimposed on the screenshot image, as desired. Accordingly, the saved screenshot image can be subsequently retrieved and used as a quick visual reference for more detailed underlying analysis linked to the screenshot image. Further, the link to the associated detailed analysis could be represented on the subsequently displayed screenshot image as a hyperlink to the associated detailed analysis, as desired.

Visual Representation 18

Referring again to FIGS. 5, 6 and 7, shown are example visual representations 18 of events over time and space in an x, y, t space, as produced by the visualization tool 12. For example, in order to show that a particular entity 24 was present at a location 22 at a certain time, the entity 24 is paired with the event 20 which is in turn, attached to the location 22 present in the spatial domain 400. In all three Figures, there exists a temporal domain (shown as the days in the month in FIG. 5) 402, a spatial domain (showing the geographical locations) 400 and connectivity elements 412. Thus, the visualization tool 12 described above provides a visual analysis of entity 24 activities, movements, and relationships as they change over time. The output of the visualization tool 12 is the visual representation 18, as seen in FIG. 5 of the data objects 14 and associations 16 in a temporal-spatial display to show interconnecting stream of events 20 as they change over the range of time associated with the spatial domain 400. It is also recognized that stories 19 can be generated from data that represents diagrammatic domains 401 as well as data that represents geospatial domains 400, in view of interactions with the temporal domain 402, as desired. Although this analysis and tracking of events 20 in the time domain 402 and domain 400, 401 is useful in understanding certain behaviours, including relationships and patterns of the entities 24 over time, it is advantageous to provide visualization representations 18 that depict the events, characters and locations in a "story" format. The story 19 (see FIG. 32) would conceptualize the raw data provided by the data objects 14 (and/or associations 16) into a visual summary of the events 20 and entities 24 (for example) and will facilitate an analyst to conceptualize the sequence (e.g. story elements 17) of events and possibly an expected result, as further described below.

Stories 19

Figure 32:
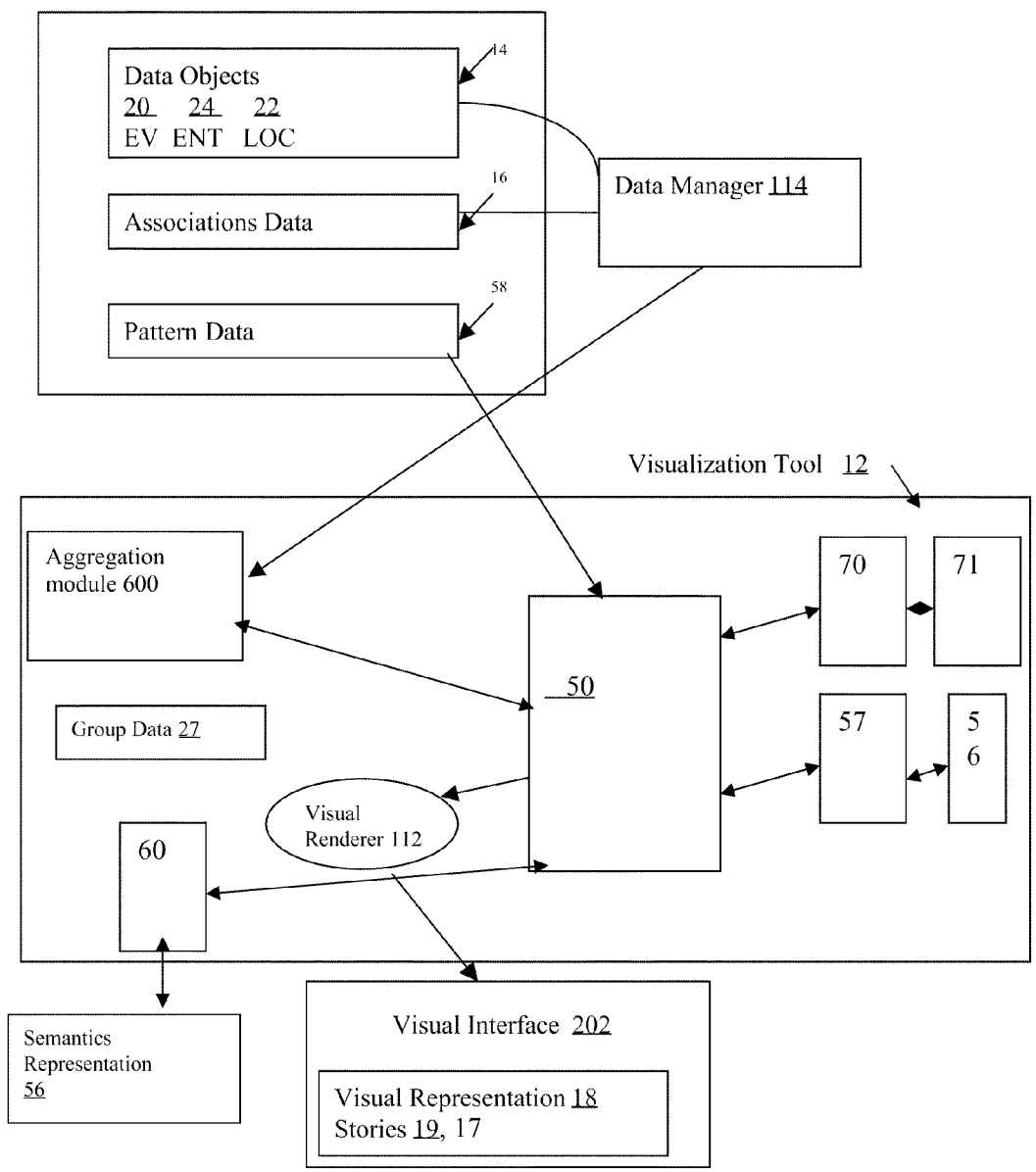
FIG. 32 shows a visualization tool for generating stories in the time and space domains.

Referring to FIGS. 1 and 32, a story 19 (also referred to as a story framework) is an abstraction for use by analysts to conceptualize connected data (e.g. data objects 14 and associations 16) as part of the analytical process, which offers a context for a connected collection of the data. Stories 19 are logical compositions of individual events 20, characters 24, locations 22 and sequences of these, for example. The tool 12 supports the display of this story 19 type of information, including story elements 17 identified and labeled as such in order to construct the story 19. The story elements 17 are used as containers for the story related evidence they describe, such that the visual form of the story elements 17 can be defined by their contents. Accordingly, the story elements 17 can include a plurality of detailed information accessible to the user (e.g. though a mouse-over click-on or other user event with respect to the selected story element 17), which is not immediately apparent by viewing the associated semantic representation 56 on the visual interface 202. For example, clicking on the semantic representations 56 in FIG. 37b would make available to the user the underlying detail of the data subset 15 (see FIG. 37a) associated with the semantic representations 56. This underlying detail could replace the semantic representation(s) 56 in the displayed story, could be displayed as a layer over the story, or could be displayed in a separate window or other version of the story, for example. The tool 12 is used to construct the story from raw data collections in memory 102, including aggregation/clustering, pattern recognition, association of semantic context to represent the phase of story building, and association of the recognized story elements 17 as hyperlinks with a story text as written description of the story 19 used for story telling.

Figure 33:
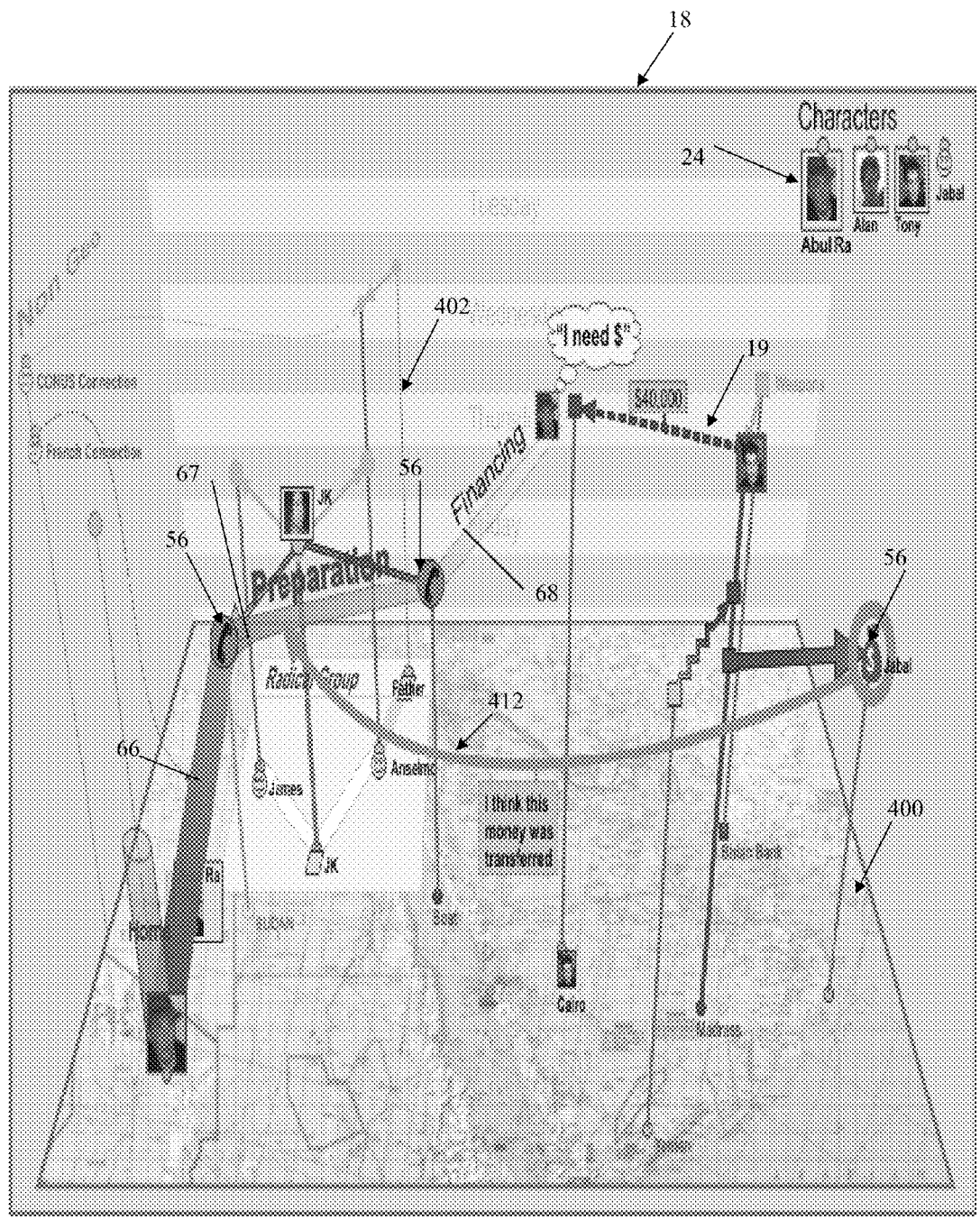
FIG. 33 shows an example of the visualization representation of FIG. 32.

Referring now to FIG. 33, shown are a plurality of semantic representations 56 that describe the events 20 within the figure. For example, a telephone icon is used as a visual element 410 to show telephone calls made between two parties or a money pouch symbol 56 to show the transfer of money. Note that FIG. 33 also shows several pattern aggregations shown as elements 66, 67 and 68. As illustrated in this figure, the display of pattern aggregates can be adjusted to represent amount of raw data objects 14 replaced. The pattern aggregation 66 has a relatively thicker connection element 412 than the pattern aggregate 67 and the pattern aggregate 68. In this example, the pattern aggregate 66 has been used to replace 20 data objects (i.e. 17 phone calls made over time involving 3 entities) while the pattern aggregate 67 replaces 10 data objects and the pattern aggregate 68 replaces 2 data objects. Thus, the pattern aggregates 66, 67, and 68 visually depict the amount of aggregation performed by the aggregation module 600, with or without the interaction of the pattern module 60 in identifying the patterns 61 (see FIG. 36).

From an analytical perspective, the story 19 is a logical, connected collection of characters 24, sequences of events 20 and relationships between characters, things and places over time. For example, referring to FIG. 33, shown is a visual representation 18 of the story 19 generated from a story generation module 50 of FIG. 32. The story 19 shows connecting visual elements 412 linking the sequence of events 20 involving entities 24 in the temporal-spatial domains 402, 400.

For example, the stories 19 with coupling to the temporal and spatial domains 402, 400, 401 could be used to understand problems such as, but not limited to: generating of hypotheses and new possibilities, new lines of inquiry based on all available the data observations, including links in time and geography/diagrams; putting all the facts together to see how they relate to hypotheses, trajectories of facts over time to facilitate telling of the story 19; constructing patterns in activities to reveal hidden information in the data when the whole puzzle is not self evident; identifying an easy pattern, for example, using the same organizations, the same timing, the same people; identifying a difficult pattern using different names, organizations, methods, dates; guiding the organization of observations into meaningful structures and patterns through coherence and narrative principles; forming plots of dominant concepts or leading ideas that the analyst use to postulate patterns of relationships among the data; and recognizing threads in a group of people, or technologies, etc and then seeing other threads twisting through the situation. It is recognized that a hypothesis is an assertion while an elaborate hypothesis is a story.

Story 19 Interactions

Using an analytical tool 12 as a model, gesture-based interactions can be used to enable story building, evidence marshaling, annotation, and presentation. These interactions occur within the space-time environment 402, 400, 401. Anticipated interactions are such as but not limited to:

Creation of a story fragments/elements 17 from nothing or from a piece of evidence (as provided by the data objects 14);

Attaching and detaching evidence to story element structures (i.e. the story 19);

Specify whether evidence supports or refutes the story 19;

Attaching elements 17 together;

Identifying "threads" in the story

Foreground/background/hidden modes for emphasis and focus of story elements 17;

Perform pattern search within a constrained area of the source data (e.g. data set in memory 102);

Creating annotations;

Removing junk; and

Automatic focus, navigation and animation controls of the story 19 once generated.

In addition, the tool 12 provides for the analyst to organize evidence according to the story framework (series of connected story elements 17). For example, the story framework (e.g. story 19) may allow analysts to sort or compare characters and events against templates for certain type of threats.

Configuration of Tool 12 for Story 19 Generation

Referring to FIG. 32, shown is a system 113 for generating a visual representation 18 of a series of data objects 14 including events 20, entities 24 and location 22. The events 20 and entities 24 are linked to each other as defined by the associations data 16. The visualization tool 12 processes the data objects 14, the associations data 16 received from a data manager 114. The data module 114, as provided by either a user or a database (e.g. memory 102), comprises data objects 14, associations data 16 defining the association between the data objects 14 and pattern data 58 predefining the patterns (e.g. pattern templates 59 used by the pattern module 60) between data objects 14 and/or associations 16. In turn, the visualization tool 12 organizes some combination of related data objects 14 in the context of spatial 400 and temporal 402 domains, which in turn is subsequently identified as a specific pattern 60 (e.g. compared to the raw data objects 14) and is incorporated into a story 19. Accordingly, the stories 19 or fragments of the stories 19 are then displayed as a visual representation 18 to the user on the visual interface 202.

Story Generation Module 50

The story generation module 50 can be referred to as a workflow engine for coordinating the generation of the story 19 through the connection of a plurality of story elements 17 assigned to subsets of the data objects 14 and/or associations 16. The story generation module 50 uses queries, pattern matching, and/or aggregation techniques to drive story 19 development until a suitable story 19 is generated that represents the data to which the story elements 17 are assigned. Ultimately, the output of the story generation module 50 is an assimilation of evidence into a series of connected data groups (e.g. story elements 17) with semantic relevance to the story 19 as supported by the raw data from the memory 102. The story generation module 50 cooperates with the aggregation module 600 and the pattern module 60 to identify subsets 15 of the data (see FIG. 37a) and the semantic representation module 57 to attach semantic representations 56 (see FIG. 37b) to the identified subsets 15 in order to generate the story elements 17. The story generation module 50 also interacts with the text module 70 to associate the various story elements 17 with text 72 (see FIG. 43) to compete the story 19, as further described below.

With respect to building the story 19 to be displayed as a visual representation 18, the process facilitated by the generation module 50 can be performed either as a top-down or bottom-up process. The top-down approach is a user driven methodology in which the story 19 or hypothesis is created by hand in time 402 and space 400, 401. The analysts may define the story 19/hypothesis out of thin air with the intent of finding evidence (i.e. provided by the data objects 14) that supports or refutes it. The bottom-up approach envisions an analyst starting with raw evidence (data objects 14) and carefully building up the story 19 that explains a possible scenario. In one example, the scenario may describe a possible threat. This bottom-up process is referred to as story marshaling—the process by which evidence is assembled into the story 19.

The bottom up approach uses the matching/aggregating of the data into the data subsets 15. Pattern matching algorithms (e.g. provided by the module 600, 60) are used to find significant or relevant patterns in large, raw data sets (i.e. the data objects 14) and presenting them to the analyst as story elements 17 within the visual representation 18. As discussed earlier, referring to FIG. 32, the story generation module 50 coordinates the performing of the pattern matching using the pattern templates 59 and/or pattern aggregates 62, as further described below. The pattern assistant module 50 can coordinate the use of algorithms including but not limited to, clustering, pattern recognition, machine learning or user-drive methods to extract/identify the specific patterns for assigning to the data subsets 15. For example, the following story 19 patterns can be identified and retrieved for specific sequence of events 20, such as but not limited to: plot patterns (a sequence of events); turning points in plots; plot types; characters and places; force and direction; and warning patterns.

In turn, the module 50 can provide the visualization manager 112 with the identified story elements 17 (including representations 56 assigned to data subsets 15 extracted from the data objects 14) used to assemble the story 19 as the visualization representation 18 (see FIG. 33). In another embodiment, the module 50 can be used to provide story text 72, generated through interaction with the text module 70 (and user interactions), to the visualization manager 112, along with the story fragments associated with the story text 72 as hyperlinked visualization elements (see FIG. 43), as further described below.

Aggregation Module 600

Referring again to FIG. 32, one step in the process of generating the story 19 can be through use of the aggregation module 600 for analyzing the data objects 14 for summarizing and condensing into pattern aggregates 62 (see FIGS. 23 and 24). It is recognized that the pattern aggregates 62 are a result of identifying possibilities in the raw data for reducing the data clutter, due to aggregation of similar data objects 14 according to such as but not limited to: type; spatial proximity; temporal proximity; association to the same event 20, entity 24, location 22; and other predefined filters 602 (see FIG. 22), as desired. Further, it is recognized that the use of the aggregation module 600 is used mainly for data de-cluttering, and as such the pattern aggregates 62 identified are not necessarily for direct use as story elements 17 until identified as such via the pattern module 60.

In this manner, the amount of data that is represented on the visual interface 202 can be multiplied. This approach is a way to address analysis of massive data. These pattern aggregates 62 can be associated with indicators of activity, such as but not limited to: clustering; day/night separation; tracks simplification; combination of similar things/events; identification of fast movement; and direction of movement. For example, a series of email communications over an extended period of time, between two individuals, could be replaced with a single representative email communication visual connection element 412, thus helping to de-clutter the visualization representation 18 to assist in identification of the story elements 17.

Figure 34:
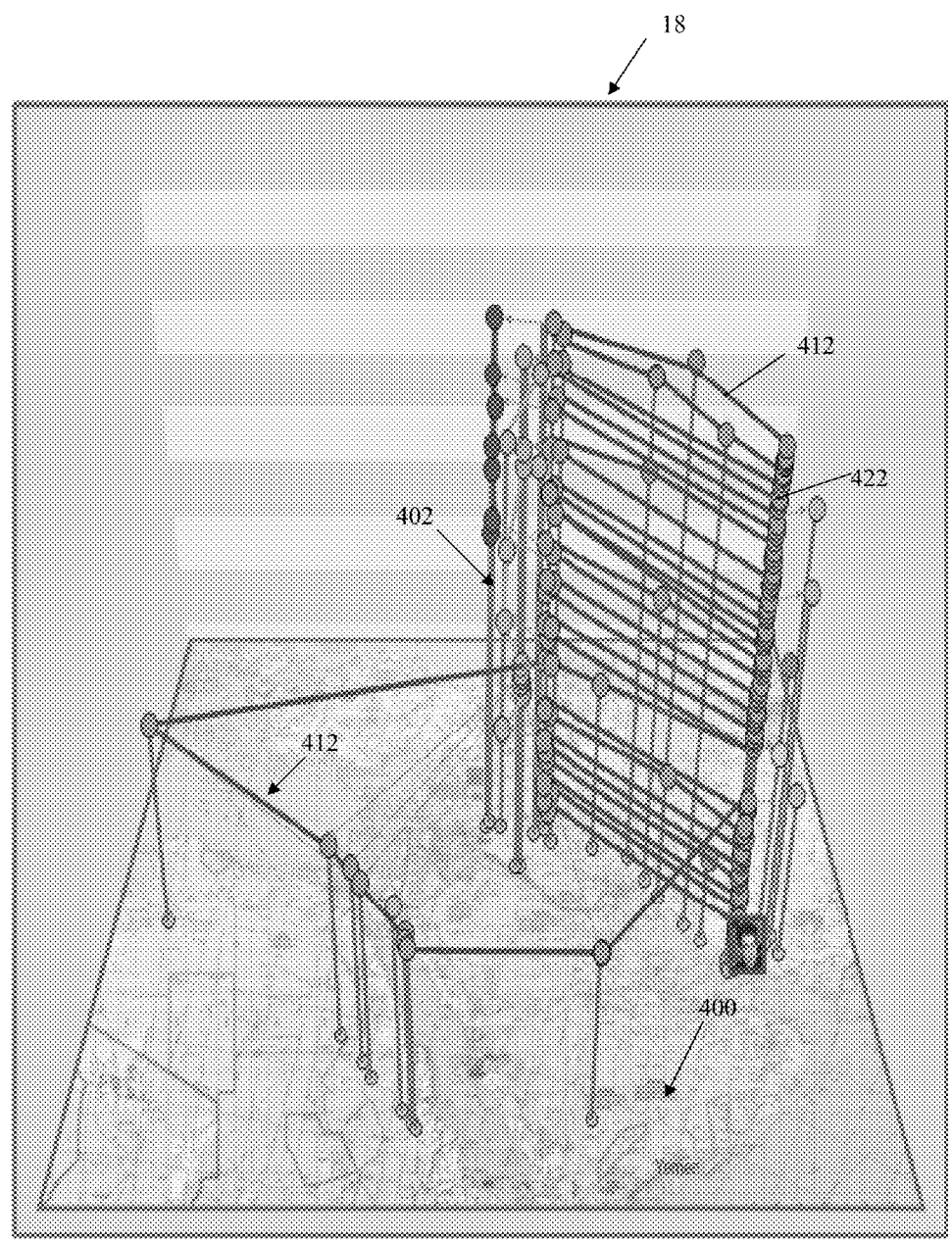
FIG. 34 shows an example visualization representation prior to analysis by the visualization tool of FIG. 32.
Figure 35:
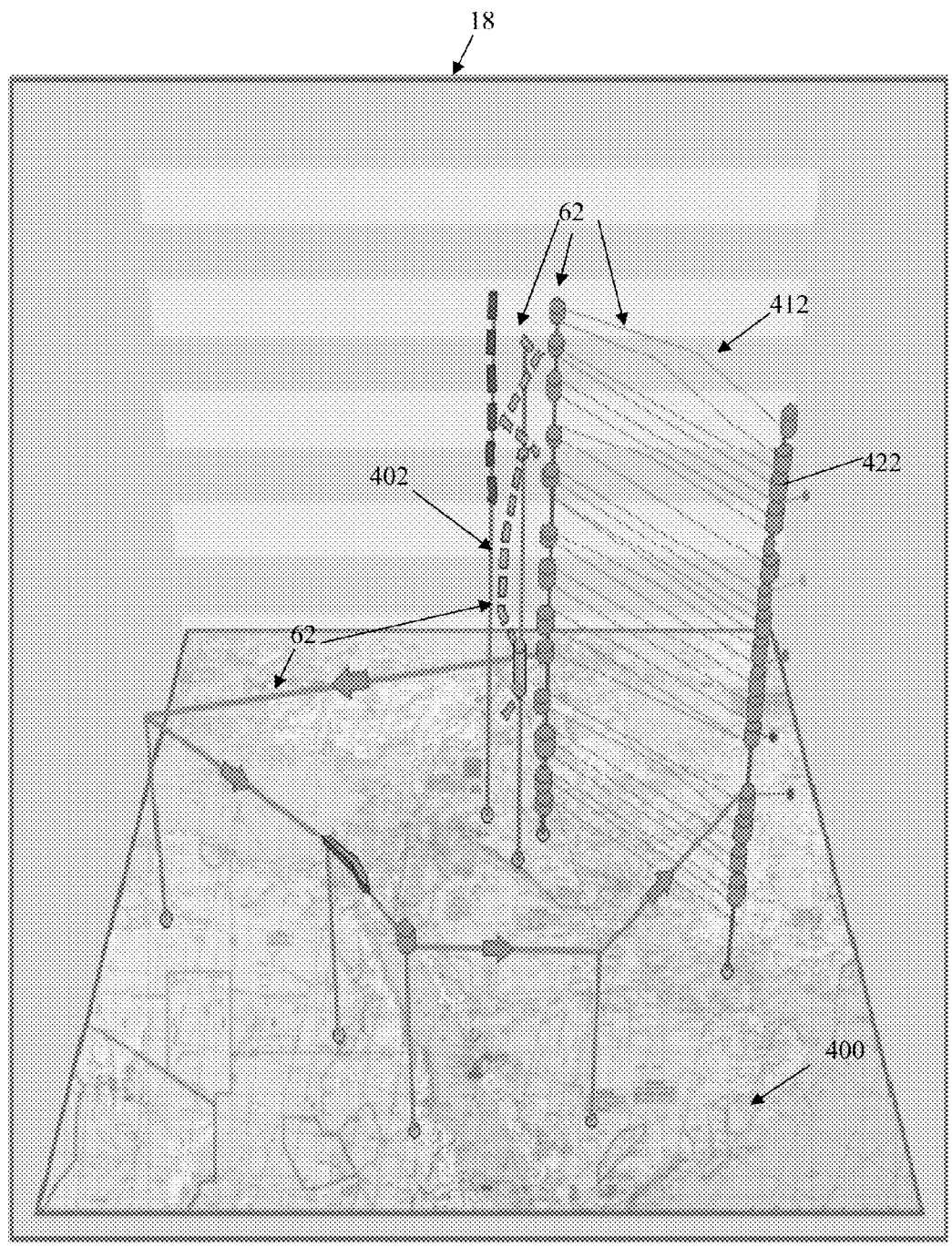
FIG. 35 shows an example aggregation result of the module of FIG. 32.

Referring to FIG. 34, shown is a sketch of raw communication and tracking events (as given by the data objects 14) in time 402 and space 400. Referring to FIG. 35, shown is an image of the same data as in FIG. 34, but now including pattern aggregates 62 applied using the aggregation module 600 to simplify the diagram and reduce data clutter. In this figure, events have been clustered into days by location and summary trails, replacing groups of events 20.

It is recognized that the user can alter the degree of aggregation via aggregation parameters, either automatic (ie. Tool pre-definitions) or manual (entered via events 109) or a combination thereof. For example, consider the aggregated scenario shown in FIG. 35, having a first degree of aggregation including pattern aggregates 62 with a ghosted view of connections 412 shown in FIG. 34, which is used to denote presence but a lesser degree of importance on the individual ghosted connections 412. Therefore, FIG. 35 can represent an entity 24 that may have stopped at several different locations before reaching a final destination.

Thus, a group of events 20 may be summarized by the aggregation module 600 to show only a representative summarized event 20. Alternatively, a user may wish to aggregate all event 20 objects having a certain characteristic or behaviour (as defined by the filters 602—see FIG. 22).

Pattern Module 60

Referring to FIG. 32, the pattern module 60 is used to identify data subsets 15 that are applicable as story elements 17 for connecting together to make the story 19. The pattern module 60 uses predefined pattern templates 59 to detect these data subsets 15 from the data objects 14 and associations 16 making up the domains 400,401,402, either from scratch or upon review of the de-cluttered data including pattern aggregates 62. Accordingly, the pattern module 60 applies the pattern templates 59 to the data objects 14, associations 16, and/or the pattern aggregates 62 to identify the data subsets 15 that are assigned semantic representation 56 to generate the story elements 17.

The pattern module 60 can provide a series of training patterns to the user that can be used as test patterns to help train the user in customization of the pattern templates 59 for use in detecting specific patterns 61 and trends in the data set. The pattern module 60 learns from the training patterns, which can then be used to analyze the data objects 14 to provide specific pattern information 61 and trends for the data objects 14.

Figure 39:
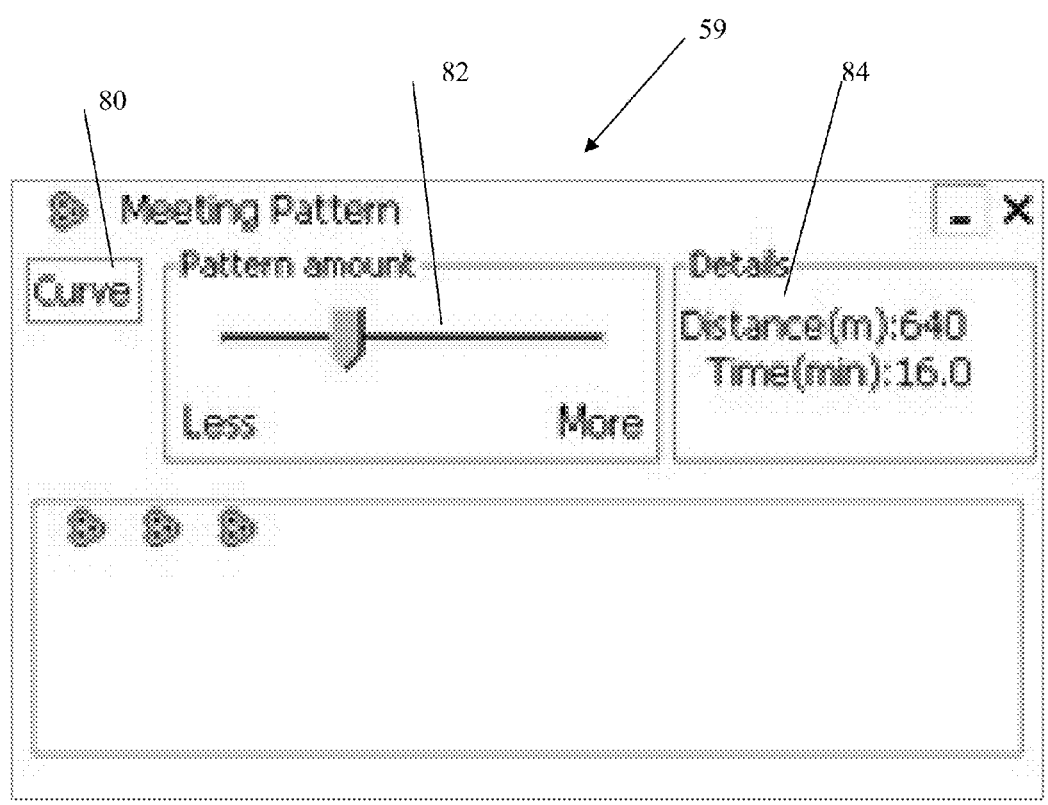
FIG. 39 is an embodiment of a pattern template for generating the story elements of FIG. 32.

For example, referring to FIG. 39, shown is an example pattern template 59 for searching the data objects 14, associations 16, and/or the pattern aggregates 62 to identify meeting patterns 61 between two or more entities 24, further described below. The pattern module 60 applies the pattern templates 59 to the data, as well as coordinates the setting of the pattern template 59 parameters, such as type 80 of semantic representation 56, pattern amount, and details 84 of the pattern (e.g. distance and/or time settings). All recognized patterns 61 are then identified on the visualization representation 18 in order to contribute to the telling of the story 19.

Figure 36:
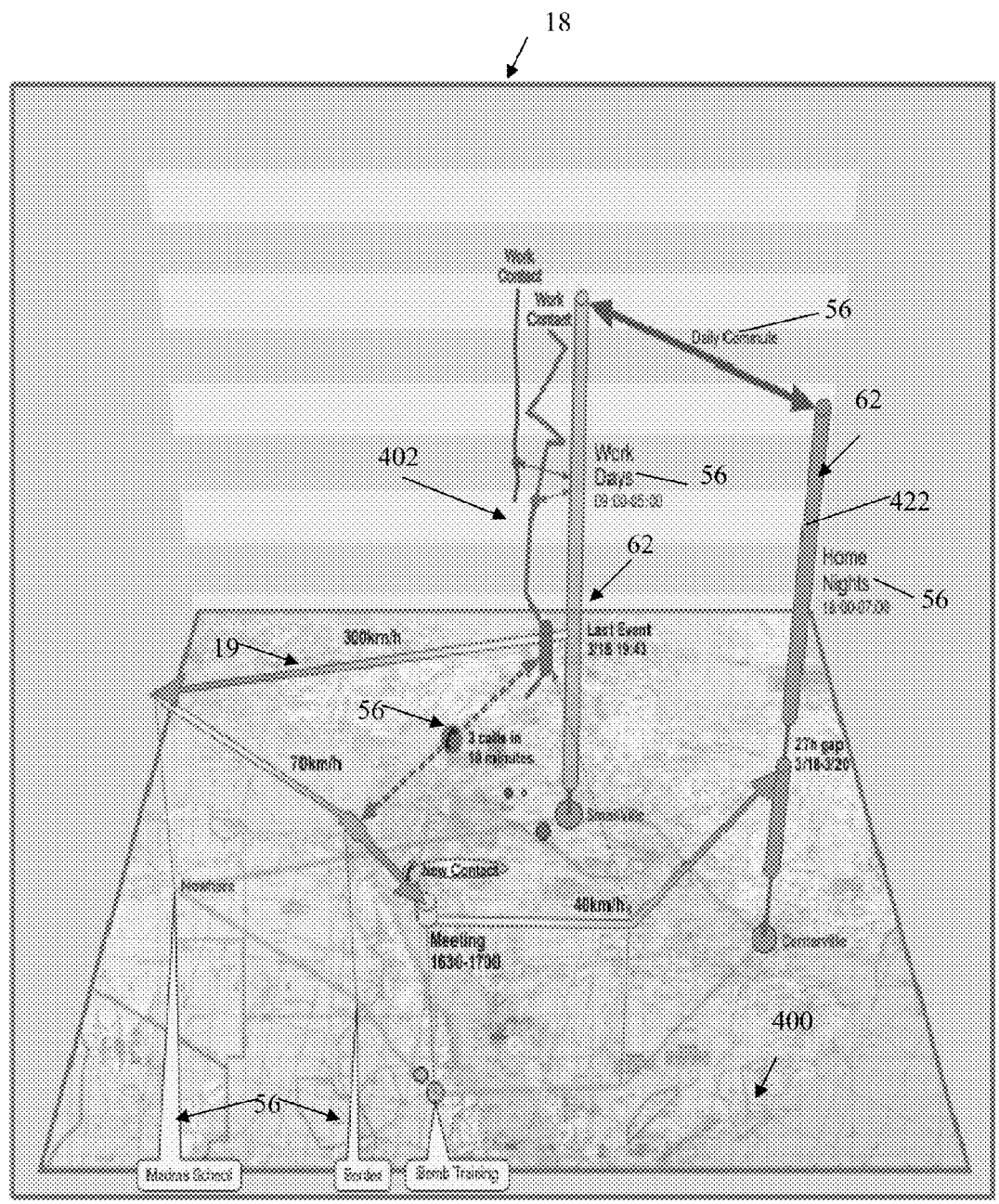
FIG. 36 shows an example aggregation and pattern matching analysis applied to FIG. 35.

For example, referring to FIG. 36, the results 61 of pattern template 59 matching are shown including aggregated connections 412 and associated semantic representations 56. It is also recognized that the thickness of the timelines 422 is increased by the template module 60, over those timelines 422 of FIGS. 34 and 35, thus denoting evidence of summarized/recognized patterns 61. Further, the graph shown in FIG. 36 summarizes the events and simply shows the character having traveled from a source to a final destination location, with attached semantic representations 56.

Pattern Templates 59

Some examples of pattern templates 59 that could be applied to the data objects 14 and associations 16 in order to identify/extract patterns 61 are such as but not limited to: activities from data such as phone record, credit card transactions, etc used to identify where home/work/school is, who are friends/family/new acquaintances, where do entities 24 shop/go on vacation, repeated behaviours/exceptions, increase/decreases in identified activities; and story patterns used to identify plot patterns (sequence of events 20 such as turning points in plots and plot types, characters 24 and places 22, force and direction, and warning patterns. The pattern templates 59 would be configured using a predefined set of any of the data objects 14 and/or associations 16 to be used by the pattern module 60 to be applied against the data under analysis for constructing the story elements 17.

Pattern Workflow (Detection)

In order to demonstrate integration and workflow of the pattern matching system, two example patterns were developed: a meeting finder pattern template 59, and a text search pattern template 59. The meeting finder 59 is controlled via a modified layer panel (see FIG. 39), and scans the data of the memory 102 for conditions where 2 or more entities 24 come within a given distance of each other in space and time. The meeting finder pattern template 59 produces result layers that can be visualized in numerous ways. The panel allows control of meeting finder algorithm parameters 80,82,84, summary of results, and selection of data painting technique for the results in the scene, further described below. The text search pattern template 59 finds results based on string matches contained in the data, but otherwise works in a similar manner. It allows a user to search for and identify predetermined patterns within the raw data. All identified patterns 61 using the pattern templates 59 are then assigned semantic representation(s) 56 via the representation module 57, in order to construct the story elements 17 further described below.

Figure 40:
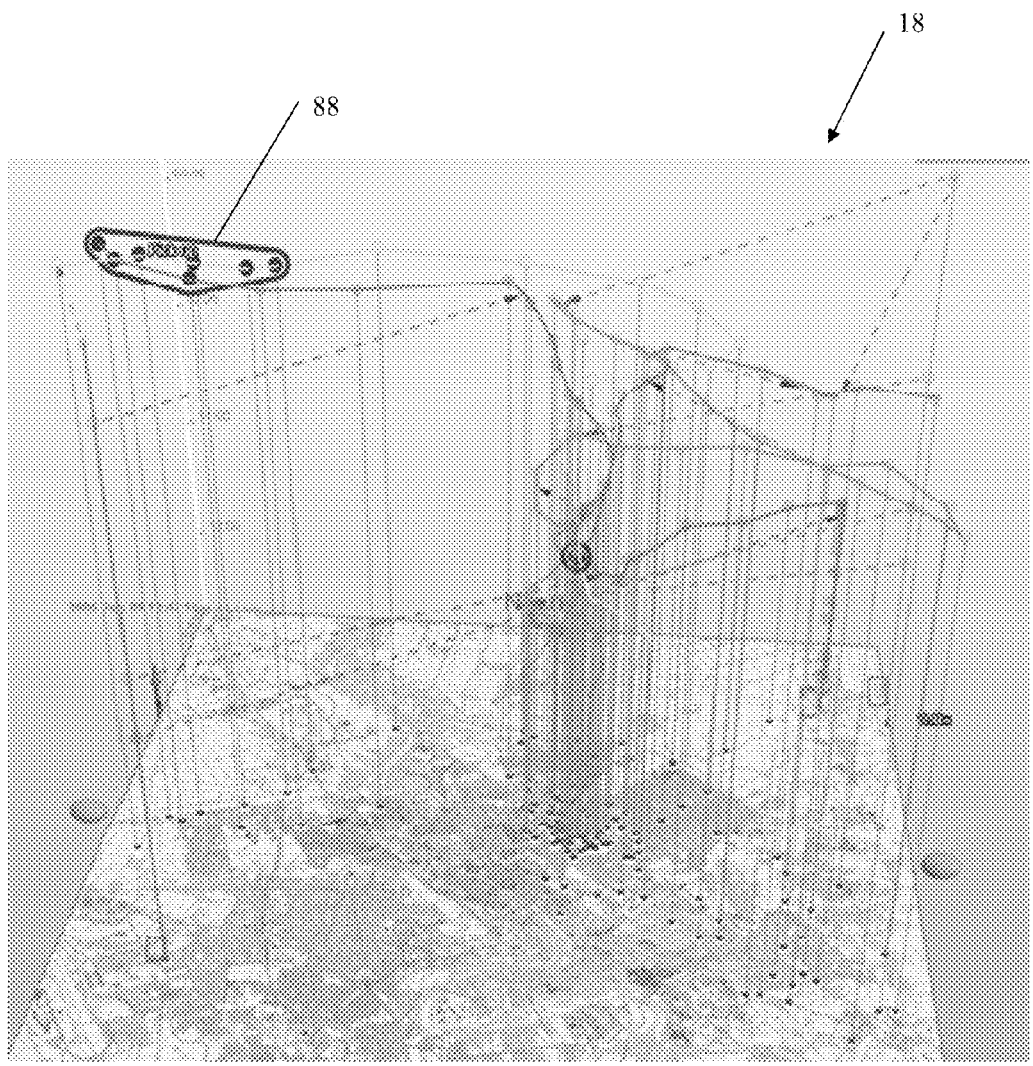
FIG. 40 is a further embodiment of the visualization representation of FIG. 32.

Referring to FIG. 40, application of the meeting finder pattern template 59 applied to vehicle tracking data shows an identified pattern 88 outlined in order to annotate the results of the pattern matching. Accordingly, a potential meeting between two or more entities was detected when the parameters 80,82,84 of the pattern template 59 was applied against the data of the domains 400,401,402.

Ultimately, the output of the pattern matching is a summarization of evidence into data subsets 15 with semantic relevance to the story 19. In the visualization of FIG. 40, the identified pattern 88 is an example of a data subset 15 suitable for association with a semantic representation (e.g. meeting between John and Frank) to incorporate the identified pattern 88 as one of the story elements 17 of the resultant story 19 shown on the visual interface 202. Examples of other identifiable patterns are; phone call sequences, acceleration and deceleration, pauses, clusters etc. Advanced pattern recognition templates 59 may be able to discover other relevant or specialized behaviors in data, such as "going shopping" or "picking up the kids at school", or even plots and deception. It will be understood by those skilled in the art that other pattern detection and identification methods known in the art such as event sequence and semantic pattern detection may be used either as a standalone or in combination with above mentioned pattern templates 59, as desired.

Semantic Representation Module 57

The semantic representation module 57 facilitates the assigning of predefined semantic representations 56 (manually and/or automatically) to summarized behaviours/patterns 61 in time and space identified in the raw data, through operation of the pattern module 60 and/or the aggregation module 600. The patterns 61 are comprised of data subsets 15 identified from the larger data set (e.g. objects 14 and associations 16) of the domains 400,401,402). Assigning of predefined semantic representations 56 to the identified data subsets 15 results in generation of the story elements 17 that are part of the overall story 19 (e.g. a series of connectable story elements 17). The identified patterns 61 can then be visually represented by descriptive graphics of the semantic representation 56, as further described below.

For example, if a person is shown traveling a certain route every single day to work, this repetitive behaviour can be summarized using the assigned semantic representation 56 "daily workplace route" as descriptive text and/or suitable image positioned adjacent the identified pattern 61 on the visualization representation. The semantic representation module 57 can be configured to appropriately select/assign and/or position the semantic representation 56 adjacent to the data subset 15, thus creating the respective story element 17.

Referring now to FIGS. 37*a* and 37*b*, shown is an exemplary operation of the semantics representations 56 applied to the data objects 14. A person 24 has traveled from a first location A to a destination location D, identified as matching a travel pattern template 59 (e.g. sequential stops from starting point to end destination), and thus assigned as data subset 15. The person 24 may have stopped at several different locations 22 (locations B, C) on route to the destination. Depending upon the settings within the pattern module 60 (i.e. the amount of detail that the user may request to view on the visual representation 18), the pattern module 60 can filter the sequence of events 20 relating to stopping at location B and location C. Thus, as shown in FIG. 37*b*, the semantic representations 56 include a reduction in the amount of data shown, thus portraying a summary of the stream of events (i.e. travel from location A to D) without including each event 20 in between, to provide the story element 17. Further, the semantics representation 56 could be used to indicate the specific pattern 60 defining that the person 24 went from home to church (when traveling from location A to D). Thus, based on the specific pattern information 61, the data subset 15 is assigned by the module 57 the semantic representations 56 showing a home marker and a church marker at locations A and D respectively.

It is recognized that the pattern module 60, the semantic representation module 57 can operate with the help of the aggregation module 600 in helping to de-clutter identified patterns 61 for representation as part of the story 19 as the story elements 17, as desired.

Semantics Representation 56

The first step of working at the story level is to represent basic elements such as threads and behaviors with semantic representations 56 in time 402 and space 400. For example, suppose one has evidence (ie. raw data objects 14) that a person 24 spends every night at a particular location 22, which is recognized as a specific pattern 61. The visual representation 18 of this pattern 61 might include a marker (ie. semantic representation 56) at that location 22 and a hypothesis about the meaning of that evidence that says "this person lives at this location" such that the story 19 is associated with the semantic representation 56. An image of a house or a visual element 410 could also be displayed in the visual representation 18 to support understanding. The visual element 410 of the home, in this case, is therefore may be an aggregation in space and time of some amount of evidence as represented in the visual representation 18 as the semantic representation 56 (ie. home marker).

Further, it is recognized that threads in the story 19 can be explicitly identified through operation of the story generation module 50. Respective threads can be defined (by the user and/or by configuration of the tool 12 using data object 14 and association 16 attributes) as a grouping of selected story elements 17 that have one or more common properties/features of the information that they relate to, with respect to the overall story 19. Accordingly, the story fragments/elements 17 of the story 19 can be assigned (e.g. automatically and/or manually) to one or more thread categories 910 (see FIG. 45) with an associated respective color (or transparency setting, label, or other visually distinguishing feature) for visual identification in the story 19, as displayed in the visualization representation 18. The visibility of these thread categories 910 can be toggled, e.g. as a parameter 911 (e.g. filter) for configuring the display of the story 19 on the visual interface 202, to allow the user to focus on a subset of the story 19, as desired. The associated visual distinguishing parameter 911 for the thread categories 910 can facilitate at-a-glance identification by the user of the thread categories 910 and the story elements 17 they contain. It is also recognized that use of the thread categories 910 facilitates the user to select specific data subsets (from the overall data set of the story 19) to concentrate on during data analysis.

Thus, in operation, the semantic representations 56 can be used to reduce the complexity of the visual representation 18 and/or to otherwise attach semantic meaning to the identified patterns 61 to construct the story 19 as the series of connected story elements 17. In one aspect, the semantic representations 56 are user defined for a specific pattern 61 or behaviour, and replace the data objects 14 with an equivalent visual element that depicts meaning to the entity 24 and events 20.

As mentioned earlier, in one aspect, the semantics representation 56 can be user entered such that a user may recognize a specific pattern 61 or behaviour and replace that pattern with a specific statement or graphical icon to simplify the notation used by the pattern module 60. Alternatively, the semantics representation 56 can be stored within a pattern templates 59 that is in communication with the pattern module 60, such that all occurrences of the desired pattern 61 are found and replaced by the semantic representation 56 in the spatial-temporal domains 400,401,402.

Figure 41:
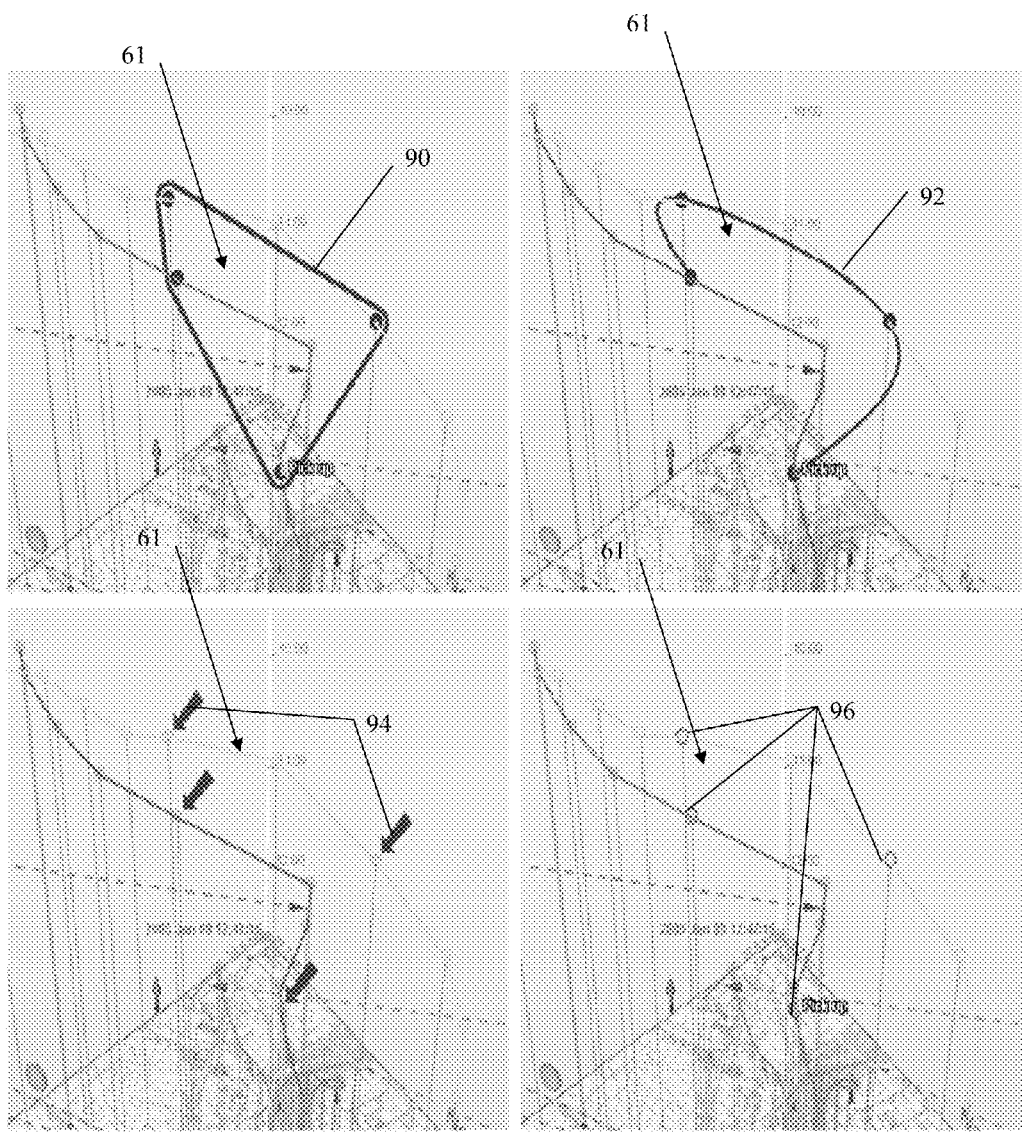
FIG. 41 is a further embodiment of the visualization representation of FIG. 32.

Referring to FIG. 41, shown are four example visualization paints (e.g. semantic representations 56) applied to the same identified data patterns 61. Rubber-band 90, Bezier 92, Arrows 94, and Coloured 96 Note that these qualities can be combined, as desired. Other qualities such as text, size, and translucency can also be altered, as desired. The technique for visualizing of the identified/detected results of the pattern matching (e.g. patterns 61) can be referred to as a data painting system. It enables visualization rendering techniques to be attached to pattern 61 results dynamically. By decoupling the visualization technique (e.g. semantic representations 56) from the patterns 61 in this way, the pattern recognition stage only needs to focus on the design of pattern matching templates 59 for the specific attributes of the data objects 14 to match, rather than both visualization of the identified patterns 61 and the pattern matching itself. Further, the pattern 61 detection may be either completely or partially user-aided. It will be understood by a person skilled in the art that these visuals (e.g. visualization parameters assigned to aspects of the detected pattern) can be easily extended and married to existing and future patterns or templates.

Figure 42:
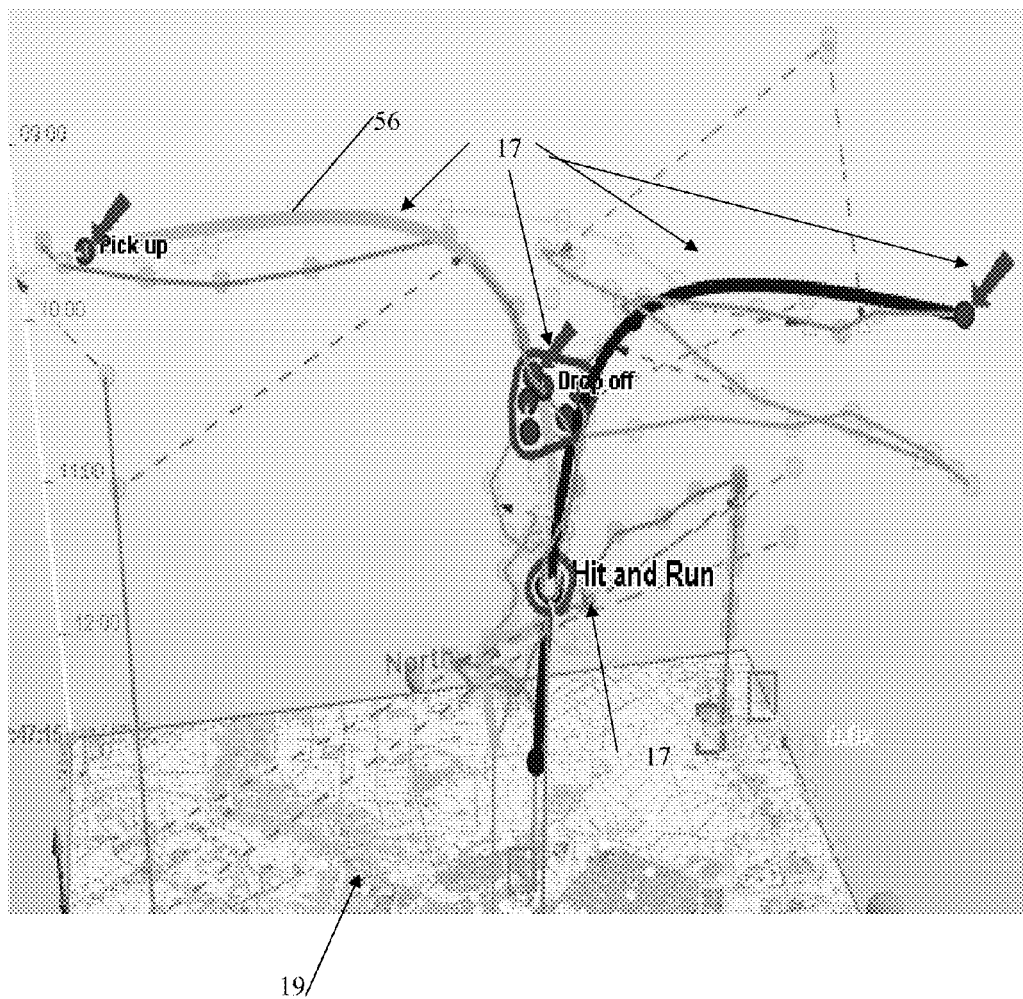
FIG. 42 is a further embodiment of the visualization representation of FIG. 32.

Referring to FIG. 42, shown are example of numerous semantic representations 56 applied to pattern 61 results that are used to identify story elements 17 of the story 19. The story shown represents the passing of information in a planned assassination by two parties.

Text Module 70

Referring again to FIGS. 32 and 43, developing a system for presenting the results of pattern analysis in the form of a story that can be "told" in the context of time and space is a key research objective. If the entities 24 and events 20 of the data objects 14 represent characters and events in the story 19, and the space-time view is like a setting, then a method by which an author orders and narrates a sequence of views to present to others can be done. View capturing is a basic capability of the story generation module 50 for saving perspectives in time and space, and can be used to recall key events or aspects of the data. This system has been extended to allow the analyst to author a sequence of saved views 95 linked to a text explanation 72 via links 96.

Figure 43:
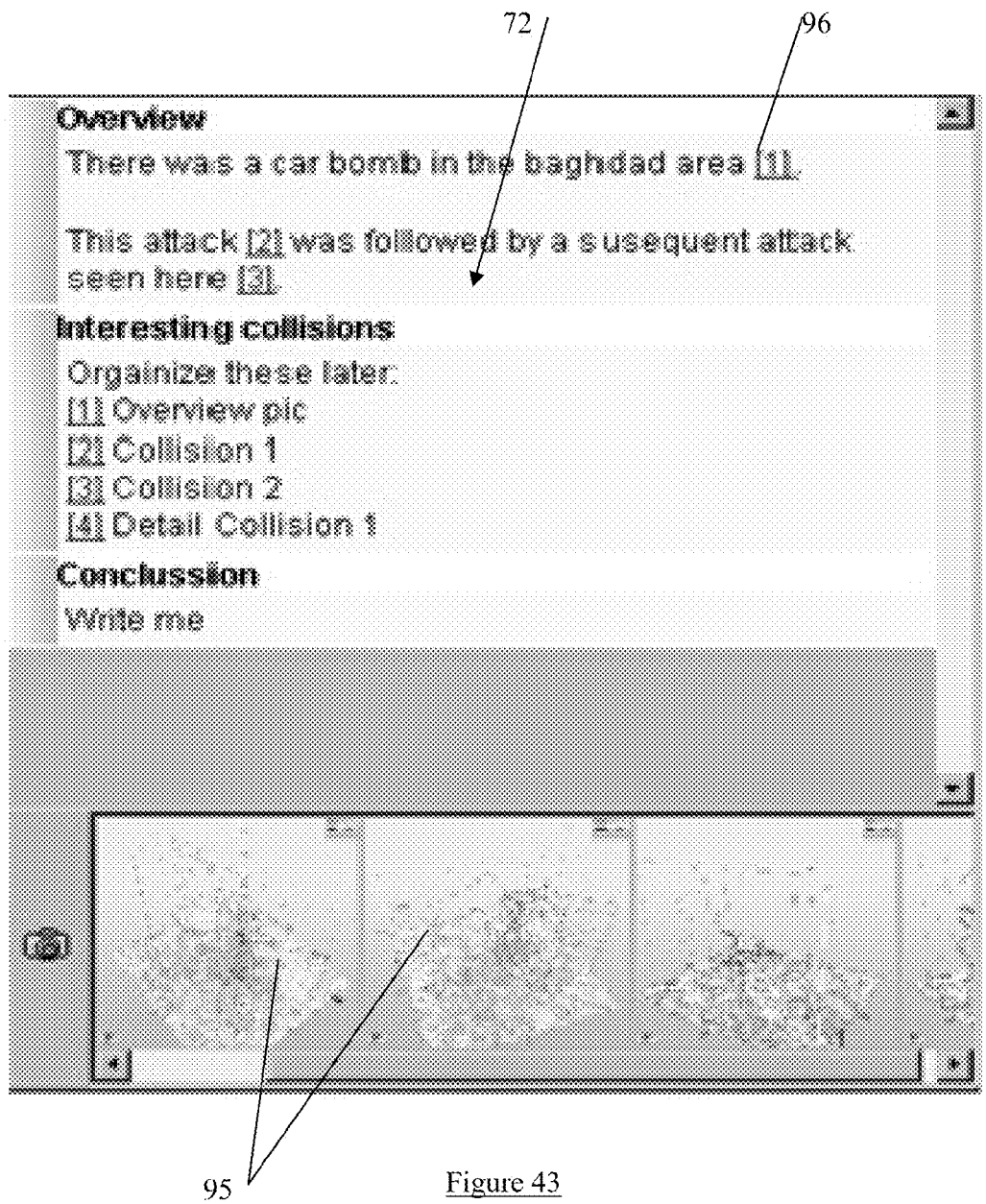
FIG. 43 is an example story framework generated using the text module of FIG. 32.

This FIG. 43 shows the story 19 narration concept. The captured views 95 appear along the bottom of the visualization representation 18 as thumbnails, for example. These thumbnails can be dragged into the textual elements 72 and can be automatically linked, for example. Subsequently, upon review of the story text 72, the analyst can click on the link 96 to have the selected scene/view 95 recreated on the visual interface 202 (e.g. using the saved parameters of the included data—such as filter settings, selected groupings 27 of objects 14, navigation settings, thread categories 910, and other visualization representation 18 and story 19 view setting parameters as describe above). It is recognised that for the recreated scene/view 95 embodiment, further navigation and/or modification of the recreated view would be available to the user via user events 109 (e.g. dynamic interaction capabilities). It is also recognised that the captured views 95 could be saved as a static image/picture, which therefore may not be suitable for further navigation of the image/picture contents, as desired.

The text navigator, or power text, module 70 allows the analyst to write the story 19 as story text 72 and embed captured views 95 directly into the text 72 via links 96. The views 95 capture maintains all of the information needed to recall a particular view in time and space, as well as the data that was visible in the view (including pattern visualizations where appropriate). This allows for an authored exploration of the information with bookmarks to the settings. Additionally, this allows for a chronotopic arrangement to the elements 17 of the story 19. The reader can recall regions of time that are relevant to the narrative instead of the order that things actually happened.

In one embodiment, the user first navigates the visualization representation 18 to a selected scene. To link a new view into to the story text 72, the analyst clicks a capture view button of the user interface 202. A thumbnail view 95 of the scene can be dragged into the story text 72, automatically linking it into the power text narrative. The linkage 96 can include storage of the navigation parameters so that the scene can be reproduced as a subset of the complete visualization representation 18. When the analyst clicks on the view hyperlink 96, the tool 12 redisplays the entire scene that was captured. The analyst at this point is free to interact with the displayed scene or continue reading the narrative of the story text 72, as desired. This story telling framework (combination of story text 72 and captured views 95) could even be automated by using voice synthesizers to read the story text 72 and recall the setting sequence.

The power text system also supports a concept of story templates 71 (see FIG. 32) that include predefined segments of the story text 72, which can be further modified by the user. These story templates 71 can be predetermined sections or chapters in the story 19, which can serve to guide generation of the story 19 content. For example, an incident report template 71 might contain headings for "Incident Description", "Prior History of Perpetrator" and "Incident Response". Another option is for the predefined segments of the story text 72 to be part of the story 19 content, and to provide the user the option to link a selected view 95 thereto. For example, one of the predefined segments in a battle story template 71 could be "Location of battle A included armed forces resources B with casualty results C, [link]". The user would replace the generic markers A,B,C with the battle specific details (e.g. further story text 72) as well as attach a representative view 95 to replace the link marker [link]. Accordingly, the story templates 71 could be used to guide the user in providing the desire content for the story 19, including specific story text 72 and/or captured views 95.

The power text module 70 focuses on interactive media linking. The views 95 that are captured can allow for manipulation and exploration once recalled. It will be understood that although a picture of the captured view 95 has been shown as a method of indexing the desired scene and creating a hyperlink 96, other measures such as descriptive text or other simplified graphical representations (e.g. labeled icon) may be used. This is analogous to a pop-up book in which a story 19 may be explored linearly but at any time the reader may participate with the content by "pulling the tabs" if further clarity and detail is needed. The story text 72 is illuminated by the visuals and the content further understood through on-demand interaction.

Figure 44:
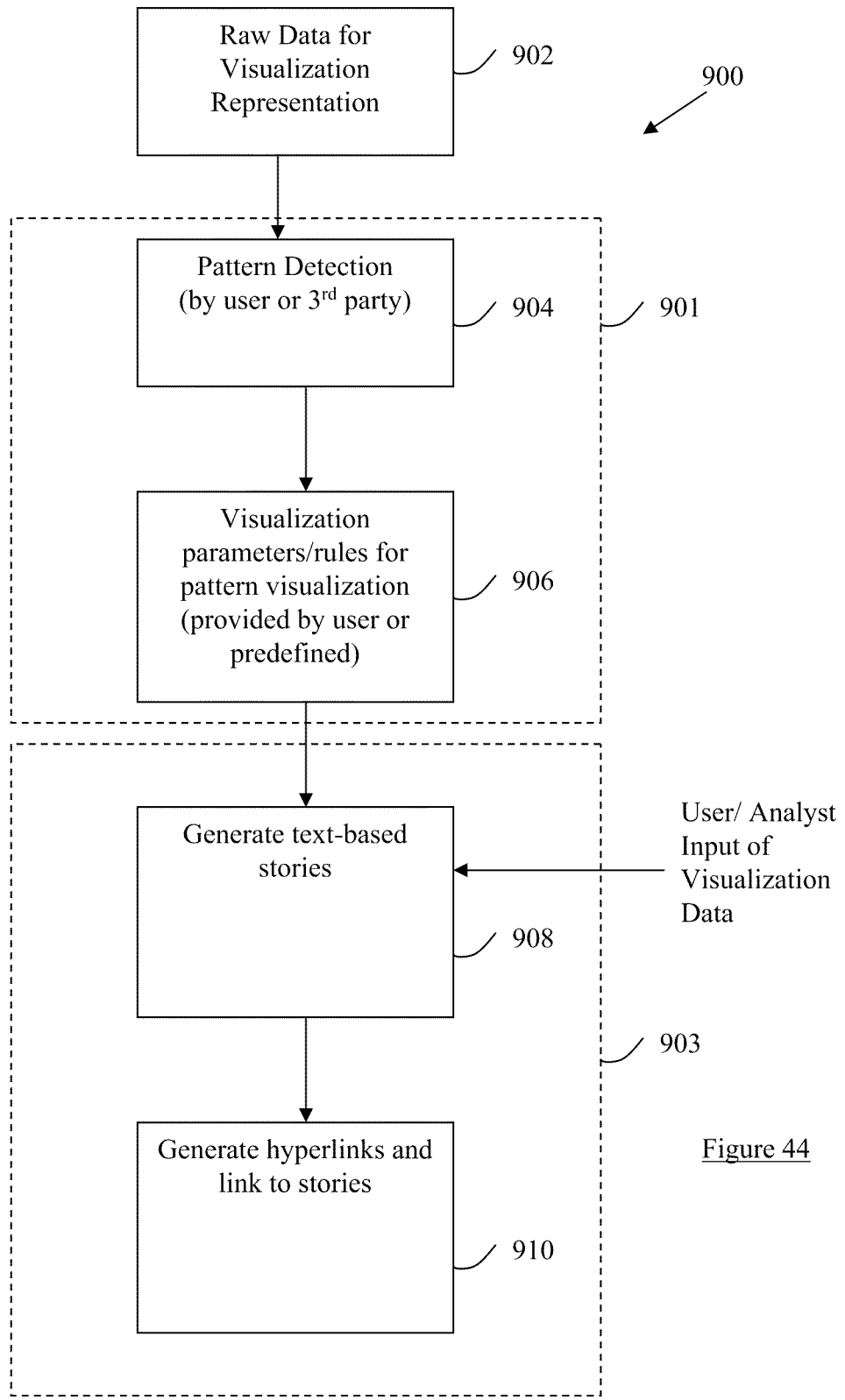
FIG. 44 shows an example operation for generating the story framework of FIG. 43.
Figure 45:
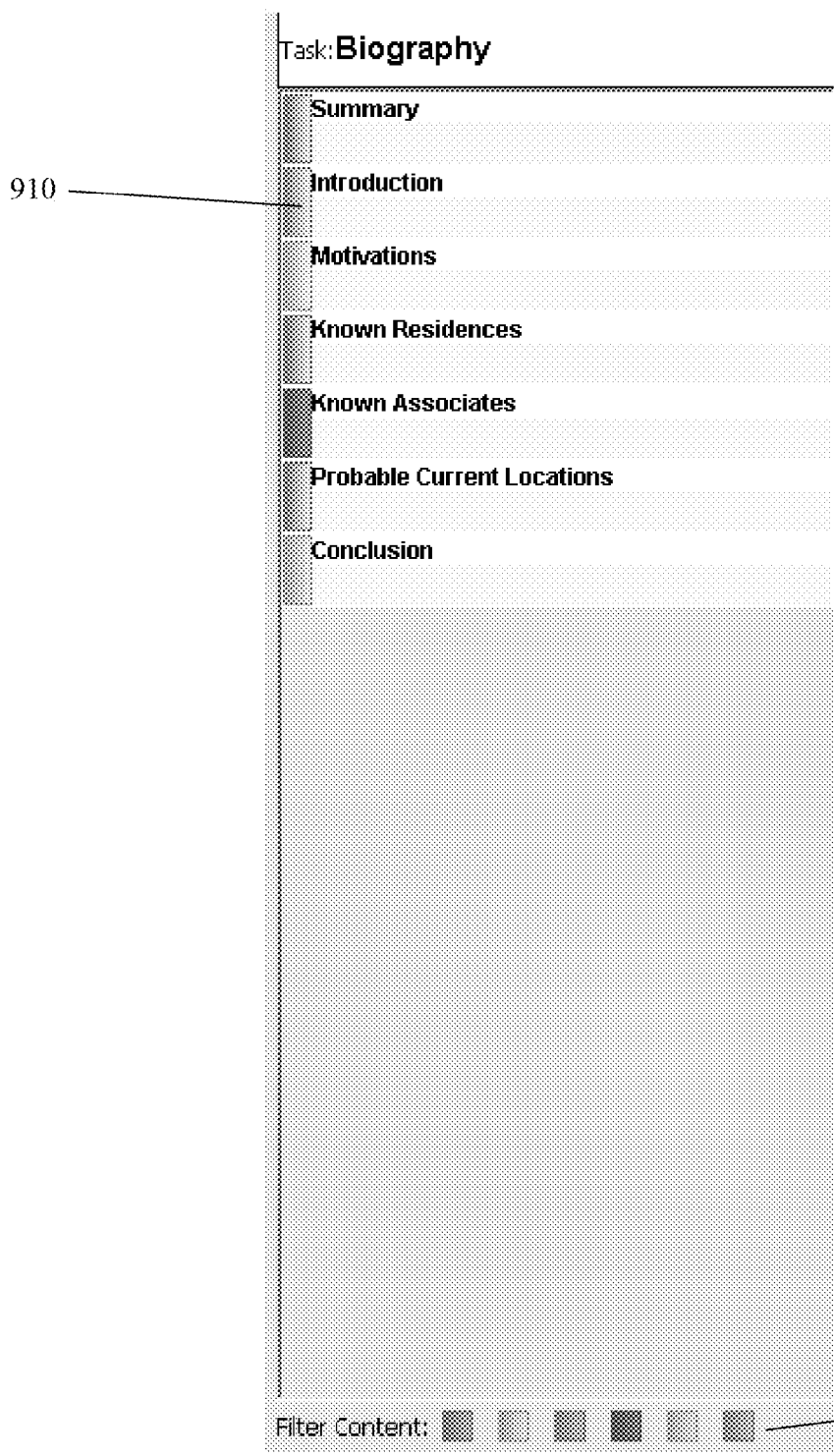
FIG. 45 is a further embodiment of generating the story element for FIGS. 37a,b.

Referring to FIG. 44, shown is a further embodiment of stories workflow process 900. The workflow process comprises story building 901 and story telling 903.

At step 902, raw data for visualization representation 18 is received. At step 904, the raw data objects 14, comprising a collection of events (event objects 20), locations (location objects 26) and entities (entity objects 24) is applied to a pattern module 60. For example, as shown in FIG. 39, the meeting finder pattern template 59 can be used to search for and display patterns 61 in raw data (i.e. by finding events that occur in close proximity in time and space). Alternatively, other techniques mentioned earlier such as text searching, residence finder, velocity finder and frequency analysis might be used to identify certain patterns or trends 61 in the data objects 14. It will be understood that the above-mentioned pattern detection techniques may be used as a stand-alone or in combination with known pattern identification methods.

The visualization tool 12 has a data painting system (or other visualization generation system) described earlier then uses the pattern results 61 provided by the pattern identification at step 904 to apply numerous graphical visualizations (e.g. representation 56) to selected features of the pattern results 61. Various visualization parameters for the pattern 61 can be altered such as its text, size, connectivity type, and other annotations. The system for visualizing the identified pattern as defined by step 906 can be partially or completely user aided.

At step 908, a user can create a story 19 made up of text 72 and bookmarked views of a scene. The bookmarked views are created at step 910 and may be shown as thumbnails 95 depicting a static picture of a captured view. The hyperlinks 96, when selected, allow a user to dynamically navigate the captured view or scene (as a subset of the visualization representation 18). For example, they may provide the ability to edit the scene or create further scenes (e.g. change configuration of included data objects 14, add/remove data objects 14, add annotations, etc.). Each captured view at step 910 would comprise of a scene depicting the entities, locations and corresponding events in a space-time view as well as applied graphical visualizations. Further, templates 71 can be created/modified using certain portions of the story 19, which includes previously captured hyperlinks 96. These templates 71 can be stored to the storage 102 and can then be used to apply to other sets of data objects 14 to write other stories 19 as part of the story telling process 903.

Other Components

Referring again to FIG. 32, the visualization tool 12 has a visualization manager 112 for interacting with the data objects 14 for presentation to the visual interface 202 via the visualization renderer 112. The data module 114 comprises data objects 14, associations data 16 defining the association between the data objects 14 and pattern data 58 defining the pattern between data objects 14. The data objects 14 further comprise events objects 20, entity objects 24, location objects 22. The data objects 14 can then be formed into groups 27 through predefined or user-entered association information 16. The user entered association information 16 can be obtained through interaction of the user directly with selected data objects 14 and association sets 16 via the time slider and other controls shown in FIG. 3. Further, the predefined groups 27 could also be loaded into memory 102 via the computer readable medium 46 shown in FIG. 2. Use of the groups 27 is such that subsets of the objects 14 can be selected and grouped through the associations data 16.

The data manager 114 can receive requests for storing, retrieving, amending or creating the data objects 14, the associations data 16, or the data 58 via the visualization tool 12 or directly via from the visualization renderer 112. Accordingly, the visualization tool 12 and managers 112, 114 coordinate the processing of data objects 14, association set 16, user events 109, and the module 50 with respect to the content of the visual representation 18 displayed in the visual interface 202. The visualization renderer 112 processes the translation from raw data objects 14 and provides the visual representation 18 according to the pattern information 61 provided by the pattern module 60.

Note that the operation of the visualization tool 12 and the story generation module 50 could also be applied to diagram-based contexts having a diagrammatic context space 401. Such diagram-based contexts could include for example, process views, organization charts, infrastructure diagrams, social network diagrams, etc. In this way, the visualization tool 12 can display diagrams in the x-y plane and show events, communications, tracks and other evidence in the temporal axis. For example, in a similar operation as described above, story generation module 50 could be used to determine patterns 61 within the data objects 14 of a process diagram and the visual connection elements 412 within the process diagram could be aggregated and summarized using the aggregation module 600 and the pattern module 60 respectively. The semantics representation 56 could also be used to replace specific patterns 61 within the process flow diagram.

The visualization tool 12, as described can then use simple queries or clustering algorithms to find patterns 61 within a set of data objects 14. Ultimately the output of the story generation module 50 or a user-driven story marshaling is an aggregation of evidence into a group with semantic relevance to the story 19.

Generation of the Story 19

Thus, the representation of the story 19 begins with the representation of the elements from which is it composed. As discussed earlier, there are 3 visual elements that are designed to support the display of stories 19 in the visualization tool 12:

1. Story Fragments 17: Aggregate Event Representation 62
   Summarize a group of events 20 with an expression in time 402 and space 400. Allow aggregates 62 to be aggregated further;
2. Visual association of identified data subsets 15 as story elements 17 to the Story 19
   Express where and how elements 17 and thread categories 910 (e.g. groupings of selected threads) connect and interact (discussed relating to FIG. 38); and 3. Annotation of Semantic Meaning 56
   Iconic, textual, or other visual means to convey importance or relevance to the story. This can involve user participation and/or some automated means (through the use of pattern templates 59 detecting specific patterns 60 and replacing the patterns 60 with predefined semantic representations 56).

Figure 38:
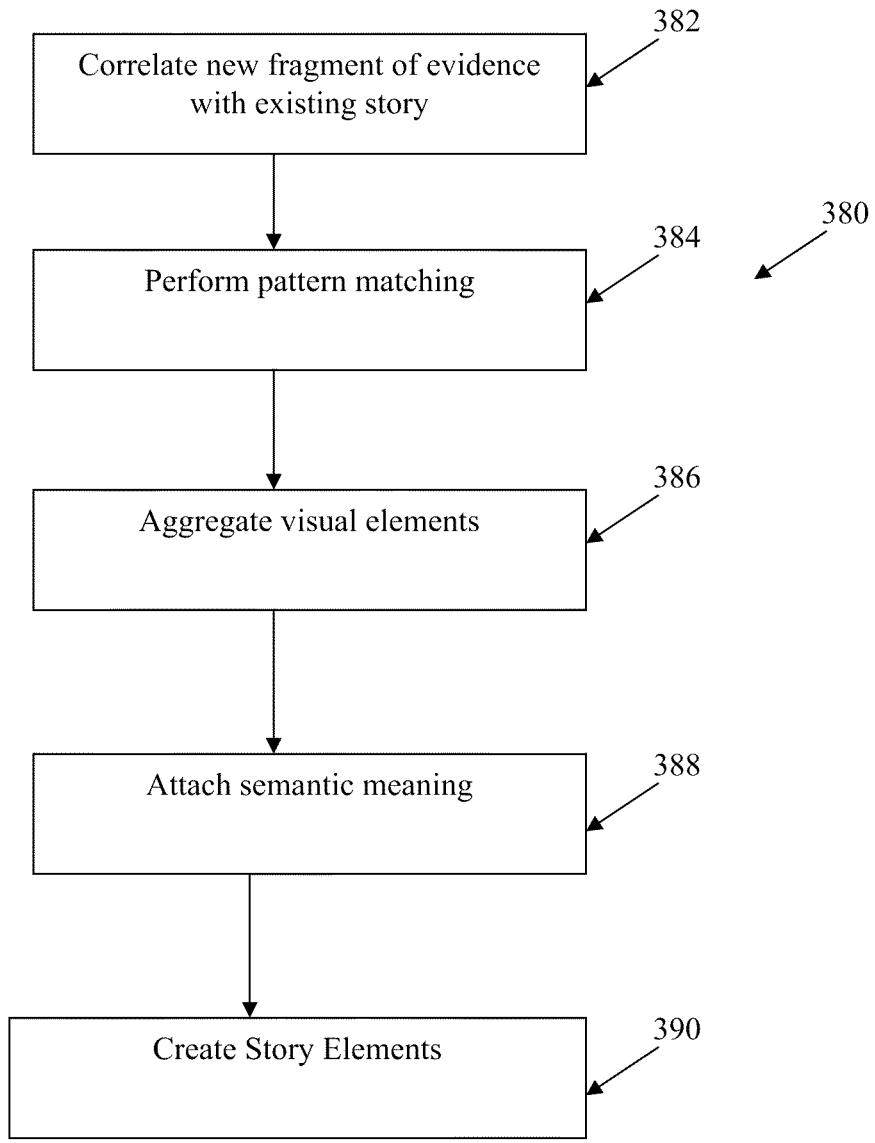
FIG. 38 shows an exemplary process for processing data objects for an existing story using the visualization tool of FIG. 32.

Referring now to FIG. 38, shown is an exemplary process 380 of the visualization tool 12 when processing new story elements 17 of evidence (as identified from the data objects 14 of the domains 400,401,402). At step 382, the new story elements 17 of evidence are selected for correlation with the existing story 19 using the story generation module 50. If specific patterns 61 are found within the evidence at step 384, the patterns 61 can then be assigned the semantic representation 56 using the module 57 at step 386, in order to create the story element 17. Optionally, at step 30 the text module 70 can be used to insert/link the story element 17 into story text 72.

Further, it is recognized that output of the story 19 could be saved as a story document (e.g. as a multimedia file) in the storage 102 and/or exported from the tool 12 to a third party system (not shown) over the network, for example, for subsequent viewing by other parties. It is recognized that viewing of the story 19, once composed and/or during creation, can be viewed as an interactive movie or slideshow on the display. It is also recognized that the story document could also be configured for viewing as an interactive movie or slideshow, for example. It is recognized that the format of the story document can be done either natively in the tool 12 format, or it can be exported to various formats (mpg, avi, powerpoint, etc).

It is understood that the operation of the visualization tool 12 as described above with respect to the stories 19 can be implemented by one or more cooperating modules/managers of the visualization tool 12, as shown by example in FIG. 32.

Timeline Bar and Focus Bar

The visualization interface 202 may also include a timeline bar 840 and an adjacent/coupled focus bar 850 as shown in FIGS. 1, 46a, 46b, 46c, 46d, 46e, 46f. The bars 840, 850 allow the user to navigate and scroll through data objects 14 and/or associations 16 displayed in the visualization representation 18 (see FIG. 1). Use of the bars 840, 850 and their various controls, as further described below, provide for adjustments in the visible objects 14, associations 16, and the corresponding time range (e.g. focus range 844) of the temporal domain shown in the visualization representation 18. The use of the bars 840,850 provides for the user to focus on specific periods of time, zoom in on particular sequences of objects 14—associations 16, or to watch events unfold in an animation.

Referring to FIG. 46g, the time bar 840 properties (e.g. scale, selected limits 837,838,841,843, focus slider 842 operation, etc.) is coordinated/defined/implements by a time module 112a and the focus bar 850 properties (scale, associated chart 890, extents—e.g. 841,843—, etc.) is coordinated/defined/implemented by a focus module 112b of the VI module 112, in association with any other herein described modules of the tool 12 and/or the user events 109.

The timeline bar 840 and focus bar 850 are time scales (e.g. linear, logarithmic) that are visible on the side of the visual representation 18. It will be appreciated, however, that these bars 840, 850 could also be located above, below or on either side of the visual representation 18, or on any other portion of the user interface 202. A user can interact with the timeline bar 840 to set a focus range 844 of a total available time period 839 (e.g. having defined global time/temporal limits 837,838 displayed—or otherwise—of the time bar 840), which defines the temporal range of the data objects 14 and/or associations 16 that may be displayed (e.g. selected from the dataset of available data objects 14 and associations 16 in the specified temporal domain) in the visualization representation 18. The focus bar 844 includes an assigned local future/start data limit 841 (e.g. selectable by the user), an assigned local past/end data limit 843 (e.g. selectable by the user). The time bar 840 includes a focus slider 842 having the same local limits 841,843 (e.g. having similar time extents as the focus range 844) that represents a defined/selected window/block of time (e.g. a time range) that can be moved/manipulated along the timeline bar 840 having the defined total temporal global extents of times 837,838, a start focus time control 848 that is used to set one side of the temporal local limit of the focus slider 842, a end focus time control 846 that is used to set the other side of the temporal local limit of the focus slider 842, and time indicators 847 that represent units of measure for time along the timeline bar 840 (e.g. having an axis 845). Together, the start local limit 841 and the end local limit 843 are used by the visualization tool 12 to define the entire set of data objects 14 and/or associations 16 that are potentially viewable (with manipulability) in the visualization representation 18 by the user via interaction with the user interface 202, and as such the local limits 841,843 define the temporal boundaries of the displayed data objects 14 and/or associations 16 (i.e. those objects 14 and/or associations 16 having temporal attributes that are outside of the local limits 841,843 would not be available for viewing in the visualization representation 18).

Accordingly, it is recognized that the focus bar 850, as defined having the same time local limits 841,843 as the focus range 844, is used by the visualization tool 12 to select a subset of data objects and/or associations 16 from the total (those data objects and/or associations 16 associated with temporal attribute(s) included in the temporal domain between the defined global limits 837,838) for display as a subset in the visualization representation 18.

The bars 840,850 together are used in the visualization representation 18 to represent a temporal coordinate system defined by the axis 845, providing a reference dimension of temporal measurement through unit lengths (i.e. time indicators 856 of the focus bar 850), which are marked off along the time axis 845 (e.g. using equidistance intervals to represent a linear time scale of the temporal domain). The timeline bar 840 is in a dynamic coupled relationship with the focus bar 850 and the visualization representation 18, such that the focus bar 850 contains an expanded time range defined by the focus range 844 (i.e. the start and end times—extents—of the focus bar 850 can be the same as the start and end times—extents—of the focus range 844) of the timeline bar 840.

For example, the unit distance (e.g. scale) between the time indicators 856 is larger than the unit distance between the time indicators 847 and/or there are a fewer number of time indicators 856 as compared to the time indicators 847, i.e. the temporal scale provides a "shorthand" form for discussing relative temporal lengths between adjacent indicators 847, 856.

In interaction with the bar(s) 840, 850 by the user (e.g. mouse clicks, keyboard entries, etc. through user events 109) directs a module to instruct, for example, the Visualization manager 300 to communicate with the data manager 114 for generating a subset of data objects 14 and/or associations 16 that have temporal attributes that are within the focus range 844 (i.e. defined range of time between local limits 841,843). Alternatively, the manager 300 may instruct another module (such as the Aggregation Module) to generate a subset of the data objects 14 and/or associations 16. The Visualization manager 300 receives the subset of data objects 14 and/or associations 16 from the Data manager 114 (or the Aggregation Manger of the Aggregation Module 600) and uses, generates or updates the visualization components 308 (e.g. sprites). The manager 300 communicates the sprites 308 to the VI Manager 112. The VI Manager 112 renders the sprites 308 to create the final image including visual elements representing the data objects 14 and/or associations 16 for display in the visual representation 18 on the interface 202.

Referring again to FIG. 46b, the expanded time scale of the focus bar 850 (having the local limits 841,843 for defining the temporal range of the focus bar 850), as compared to the time scale of the timeline bar 840 (having the global limits 838,838 for defining the total temporal range 839 of the time bar 840, such that the defined total temporal range 839 is greater than the defined focus range 844 and the defined focus range 844 is positioned within the defined total temporal range 839), is presented as an increase in the distance between similar measurement unit markings displayed on the user interface 202. For example, the distance on the user interface 202 between the measurement units of 10 AM and 11 AM in focus range 844 of the timeline bar 840 is less that the distance between corresponding measurement units of 10 AM and 11 AM in the focus bar 850. The measurement units can be referred to as time indicators 847,856, which represent a point in the temporal domain and the space (i.e. distance along the time axis) between time indicators 847,856 represents the period of time in the temporal domain between time indicators 847,856.

Accordingly, a user can focus on a narrower set of data objects 14 and/or associations 16 (i.e. potentially available having a temporal attribute between the local limits 841,843) by interacting with the focus slider 842 to set the focus range 844. A user may, for example, only wish to view data objects 14 and/or associations 16 from a start period t1 to an end period t2 (i.e. the focus range 844). A user can, for example, select the past/start focus time control 848 with the mouse and drag it to a selected time indicator 847 which corresponds to t1. Likewise, the user can select the future/end focus time control 846 and drag it to a selected time indicator 847 which corresponds to t2, thereby defining the extent (e.g. time range/window) of the focus slider 842.

Focus Bar 850

As described above, the focus bar 850 is an expanded view of the focus range 844 that is selected/defined on the timeline bar 840. The focus bar 850 includes a past focus time 852 and a future focus time 854 that are defined as the time range (i.e. limits 841,843), set by the focus range 844, focus time indicators 856 that define the time units of measure (e.g. equidistant) and a moment of interest control 858 for representing the location of the reference surface 404. The Visualization manager 300 can receive user events 109 as the user interacts with the past focus time control 848 and the future focus time control 846. The Visualization manager instructs the VI manager 112 to redraw the focus bar 850 and to set the past focus time 852 to the time indicator 847 that corresponds to the past focus time control 848 and to set the future focus time 852 to the time indicator 847 that corresponds to the future focus time control 846. The VI manager renders a new focus bar 850 to the user interface 202 each time the user interacts with the controls 846,848 of the timeline bar 840, such that the time indicators 856 are distributed on the timescale 845 of the focus bar 850 between the limits 841,843.

The moment of interest control 858 is a marking used to represent the point in the temporal domain at which the reference surface 404 of the visualization representation 18 is located. The moment of interest control 858 can be located anywhere along the focus bar 850, for example at one of the extents of the focus bar 850 such as the focus time 852. The moment of interest control 858 represents the temporal state of the objects 14 and/or associations 16 present with respect to the reference surface 404. The instant of focus control 858 can be a primary temporal control of the visualization representation 18. It can be adjusted by dragging it up or down with the mouse pointer across the focus bar 850 to the desired position. The instant of focus (also known as the browse time) is the moment in time represented at the reference surface 404 in the spatial-temporal visualization representation 18. As the instant of focus control 858 is moved by the user forward or back in time along the focus bar 850 the display of the visualization representation 18 is updated. For example, the placement of event visual elements 14 animate along the timelines and entity visual elements 14 move along the reference surface 404 interpolating between known location visual elements (see FIGS. 6 and 7). Examples of movement of the instant of focus 858 are given with reference to FIGS. 14, 15 and 16 above. It is recognized, as discussed above, the that focus control 858 can be positioned at one of the extents (e.g. focus times 852,854) and therefore the position of the focus control 858 in the temporal domain is adjusted as the focus slider 842 is manipulated/moved along the timeline bar 840.

Operation of the Bars 840, 850

As mentioned above, interaction with the timeline bar 840 through user events 109 provides for dynamic updates to the visualization representation 18 via the VI manager 112. For example, a user may drag the past focus time control 848 back (e.g. to a different location along the time bar 840) in time (i.e. towards the past data limit 843) thereby increasing the focus range 844. This causes the past focus time 841 of the focus bar 850 to be adjusted to the same time as the adjusted time setting of the past focus time control 848 (e.g. setting the control 848 to 12:30 pm would cause the time module to set the focus time 841 also to 12:30 pm). In turn, the display of the objects 14 and/or associations 16 in the visualization representation 18 will be updated to reflect the change in the discussed temporal boundary, as commensurate with the newly defined limits 841,843 also populated/assigned to the focus bar 850. It will be appreciated that the visualization representation 18 could display additional visual elements representing additional data objects 14 and/or associations 16 because the temporal range represented in the visualization representation 18 (i.e. the focus range 844) is now larger. Alternatively, the user may decrease the focus range 844 by moving the past focus time control 848 forward in time (i.e. towards the future data limit 841) and/or the future focus time control 846 backward in time (i.e. towards the past data limit 843). Each time the user moves either the past focus time control 848 or the future focus time control 846, the corresponding limits of the focus bar 850, namely the focus times 854, 852 are also adjusted to match, and as well the corresponding new visualization representation 18 is generated. An example of changing the controls 846,848 is shown in FIG. 46c.

Also in FIG. 46c, it should be noted that the distance between the measurement units (e.g. time indicators 856) adjusts accordingly to reflect the changes in the focus times 841,843. It is recognized that the length of the axis 845 of the focus bar 850 can remain constant while the changes in the focus times 841,843 and associated distance between the measurement units (e.g. time indicators 856) is coordinated by the time module (of the visualization tool 12—see FIG. 1). It is also recognized that the length of the axis 845 of the timeline bar 840 remains constant during adjustment of the controls 846,848, as does the associated distance (i.e. remain constant) between the measurement units (e.g. time indicators 847) of the timeline bar 840, as the extents of the focus slider 842 are widened/narrowed.

Figure 46A:
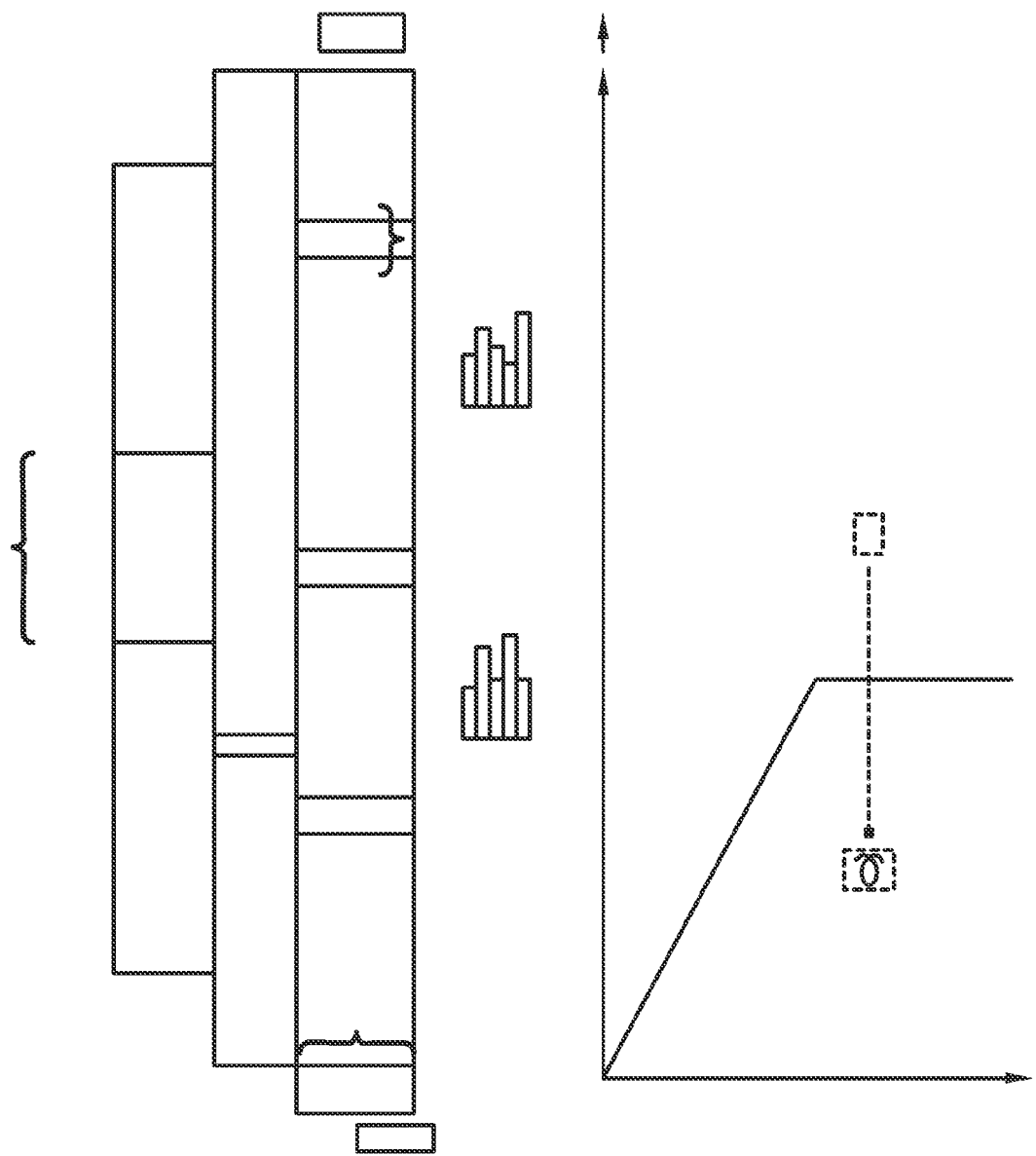
FIGS. 46a,b,c,d,e,f show example operations of the timeline bar and focus bar of the tool of FIG. 3.
Figure 46B:
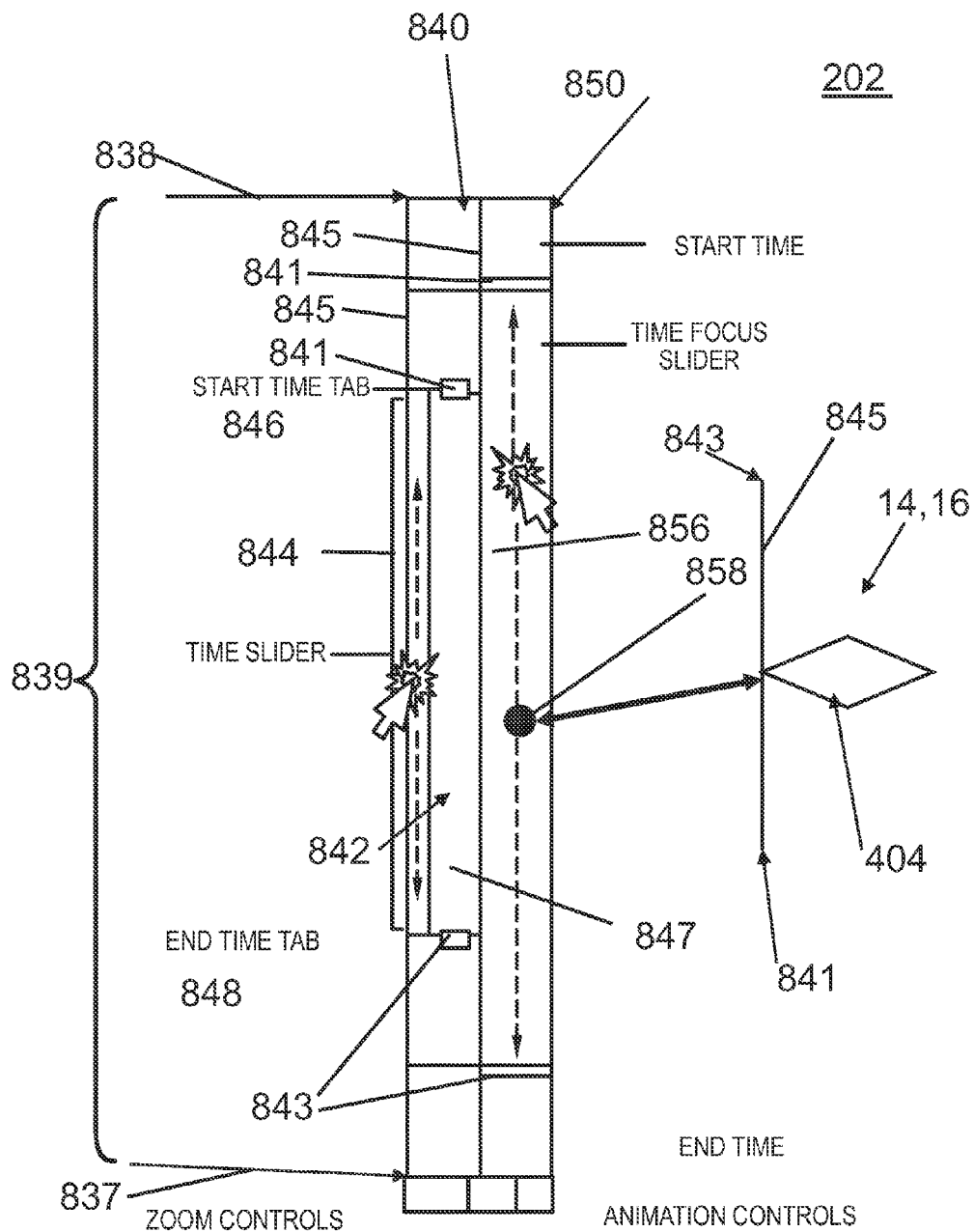
FIG. 46g is an embodiment of visualization of the tool of FIG. 1.
Figure 46D:
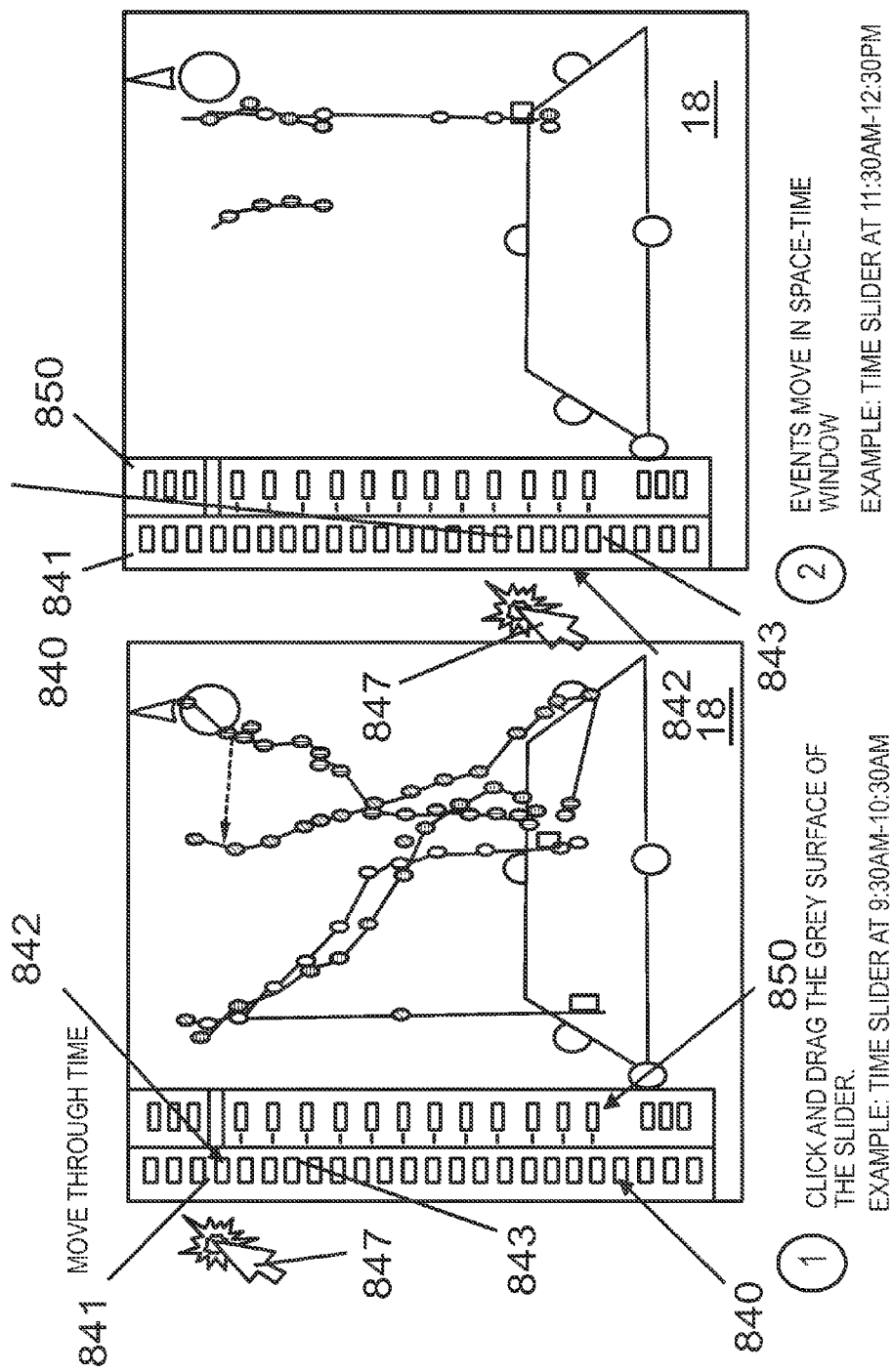

Also, referring to FIG. 46d, the user has an option of dynamically scrolling through the entire data set (i.e. the data objects 14 across the entire temporal range available defined by the past data limit 837 and the future data limit 837) using a fixed focus range 844. The fixed focus range 844 acts a window/defined temporal block in the temporal domain in which to view the movement, activity and other characteristics associated with data objects 14 and/or associations 16. The user can select the focus slider 844 with a mouse cursor 847 and move it up and down along the timeline bar 840. Updates to the contents of visualization representation 18 will be generated on the user interface 202 as the focus slider 844 is moved. It is also noted in FIG. 46d that as the focus slider 842 is translated along the timeline bar 840, the effect of scrolling though time is presented in the focus bar 850 as the time indicator 856 contents of the focus bar 850 are adjusted/updated to match the changes in the focus times 841,843 driven through movement of the focus slider 842. In this example, the extent of the focus slider 842 remains constant as the focus slider 842 is translated/displaced along the timeline bar 840. Continuous animation of data objects 14 and/or associations 16 over time and geography is therefore provided in the representation 18 as the focus slider 842 is moved forward and backward in time on the timeline bar 840.

Referring to FIG. 46e, the displayed temporal scale of the visualization representation 18 can be adjusted independently from the bars 840,850 through manipulation of a scale control 859, for example located on the axis 845.

It will be appreciated that the instant of focus 858 may represent any instant of time that is of interest to the user in the temporal domain. For example, the instant of focus may represent a central period whereby data elements 20, 21, 22, 23, 24, 26 are shown above or below the reference surface 404 depending on their corresponding temporal property. A user, however, may choose the instant of focus to be a starting time (i.e. the past focus time 841), so that data elements 20, 21, 22, 23, 24, 26 are shown on or above the reference surface 404.

Analysis Module 1000

Figure 48:
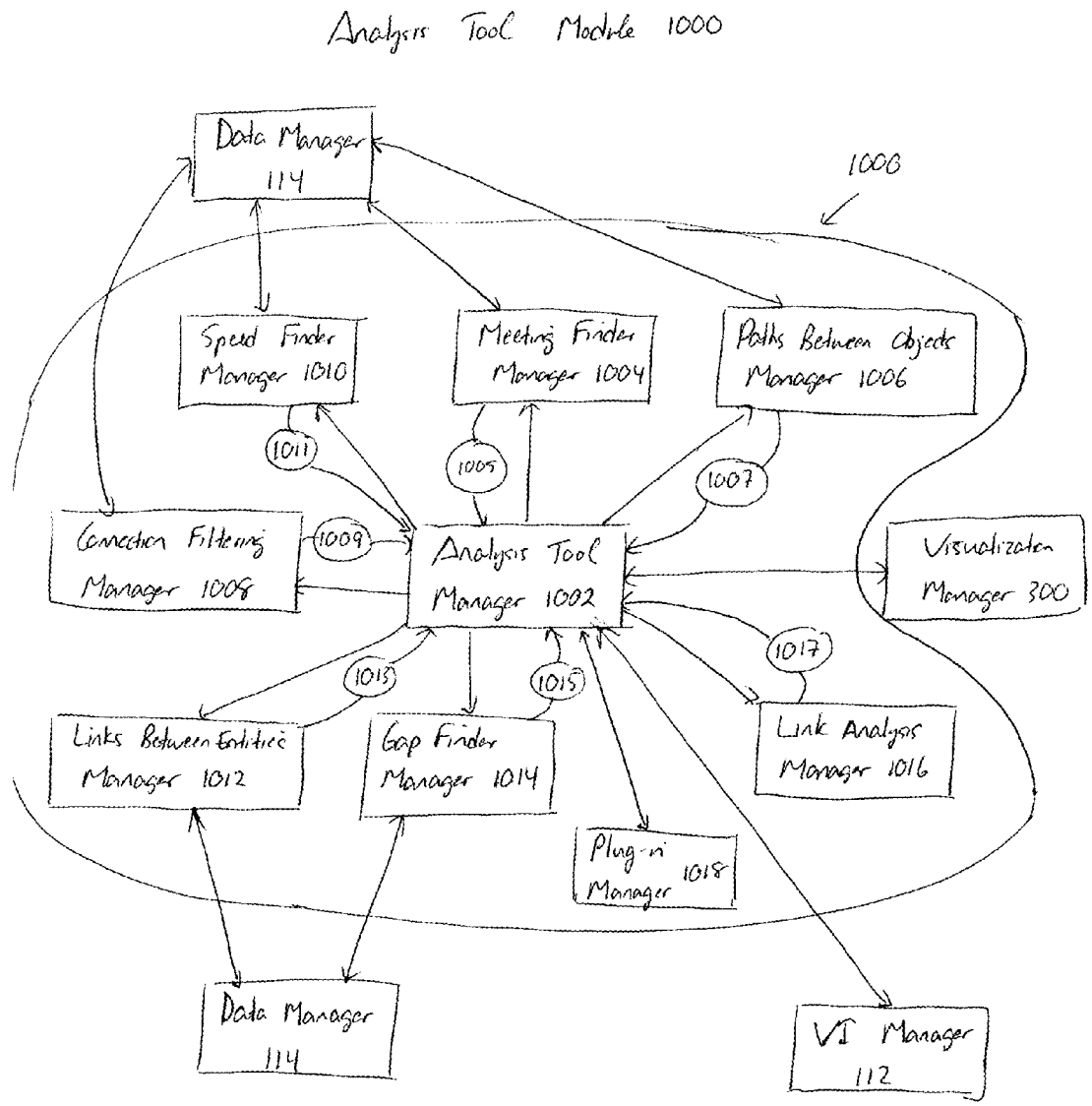
FIG. 48 illustrates a further embodiment of the tool of FIG. 3.

Referring to FIG. 48, the Analysis Module 1000 is for, such as but not limited to, summarizing a subset of data objects 14 based on user-defined criteria, and providing the subset of data objects 14 as an interactive visual result list 1028, 1034, 1046, 1054, 1068, 1074, 1086 (see FIG. 49a) to the VI Manager 112 for rendering to the visual interface 202. It is also recognized that the data in the result lists 1028, 1034, 1046, 1054, 1068, 1074, 1086 can be displayed in the visualization representation 18 in the form of a selected chart type (e.g. summary chart 890—including for example table output 876 and/or chart output 886—and/or count charts 1208).

User events 109 that are input via interactions with the analysis control functions/operators 1020, 1030, 1040, 1050, 1060, 1070 and 1080 (see FIG. 49a), as part of the interface controls 306, are processed by the Visualization manager 300. Each analysis control function 1020, 1030, 1040, 1050, 1060, 1070 and 1080 can be associated with individual respective managers/modules 1004, 1006, 1008, 1010, 1012, 1014 and 1016. As described below by example, the Analysis Module 1000 is extendible and may have any number of analysis control functions each of which can be associated with a respective manager/module. The analysis control functions may be pre-defined in the tool 12 and/or added dynamically by the user via interaction with the user interface 202. As the user interacts with an analysis control module 1000, the Visualization manager 300 communicates with the Analysis Manager 1002 which in turn issues instructions to the manager that is associated with the control the user is interacting with, for example. For example, when the user interacts with the Gap Finder control 1080 the Visualization manager 300 communicates with the Analysis manager 1002, which instructs the Gap Finder Manager 1014 to create a visual result list 1086.

Figure 46F:
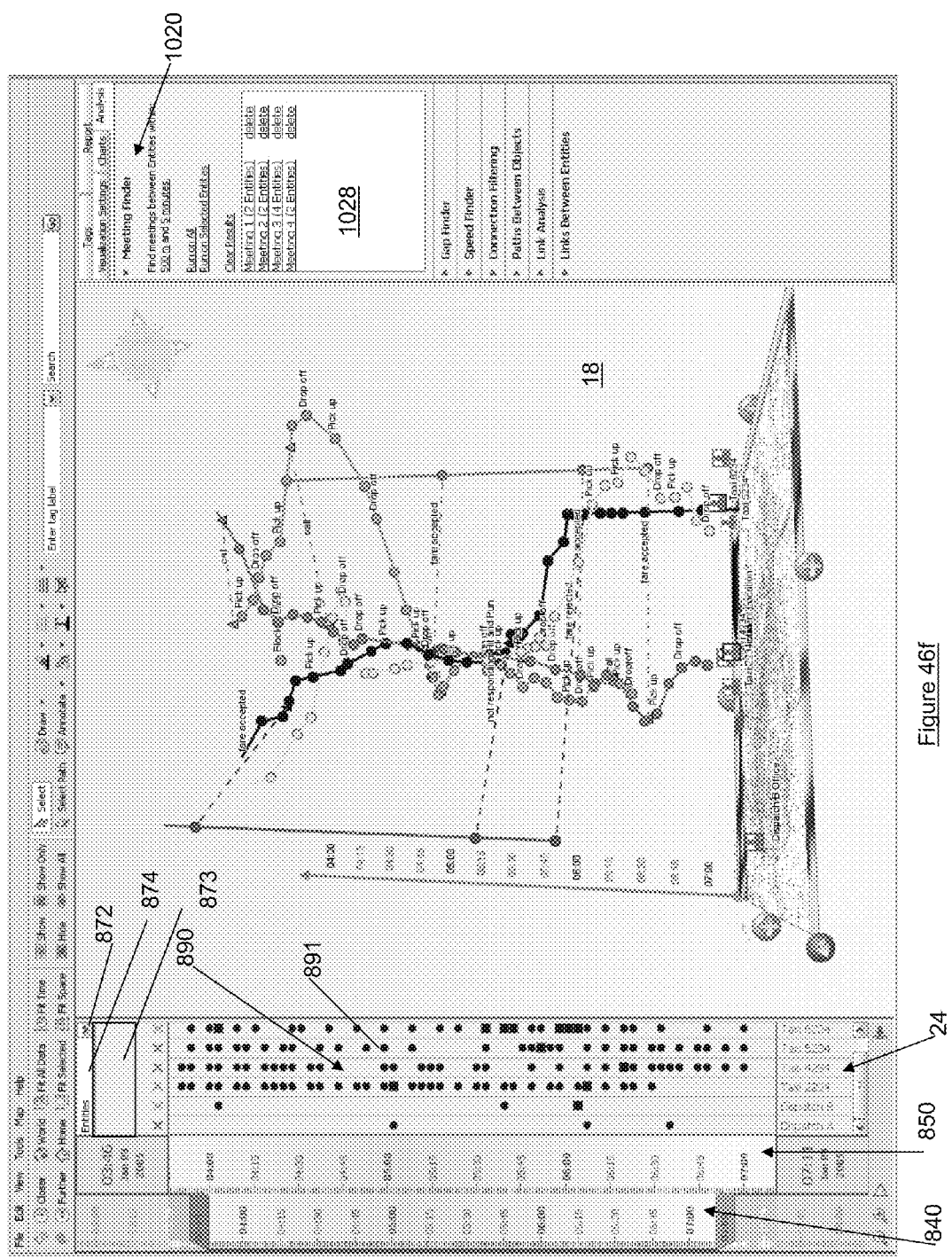

It is also recognized that the user can interact directly via the interface 202 with the desired control module 1004, 1006, 1008, 1010, 1012, 1014 and 1016 of the analysis module 1000, as desired. An advantage of the using any of the analysis control functions 1020, 1030, 1040, 1050, 1060, 1070 and 1080 is that the respective results list(s) 1028, 1034, 1046, 1054, 1068, 1074, 1086 can be output in chart form (e.g. summary chart 890, count chart 1208, etc.) and displayed in association with the timeline and/or focus bar(s) 840,850 (see FIGS. 46a and 46f. For example, each of the entries 891 in the summary chart 890 of FIG. 46f are assigned to a respective (one or more) time indicators 856 of the focus bar 850. It is also recognized that each of the entries in the summary chart 890 of FIG. 46f can be assigned to a respective (one or more) time indicators 847 of the time bar 840, as an alternative or in addition to the indicators 856 as shown by example.

Meeting Finder Control 1020

Figure 49A:
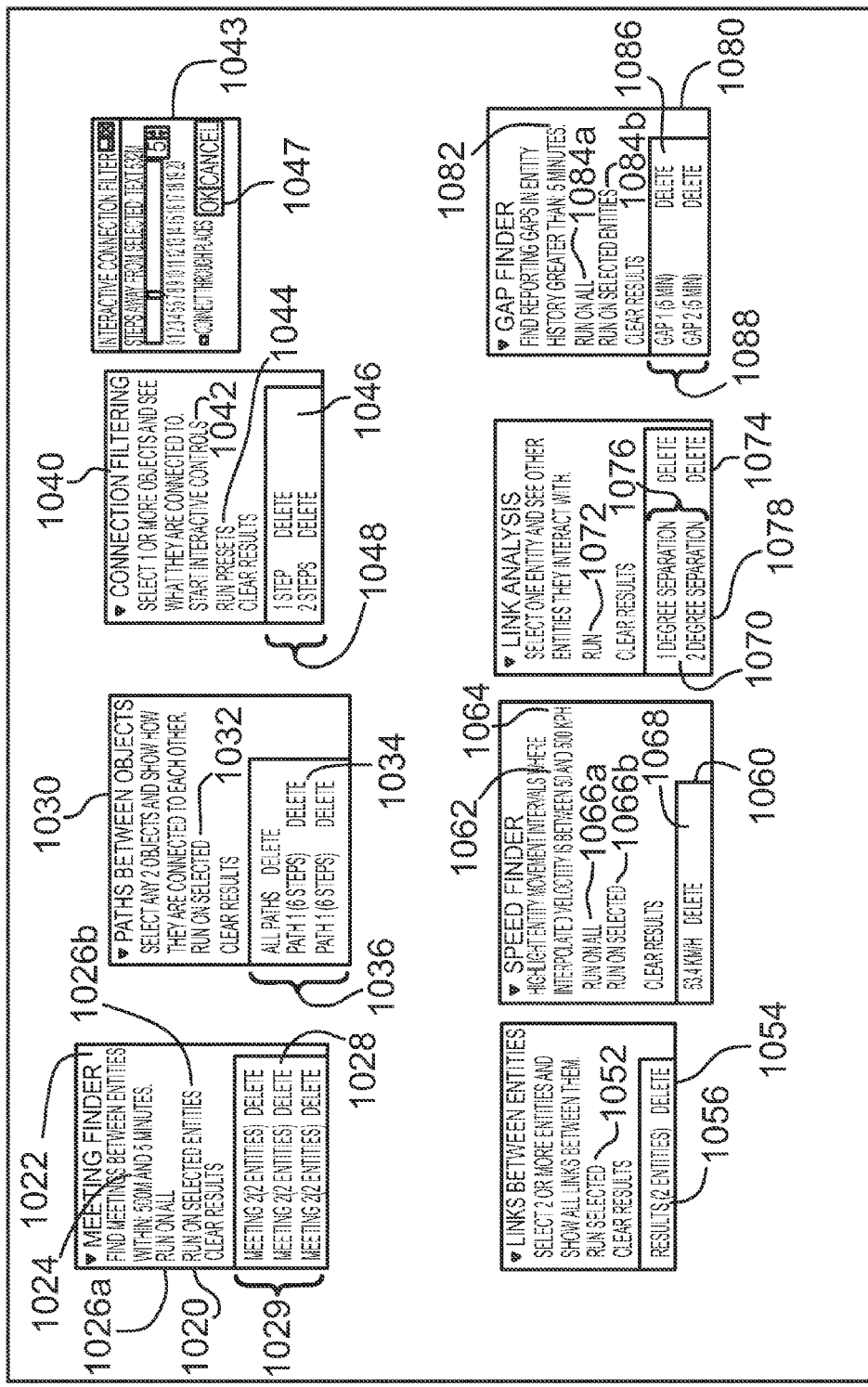
FIGS. 49a,b,c,d,e,f,g,h show example analysis tool controls of the tool of FIG. 48.

Referring to FIG. 49a, the meeting finder control 1020 enables a user to find meetings (i.e. a type of event 20) between entities 24 that are within a selected distance in the spatial domain and a selected range of time in the temporal domain. The meeting finder control 1020 includes a distance setting 1022, a range setting 1024, execute data object 14 selections 1026a and 1026b, and result list 1028. The result list 1028 includes identified meetings 1029 that are within the event/meeting search parameters defined by the distance setting 1022 and the range setting 1024. In operation, a user sets the search parameters 1022,1024 by interacting with the distance setting selector 1022 and the range setting selector 1024. The user can choose to execute the search against all of the entities 24 in the visual representation 18 or a subset (e.g. group) of entities 24 that have been selected by the user from the visual representation 18 of the user interface 202. It is also recognized that the meetings 1029 can be included in chart information (e.g. as meeting counts for each entity 24).

Interactions with the execute functions 1026a,1026b are handled by the Visualization manager 300. The Visualization manager 300 instructs the Analysis Tool Manager 1002 to retrieve the subset of data objects 14 that is within the search parameters 1026a,1026b. The Analysis Tool Manager 1002 communicates the request to the Meeting Finder Manager 1004 which queries the Data Manager 114. The Data Manager 114 provides a data subset to the Meeting Finder Manager 1004 which formulates the data as an output 1005. Finally, the Analysis Tool Manager 1002 instructs the VI Manager 112 to render the output 1005 as an interactive visual result list 1028 on the user interface 202.

Figure 49B:
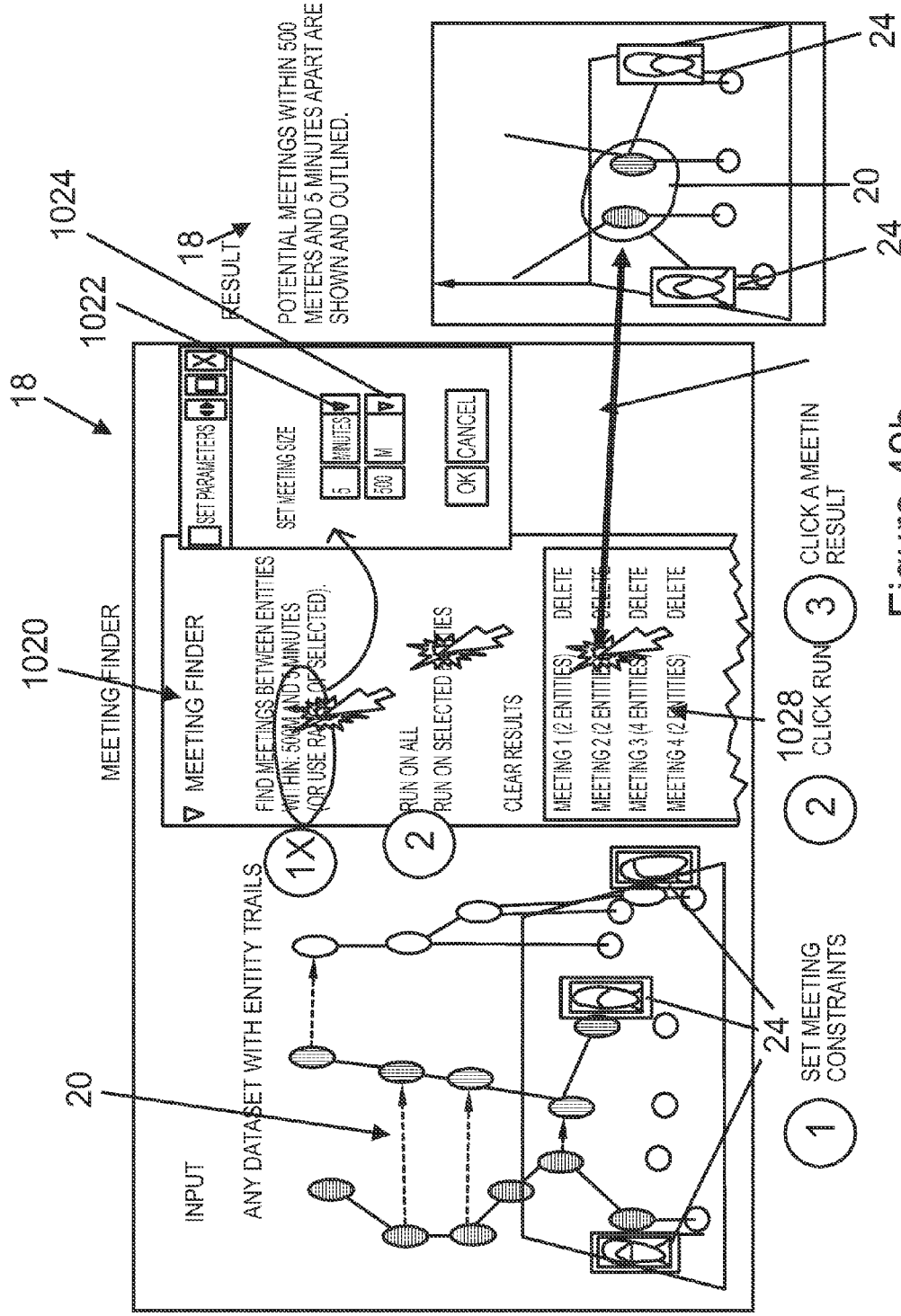

Referring to FIG. 49b, the Meeting Finder control 1020 finds occurrences where selected 1026a,b Entities 24 are co-located within a user-specified space and time ranges 1022,1024. For example, if two Entities 24 have any events 20 that are less than the set time span apart, AND those same events 20 are less than the set distance apart, those two events 20 will be considered a meeting 20 and placed in the result list 1028. If multiple meetings 20 share the same events 20, they will be merged into one large meeting 20 (e.g. a result of event aggregation as further described herein).

Gap Finder

Referring to FIG. 49a, the Gap Finder Control 1080 enables a user to find reporting gaps 1088 of entities 24 which are greater than a specified amount of time 1082 in the temporal domain. Reporting gaps 1088 are temporal periods in which there is no occurrence of an entity 24 in the visual representation 18. The Gap Finder Control 1080 includes a range selector 1082, selection functions for data object 14/entity 24 selection 1084a, 1084b and result list 1086. Result list 1086 is populated with the gaps 1088 that are within the search parameter 1082 when the user selects one of the selection functions 1084a, 1084b.

Interactions with the functions 1084a,1084b are handled by the Visualization manager 300. In an example operation of the control 1080, the Visualization manager 300 instructs the Analysis Manager 1002 to retrieve the subset of data objects 14 that is within the search parameters 1082 1084a,b. The Analysis Manager 1002 communicates the request to the Gap Finder Manager 1014 which queries the Data Manager 114. The Data Manager 114 provides the data subset to the Gap Finder Manager 1002 which formulates the data as an output 1015. The Analysis Manager 1002 then instructs the VI Manager 112 to render the output 1015 as an interactive visual result list 1086 on the user interface 202 (e.g. in chart form 890, 1208 in the visual representation 18).

Figure 49C:
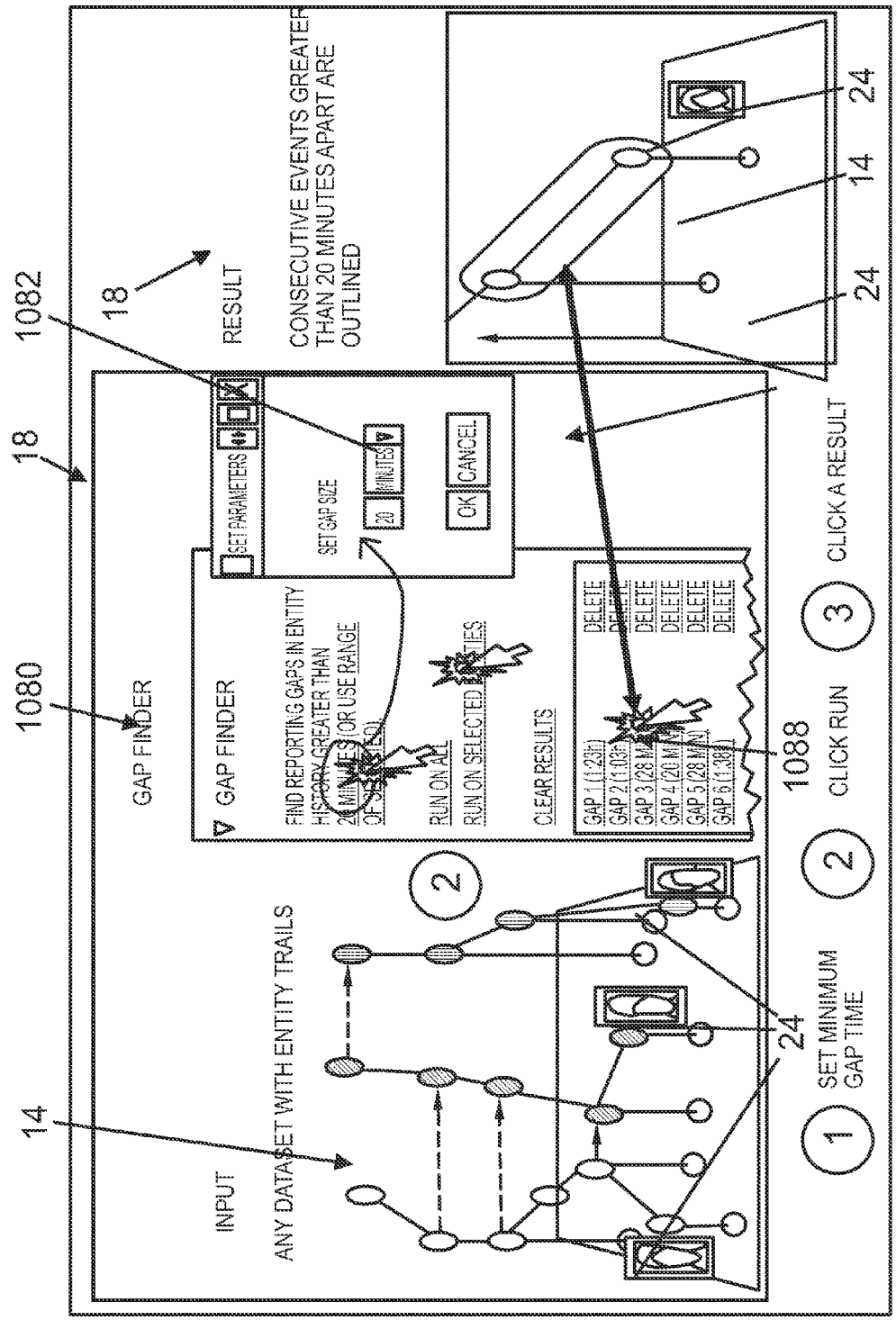

Accordingly, in view of the above, and in reference to FIG. 49c, the Gap Finder 1080 searches and reports on time gaps 1088 in an entities 24 event 20 history of the visual representation 18. The minimum time span 1082 of the potential gap(s) can be set by the analyst. The gap finder 1080 will find gaps 1088 in reporting (e.g. in the information of the data objects 14) greater than the set time value, for example.

Speed Finder

Referring to FIG. 49a, the Speed Finder Control 1060 enables a user to find and highlight entity 24 movement intervals in a results list 1068 where an interpolated velocity of the interval is between a lower speed 1062 and an upper speed 1064. Speed is the rate of change of position in the spatial domain, and is expressed in units of distance divided by time. The interpolated speed can be the average speed of an entity 24 when travelling between two positions in the spatial domain. It is recognized that the results list 1068 can also indicate where the identified entity 24 has exceeded the maximum/upper speed 1064, for example. The Speed Finder Control 1060 includes a lower speed parameter 1062 selection, an upper speed parameter 1064 selection, entity 24 selection functions 1066a, 1066b, and result list 1068. Together, the upper speed 1064 and the lower speed 1062 define some of the search parameters. The results list 1068 can include entities 24 that are within the search parameters 1062, 1064 (e.g. entities 24 that are travelling at an interpolated speed between the lower speed 1062 and the upper speed 1064).

In an example operation of the module 1080, interactions with selection functions 1066a, 1066b are handled by the Visualization Manager 300. The Visualization Manager 300 instructs the Analysis Manager 1002 to retrieve the subset of data objects 14 that corresponds to the search parameters 1062, 1064. The Analysis Manager 1002 communicates the request to the Speed Finder Manager 1010 which queries the Data Manager 114 with the search parameters 1062, 1064. The Data Manager 114 provides the data subset to the Speed Finder Manager 1010 which formulates the data as output 1011 for processing by the VI Manager. The Analysis Manager 1002 instructs the VI Manager 112 to render the output 1011 as an interactive visual result list 1086 on the user interface 202 (e.g. in chart form 890, 1208 in the visual representation 18).

Figure 49D:
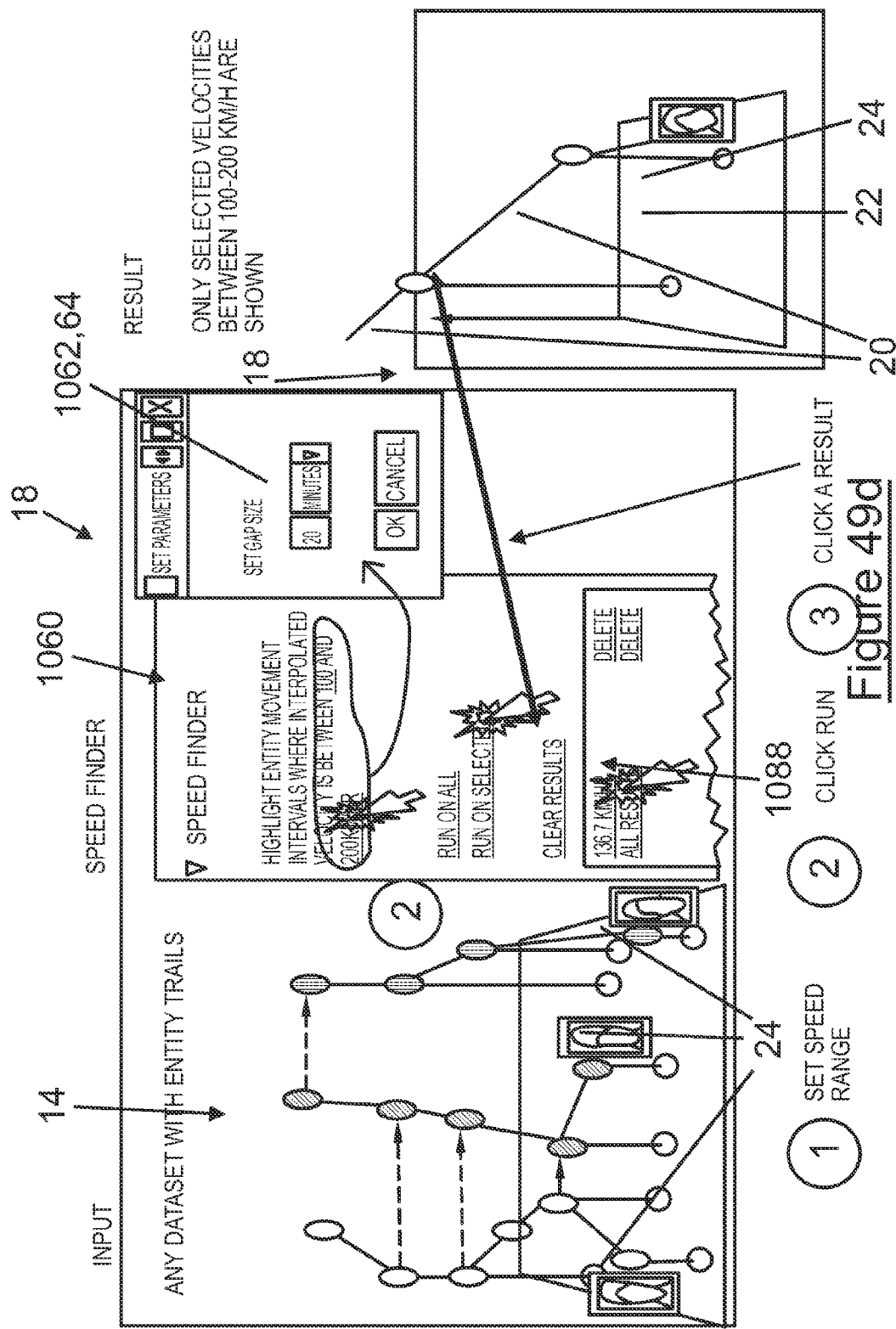

Accordingly, in view of the above, and in reference to FIG. 49d, the speed Finder 1060 finds occurrences of Entity 24 movement speed based on interpolated/maximum velocity between two consecutive events 20 and/or at or near a selected location 22. For example, the user can set a range and/or maximum velocity 1062,1064 to be found for the data objects 14 displayed in the visualization representation 18.
Connection Filtering Referring to FIG. 49*a*, the Connection Filtering Control 1040 allows a user to select one or more data objects 14 and to visualize what the selected data objects 14 are connected to. The Connection Filtering Control 1040 includes object selection functions 1042, 1044 and result list 1046. The result list 1046 is formulated by the Connection Filtering Manager 1008 and rendered to the visual interface 202 by the VI Manager 112 upon user interaction with the object selection functions 1042, 1044. Result list 1046 include results 1048 which represent the connections 1048 associated with the selected data objects 14. The results 1048 are interactive, for example, by clicking on the results 1048 to highlight the connections in the visual representation 18. The processing of interactions with the result list 1046 is handled by the Visualization manager 300 which instructs the VI Manager 112 to highlight the visual images in the visualization representation 18 that identify the particular result 1048 that the user has clicked on.

The Connection Filtering Control 1040 also includes an step/connection control 1043 for refining the number of steps away from the selected data object 14 that will retrieved and formulated by the Connection Filtering Manager 1008. For example, a user may select entity 24 on the visual representation 18 and use the step/connection control 1043 to indicate that the user wishes to see what the entity 24 is connected to within 2 steps. When the user selects object selection function 1043 the interaction is processed by the Visualization Manager 300.

In an example operation of the module 1040, the Visualization Manager 300 instructs the Analysis Manager 1002 to retrieve the subset of data objects 14 that corresponds to the search parameter 1043*a*. The Analysis Manager 1002 communicates the request to the Connection Filtering Manager 1008 which queries the Data Manager 114 with the search parameter 1043*a*. The Data Manager 114 provides the data subset to the Connection Filtering Manager 1008 which formulates the data as output 1009 for processing by the VI Manager 112. Finally, the Analysis Manager 1002 instructs the VI Manager 112 to render the output 1009 as a visual result list 1046 on the user interface 202 for viewing and further interaction by the user 202 (e.g. in chart form 890, 1208 in the visual representation 18).

Figure 49E:
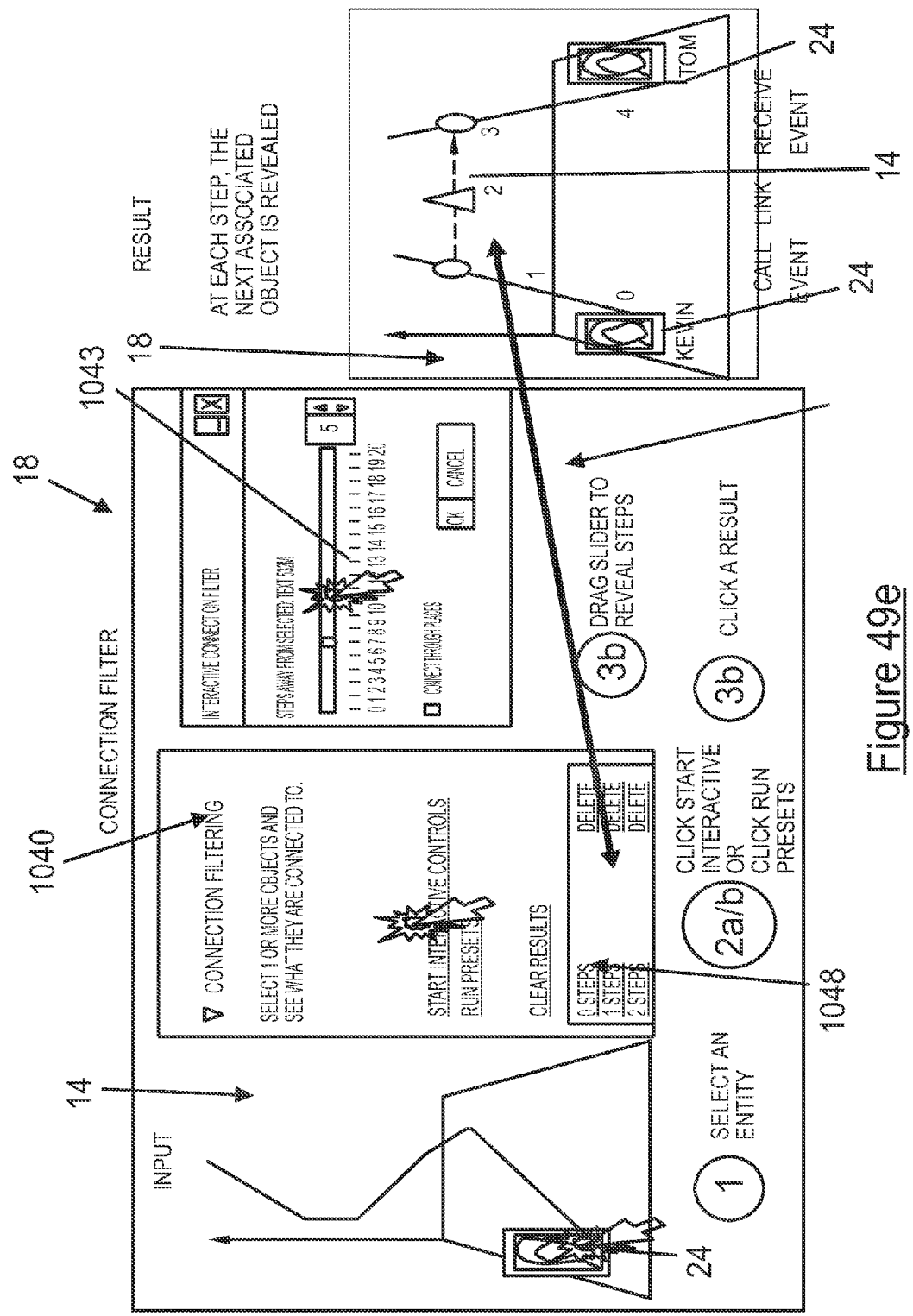

Accordingly, in view of the above, and in reference to FIG. 49*e*, Connection Filtering 1040 displays all objects 14,24 connected to selected objects 24, within the selected "x" steps 1043 away. A "step" 1048 result is a connection 14 between any two objects 14. For example, an Entity 24 is connected to one of its Events 24 by one step. A link 20 between two Entities 24, such as a communication 20, is composed of 4 steps, namely Entity_A to call-side event to link event, to receive-side event to Entity_B, for example.
Paths Between Objects Referring to FIG. 49*a*, the Paths Between Objects Control 1030 enables a user to select any two data objects 14 to see how they are connected to each other. The control 1030 includes an object selection function 1032 and a result list 1034 that list all the connections 1036 between the selected data objects 14.

In an example operation of the module 1030, when the user selects object selection function 1032 the interaction is processed by the Visualization Manager 300. The Visualization Manager 300 instructs the Analysis Manager 1002 to retrieve the subset of data objects 14 that corresponds to the search parameters (i.e. the selected data objects 14). The Analysis Manager 1002 communicates the request to the Paths Between Objects Manager 1006 which queries the Data Manager 114 with the search parameters. The Data Manager 114 provides the data subset to the Paths Between Objects Manager 1006 which formulates the data as output 1007 for processing by the VI Manager 112. Finally, the Analysis Manager 1002 instructs the VI Manager 112 to render the output 1007 as a visual result list 1034 on the user interface 202 for viewing and further interaction by the user (e.g. in chart form 890, 1208 in the visual representation 18).

Figure 49F:
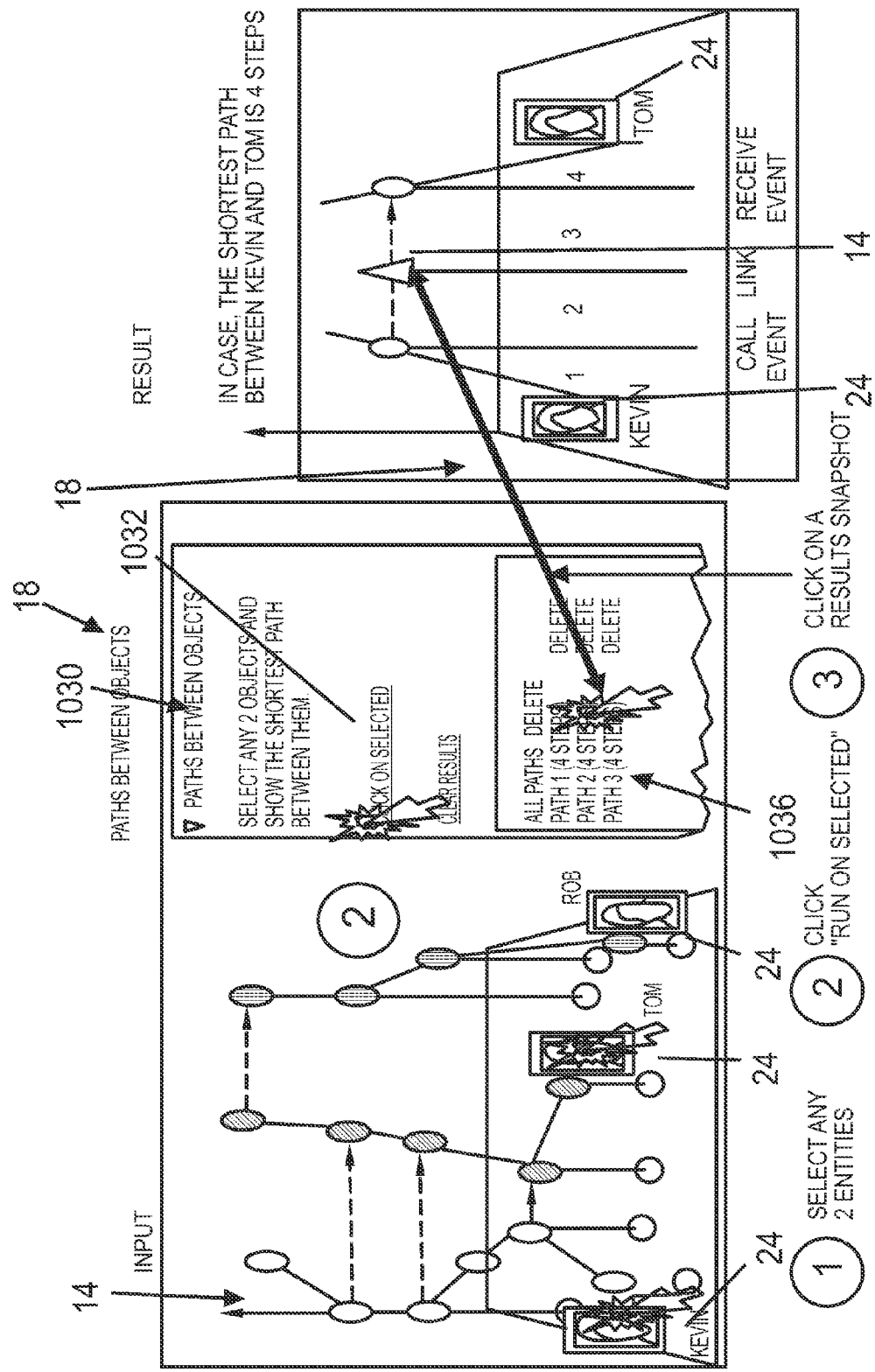

Accordingly, in view of the above, and in reference to FIG. 49*f*, the Paths Between Objects Control 1030 finds Paths 1036 (displayed as path objects 14) between 2 selected entities 24 to see how they are connected and how many steps separate them.
Link Analysis Referring to FIG. 49*a*, the Link Analysis Control 1070 enables the user to select an entity 24 on the visualization representation 18 and to visualize the degree of separation 1078 for the other entities 24 that the selected entity 24 interacts with. The control 1070 includes an entity selection function 1072 and a result list 1074 that is populated with results 1076 when the user interacts with entity selection function 1072. The results 1076 include a caption 1078 that indicates the degree of separation between the selected entity 24 and the other entities 24 it interacts with.

In an example operation of the module 1070, User interaction with the entity selection function 1072 is processed by the Visualization Manager 300. The Visualization Manager 300 instructs the Analysis Manager 1002 to retrieve the subset of data objects 14 that corresponds to the search parameters (i.e. the selected data objects 14). The Analysis Manager 1002 communicates the request to the Link Analysis Manager 1016 which queries the Data Manager 114 with the search parameters. The Data Manager 114 provides the data subset to the Link Analysis Manager 1016 which formulates the data as output 1017 for processing by the VI Manager 112. Finally, the Analysis Manager 1002 instructs the VI Manager 112 to render the output 1017 as a visual result list 1074 on the user interface 202 for viewing and further interaction by the user (e.g. in chart form 890, 1208 in the visual representation 18).

Figure 49G:
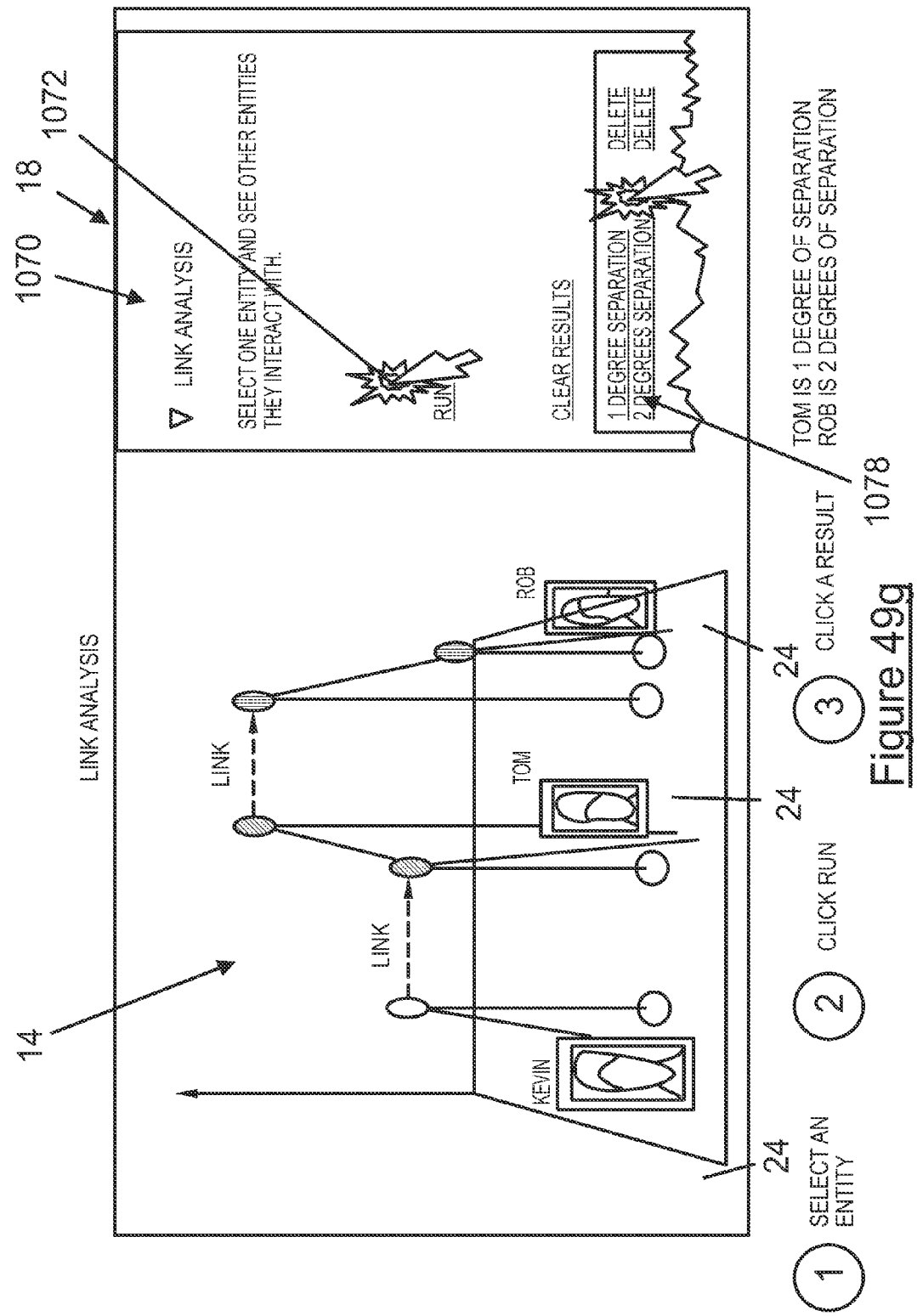

Accordingly, in view of the above, and in reference to FIG. 49*g*, Link Analysis Control 1070 determines via selection 1072 the degree of separation 1078 for the other entities 24 that the selected entity 24 interacts with.
Links Between Entities 24

Referring to FIG. 49*a*, the Links Between Entities Control 1050 enables a user to view all of the links between two or more entities 24. The control 1050 includes an entity selection function 1052 and a result list 1054 that is populated by an interactive list results that represent the links 1056 between the selected entities 24. Selecting two or more entities 24 on the visual representation 18 can define the search parameters.

In an example operation of the module 1052, interactions with the entity selection function 1052 are managed by the Visualization manager 300. The manager 300 instructs the Analysis Manager 1002 to retrieve a subset of data that corresponds to the search parameters. The Analysis Manager communicates the instruction to the Links Between Entities Manager which queries the Data Manager 114. The Data Manager 114 provides the data set to the Links Between Entities Manager 1012 which formulates the data subset as output 1013 for processing by the VI Manager 112. The VI Manager renders the output 1013 as the visual result list 1056 for viewing and further interaction by the user (e.g. in chart form 890, 1208 in the visual representation 18).

Accordingly, in view of the above, and in reference to FIG. 49h, Links Between Entities control 1050 displays all link events (such as communications, relationships and other transactions) between 2 or more selected entities via the entity selection function 1052.

Extensibility

Referring to FIG. 48, the Analysis Module 1000 includes a Plug-in Manager 1018 for managing additional analysis tools that a user may desire to incorporate into the Visualization Tool 12. A user can add new analysis tools via the user interface 202. The Visualization manager 300 processes this type of interaction and instructs the Analysis Manager 1000 to create a new analysis tool and to render the visual representation of the new tool to the screen via the VI Manager 112. It will be appreciated that any number of analysis tools can be dynamically added to the tool 12 by the user. For example, a user may wish to have an analysis tool to track certain types of events 20 (e.g. such as cash transactions) or to follow all activity between two locations 22.

Event Aggregation

Figure 50A:
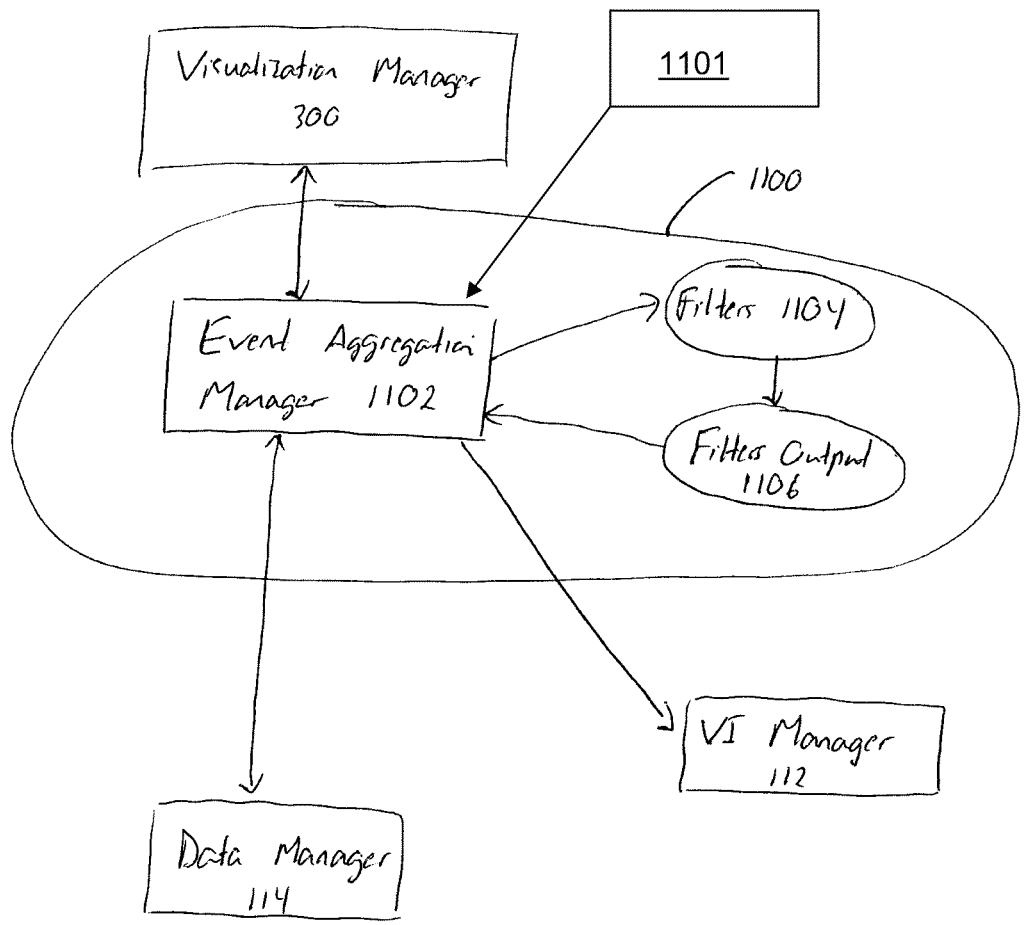
FIGS. 50a,b show a further embodiment of the tool of FIG. 3.
Figure 50B:
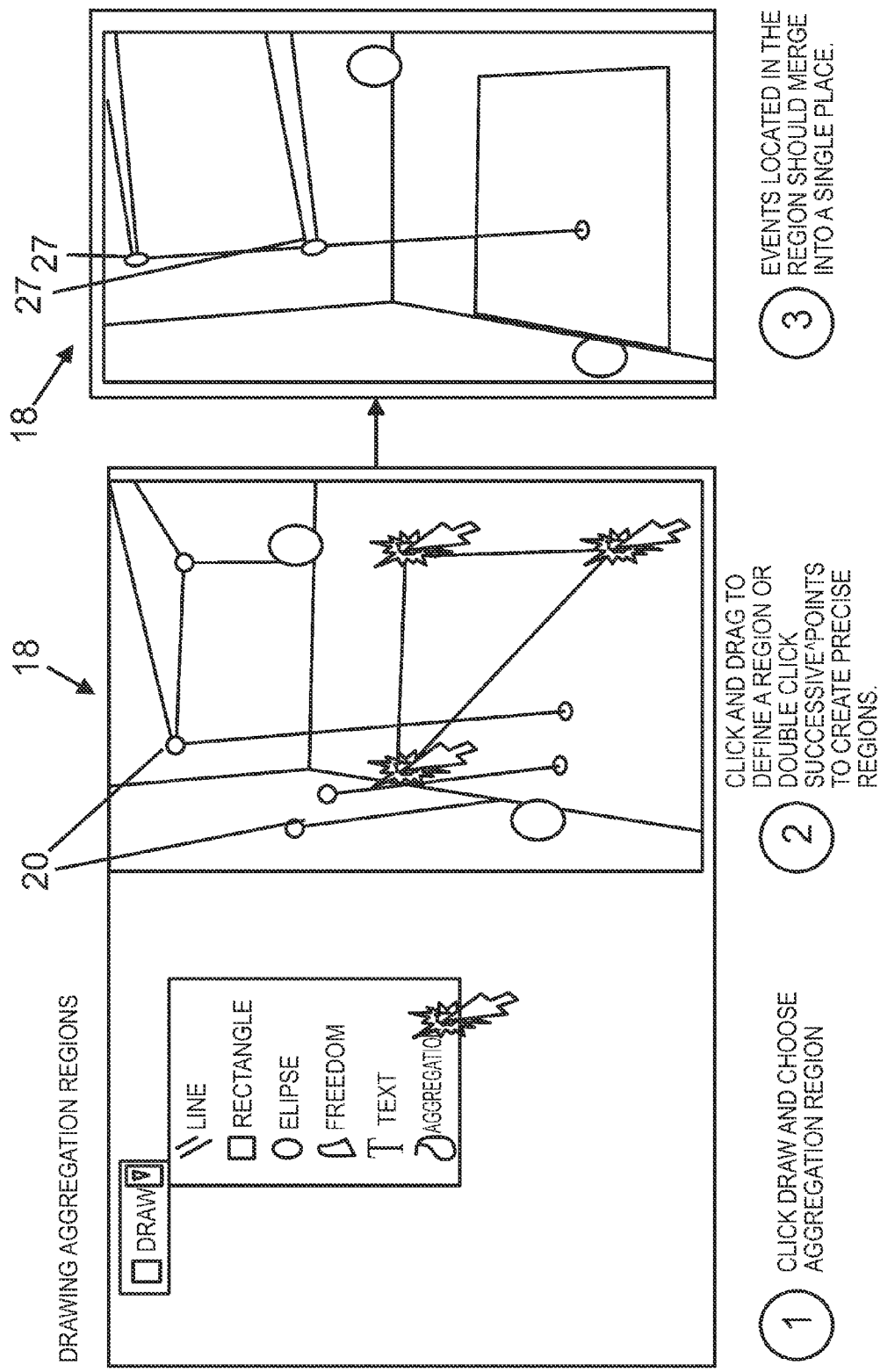

Referring to FIGS. 1 and 50a,b, an Event Aggregation Module 1100 is for, such as but not limited to, summarizing or aggregating event data objects 20 in the temporal and/or spatial domain(s), providing the summarized event data objects 20 to the Visualization Manager 300 which processes translation from event data objects 20 and groups of event data elements 27 to the visual representation 18. A plurality of event data objects 20 in the visualization representation 18 that match the specified event aggregation parameter(s) 1101 (e.g. event type(s), specified maximum relative temporal separation between temporally adjacent events 20, specified maximum relative spatial separation between spatially adjacent events 20, specified location(s) 22, and/or a combination thereof, etc.) are aggregated (i.e. collected) into an aggregated event group 27 and then the plurality of individual events 20 are replaced in the visual representation 18 by their corresponding aggregated event group 27, thus providing for a potential decluttering of the displayed objects 14 and/or associations 16.

Event 20 types can be such as but not limited to: an elementary event 20 having a start time, a location 22, and an associated entity 24 (e.g. can be an event 20 occurring with only, or otherwise attributed to, one entity 24); a movement event 20 having a start time, an end time, a source place 22, a destination place 22, and at least one associated entity 24 travelling or otherwise associated with the source/destination places 22; a communication event 20 having a start time, an end time, a source place 22, a destination place 22, and an associated send entity 24 (starting/sending the communication 20 from the source place 22) and a receive entity 24 (receiving at the destination place 22 the initiated communication event 20 such as a phone call, email, letter, network message, etc.); a financial transaction event 20 having a start time, an end time, a source place 22, a destination place 22, and an associated send entity 24 (starting/sending the transaction from the source place 22) and a receive entity 24 (receiving at the destination place 22 the initiated transaction event 20 such as a banking wire or other funds transfer operation); and a relationship event 20 having a start time, an end time (optional if still ongoing), and the entity 24 IDs of the two or more entities 24 in the defined relationship event 20.

Elementary Events 20 are the simplest and most common type of mapping and is the one to use for the two most common types of data 14,16 such as but not limited to Isolated events where data is composed of distinct events 20 that each happen independently (e.g. a list of accidents, incidents or readings from sensors that do not move including the time of the event 20, and position 22 data). Moving object tracks contain data about moving objects or "Entities" 24 that use an object identifier or "selector" column in the data that specifies the object name or ID. Link Events 20 are another type of event 20 such as but not limited to: movement Events 20 where you have travel information that includes both start time and location and end time and location in every record (e.g. airline ticket info or shipping travel segment); communication Events 20 contain info about 2 objects or Entities 24 communication with each other with 2 object identifier fields and ideally locations for each (e.g. correspondence, such a letters, email and phone calls data); Financial event 20 having the same information as communications data, but ideally there should be a field for the quantity of the transaction; and Relationship event 20 useful for data that has relationships between objects 14 or Entities 24 (e.g. data about how people are related, or who they have worked under in an organization).

It is recognised that all of the above discussion on event 20 types could be used as the parameters 1101 and/or filter 1104 settings. Further, it is recognised that the parameters 1101 are used by the filters 1104 as dynamically changeable/specified filter 1104 settings.

Referring to FIGS. 3 and 50a,b, the temporal inter-connectedness of information over time and geography within a single, highly interactive 3-D view of the visual representation 18 is beneficial to data analysis of the data in tables 122. However, when the number of event data objects 20 increases, techniques for aggregation (or grouping) can become important. Many event data objects 14 (e.g. events 20) can be combined into a respective summary or aggregated output 1106 that may be represented by a single image or icon 27 on the visualization representation 18. Such outputs 1106 of a plurality of event data objects 20 can help make trends in the temporal and spatial domains 400, 402 more visible and comparable by the user of the tool 12. Several techniques can be implemented to support time/type aggregation of event data objects 20, such as, but not limited to grouping within a selected temporal context.

As shown in FIG. 50a, the Event Aggregation Module 1100 has an Event Aggregation Manager 1102 that communicates with the Visualization Manager 300 for receiving aggregation parameters 1101 used to formulate the event aggregated output 1106. The aggregation parameters 1101 can be either automatic (e.g. pre-defined in the tool 12), manually entered by user events 109 or a combination thereof. The manager 1102 accesses all possible event data objects 20 through the Data Manager 114 (related to the event aggregation parameters 1101, e.g. a time range and/or event object 20 types) from the tables 122 (e.g. for example as those presently displayed in the visual representation 18, and then applies event aggregation filters 1104 (based on the aggregation parameters 1101) for generating the output 1106. The VI Manager 112 receives the output 1106 from the Event Aggregation Manager 1102 and renders the output to the screen as the visual representation 18.

The filters 1104 act to organize and aggregate the event data objects 10 in the temporal domain according to the instructions provided by the Event Aggregation Manager 1102. For example, the Event Aggregation Manager could request that the filters 1104 summarize all events 20 (further alternatively or in addition to of a selected event type) that occur within 30 minutes of each other (e.g. a maximum temporal separation between displayed icons representing event objects 20). Once the event data objects 14 are matched by the filters 1104 as matching the specified/selected aggregation parameters 1101, the aggregated event data 27 (i.e. a reduced number of displayed event data objects as compared to the previously displayed un-aggregated event objects) is summarized as the output 1106. The Event Aggregation Manager 1102 communicates the output 1106 to the VI Manager 112 to rendering as the visual representation 18. It is recognized that the content of the representation 18 is modified to display the output 1106 to the user of the tool 12, according to the aggregation parameters 1101.

As a further example, a user may choose to summarize all events 20 that occur within 30 minutes of each other at a specific location 22 (e.g. Rome). To accomplish this, the user indicates their preferences to aggregate the event data 20 according to temporal and local proximity by use of the controls 306. The Visualization Manager 300 communicates the aggregation parameters to the Event Aggregation Manager 1102 in order to filter the event data objects 20 for display on the visualization representation 18. The Event Aggregation Manager uses the filters 1104 to filter the data from the tables 122 based on a spatial proximity and temporal properties. The output 1106 is rendered to the screen by the VI Manager 112.

The aggregated output 1106 may be represented on the visualization representation 18 in one of several ways. For example, aggregations of a plurality of event data objects 20 that occur in the specified aggregation time period (e.g. 30 minutes as specified using a start and end time (e.g. specified time range) selected by the user may be represented by a single icon 410 (or a relatively reduced number of icons 410) on one or more timelines 422. It is appreciated that a user may interact with the icon to determine if the icon 410 represents a single event 20 or multiple events 20 that have been aggregated as event 27. When the user places the mouse cursor 713 over the visual element or icon 410, for example, pre-determined information about the aggregation details of the event data objects 27 that are represented by the icon 410 may be displayed. Information related to each of the event data objects 20 that have been aggregated may also appear. The user can cancel the aggregation 27 that has been applied by interacting with controls 306. The visualization manager 300 then communicates the instruction to the VI Manager 112 which recreates the visualization representation with no aggregation parameters displayed.

Referring to FIGS. 50a,b, the filters 1104 combine events 20 that are close to each other and display them as one or more aggregated events 27 in the representation 18. The resulting aggregated events 27 can have a "size" value (e.g. displayed physical extent of event 20 icon) that corresponds to the number of individual events 20 that were aggregated into the aggregated event 27. Filters 1104 are good for reducing the number of events 20 when detail is not important, or when attempting to display very large sets of data, for example. There can be a number of types of filters, for example filters such as but not limited to: Identical Events such as duplicate events (e.g. only a representative one of the duplicated events 20 is displayed); Events close in specified time and/or spatial position, such that displays of an aggregated event 27 are used to represent a cluster of events 20 that are closely related (e.g. satisfy or otherwise match the specified parameters 1101). For example, a Filter Properties panel (not shown) provides for the user to: set filter 1104 tolerances by setting the distance in time and/or space 1101 within which events 20 will be aggregated; and inhibit aggregation of events 20 that have specified 1101 different labels, comments, or user defined attributes. For example, differences can be ignored, and any events 20 within range of the specified parameters 1101 are aggregated unless they belong to different Entity 24 tracks.

Time Charts 890

Referring to FIGS. 46a, 46f, 47, a chart Module 860 is for, such as but not limited to, summarizing data elements 874 (e.g. selected data objects 14, 16 such as but not limited to entities 24, locations 22, events 20, associations 16) in time periods of the focus range 844 (or at least a selected portion of the focus range 844) and providing the summarized data elements (e.g. entries 891) as a chart output 866 to the VI Manager 112 for rendering to the visual interface 202. Shown, by example only, is a table format for the entries 891 correlated using chart divisions of columns for each selected data element 874 (e.g. entities 24) and rows corresponding to each time indication 847, 856 of the respective bar 840, 850. In the present example, the rows correspond to the indications 856.

The chart Module 860 can include a chart Manager 862 and a Chart Manager 864. The module 860 is in communication with the Visualization manager 300, for example. User events 109 are generated as a user interacts with the data element selector 872 (see FIG. 46a) and the user interface 202 and are directed to the Visualization manager 300. The Visualization manager 300 communicates the summarized data elements 874 to the chart Module 860 and instructs the module 860 to generate a chart/time table as chart output 866. The chart Module 860 can interact with the Data Manager 114. Specifically, the chart Manager 862 can instruct the Data Manager 114 to retrieve a data set 861 that includes the data elements 874 of the visualization representation 18 that are within (e.g. satisfy or otherwise match) the specified focus range 844 (or portion thereof) and the selections 872. The Data manager 114 directs the data set 861 to the chart Manager 862 for processing and for rendering on the visual interface 202 as the entries 891. The chart Manager forms the output 866 and can instruct the VI Manager 112 to render the chart output 866 to the user interface 202 in the form of a chart 890.

The chart Module 860 can also include a Chart Manager 864 that produces the chart output 866 depending on the preferences of the user. As shown in FIG. 46a, the user can set the time period by interacting with a time period selector (e.g. specifying the start and end time 841,843). When the user selects the time period, the Visualization manager 300 can instruct the chart Manager 862 to create a chart 890 and to render the chart 890 (i.e. including the entries 891 and associated selected data elements 874—e.g. as specified entities 24) to the visual representation 18 on the user interface 202. The chart Manager 862 can communicate the request to the Chart Manger 864 which generates chart output 866 which is directed to the VI Manager 112 for rendering to the visual interface 202 as the chart 890.

Referring to FIGS. 46a, 46f, the data elements selector 872 includes a drop-down list 873 which contains a list of all data elements 14,16 that reside in the tables 122 (see FIG. 3) for the objects 14 and/or associations 16 that have temporal attributes in the defined limits 841,843. A user may wish, for example, to create a chart 890 that tabulates the occurrence (e.g. count, frequency) of entities 24 having a temporal attribute in the focus range 844. As shown, the chart 890 includes columns 880 that correspond to the selected data element 874 (i.e. entities 875a-875f in FIG. 46a). The occurrence of each of the data elements 874 at the focus indicators 856 is visualized with a glyph or icon 882 placed in the row 884 that corresponds to the focus indicator 856 (i.e. each of the icons 882 is positioned in the chart 890 aligned with the focus indicator that represents their associated temporal attribute—e.g. point in time of the temporal reference domain). The glyph or icon 882 may have display properties (e.g. colour, size, shape, etc.) that represent(s) the nature or importance of the data elements 874 (or any other characteristic). It is appreciated that the glyph or icon 882 can be rendered to the screen by the VI Manager 112 as described above.

It may be desirous for the user to summarize the chart 890 in "buckets" (e.g. specified periods) of time referred to as a summary time period 876 (e.g. a selected summary portion 876 of the total focus bar time range 844 (i.e. between the limits 841,843). For example, a user may wish to quickly view the occurrence of data elements 874 at the summary time period 876 of an hour, a day, a month or any other period of time that is within the focus range 844. When a summary time period 876 is selected using the summary time period selector 877, the manager 300 instructs the chart Manager 862 to create a Chart Output 866 which is rendered to the screen as a Summary Chart 890a,b by the VI Manager 112. The Summary Chart 890a,b can be a bar chart that includes bars 891 (e.g. summary entries) representing each summary time period 876. The length of the bars 891 in the vertical direction is a representation of the number of occurrences of data elements 874 at each summary time period 876. It will be appreciated that the Summary Chart 890a,b may be visualized as a bar chart as shown in FIG. 46a or may be visualized as a pie chart, a continuous plotting of data elements 874 across time, or any other suitable chart. Further, it is recognized that the chart 890 can have chart divisions other than the rows and columns as described, for example alternative chart divisions such as pie wedges of a pie chart.

The Summary Chart 890a,b is capable of summarizing the occurrence of all the data elements 874 in each summary time period or only for a specific data element 874. For example, in FIG. 46a, the chart 890 summarizes the occurrence of entities 875a-875f. A user can select the summary time period 876 using the summary time period selector 877. If the user wishes to create the Summary Chart 890a for only 875a, the user can select the column 880 that represents entity 875a. Upon selecting the row 884a, the user interface 202 generates a user event 109 and directs the user event 109 to the Visualization manager 300. The Visualization manager 300 instructs the chart Manager 862 to create chart output 866 that corresponds to the occurrence of entity 875a in the selected summary the time period 876 for rendering to the user interface 202 by the VI Manager 112, as summary chart 890a.

A user may also create several Summary Charts 890a, 890b simultaneously that represent the occurrence of each entity 875a-f in different time periods (i.e. a plurality of selected time periods that represent subdivisions of the time range of the focus range 844. For example by interacting with the controls 872 and 877, a user may choose to create a summary chart 890a for the period between 856c and 856d, and another summary chart 890b for the period between 856a and 856b. As before, each of the bars 891 represent the selected data elements 874 and the height of the bars 891 represent the occurrence of each data element 874 in the time period adjacent the summary charts 890a, 890b on the focus bar 850, for example.

Count Charts

Figure 51:
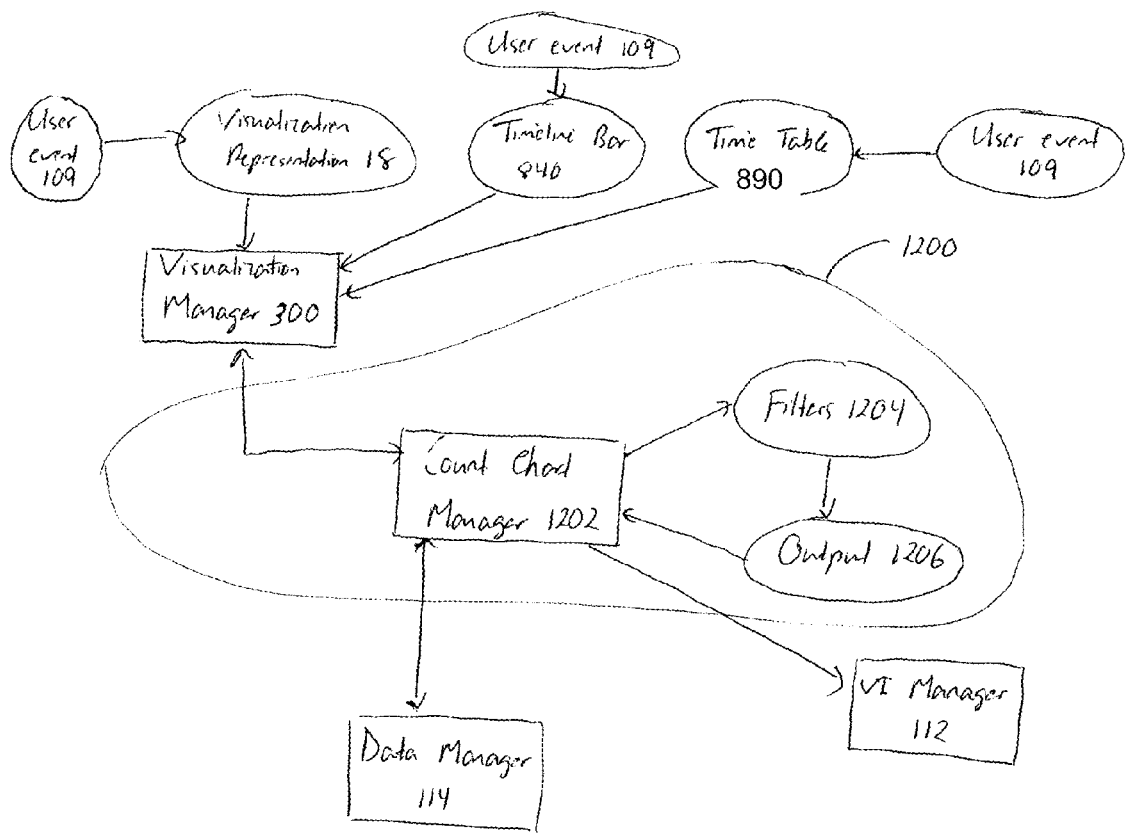
FIG. 51 shows a further embodiment of the tool of FIG. 3.
Figure 52:
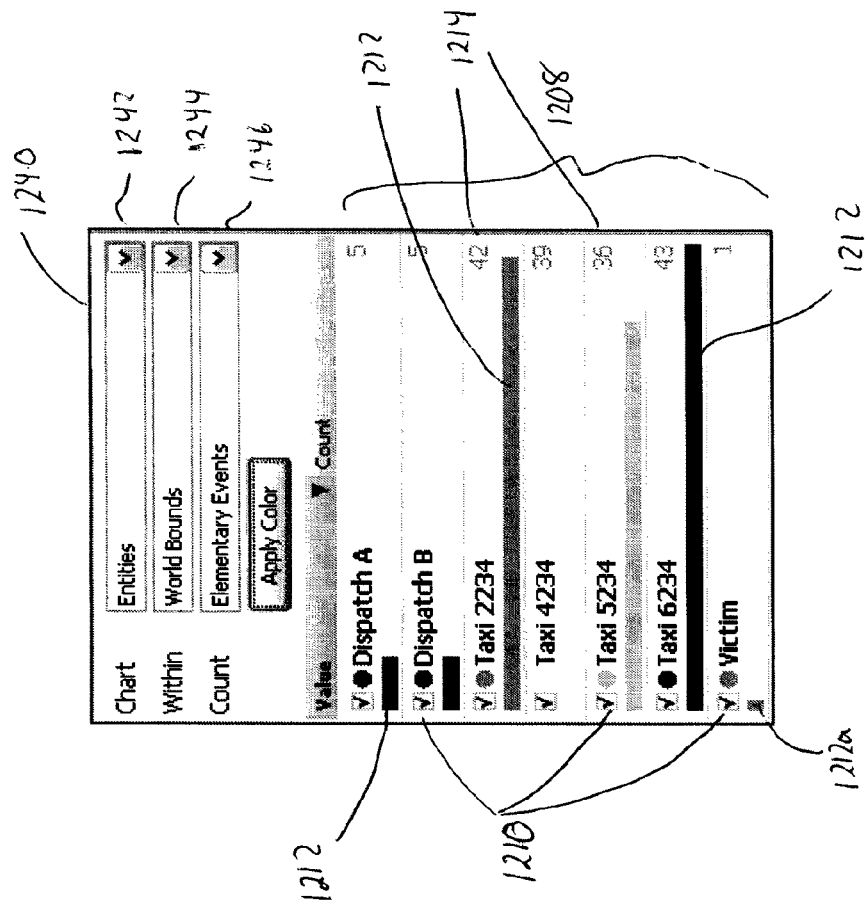
FIG. 52 shows an example operation of a count chart control of the tool of FIG. 51.
Figure 53:
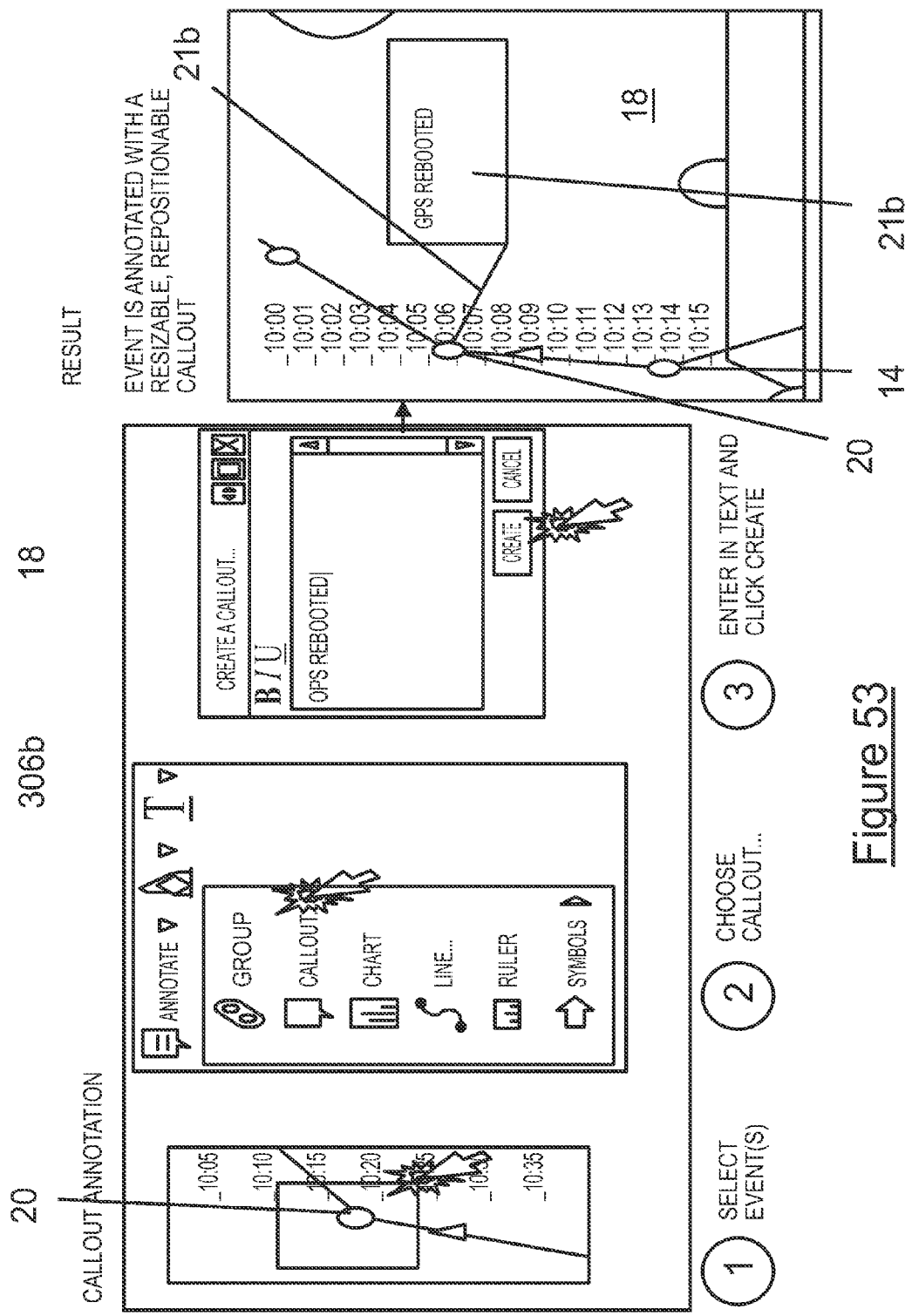
FIG. 53 shows an example operation of a callout annotation of the tool of FIG. 3.
Figure 54:
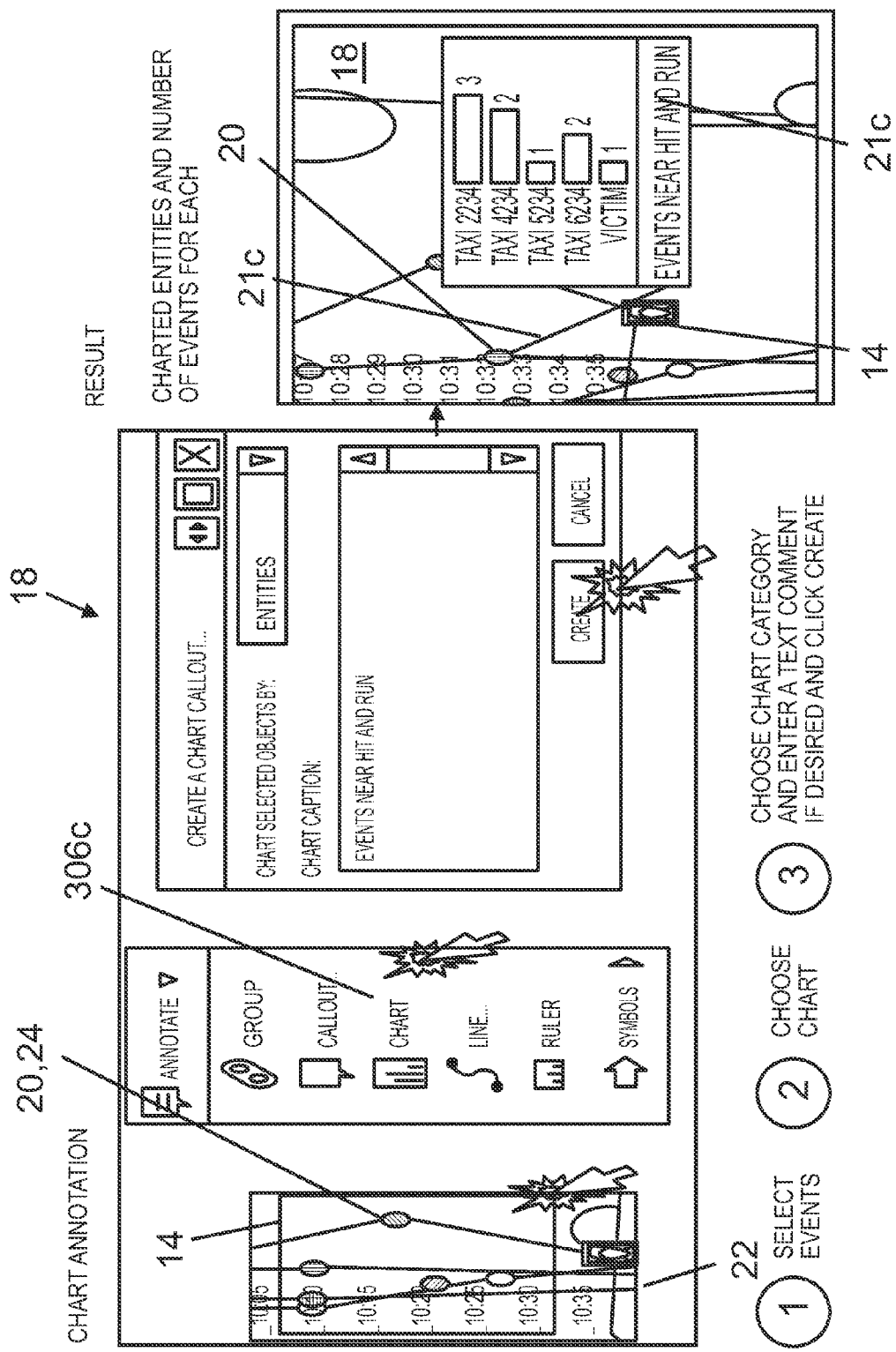
FIG. 54 shows an example operation of a chart annotation of the tool of FIG. 3.

Referring to FIGS. 51, 52, the Count Chart Module 1200 is for, such as but not limited to, summarizing the count of data objects 14 in an output 1206, providing output 1206 to the VI Manager for display as a Count Chart 1208 (e.g. an example of the summary chart 890a,b, see FIG. 46a). A Count Chart 1208 is a bar chart in which each bar 1212 corresponds to a data object 14, and the length of each bar represents the count of another data element that is associated with the data object 14. The Count Chart Module 1200 also provides another interactive mechanism for allowing the user to control the data objects 14 that are visualized on the visual representation 18 and throughout the user interface 202, e.g. selection of the particular data element(s) 14 (e.g. a selected bar(s) 1212) results in the corresponding visual elements that represent the selected data element(s) being only displayed (or otherwise highlighted/emphasized in the visual representation 18.

As shown, the Count Chart Module 1200 has a Count Chart manager 1202 that communicates with the Visualization Manager 300 for receiving instructions (i.e. criteria for creating the Count Chart 1208 such as but not limited to the selected data object(s) 14 that will correspond to the bar(s) 1212) used to formulate the output 1206. The Count Chart criteria can either be pre-loaded in the tool 12, manually entered by the user via user events 109 or a combination thereof. Upon user interactions with count control 1240 (see FIG. 52), e.g. an example of the interface controls 306, the Visualization Manager 300 communicates with the Count Chart manager 1202 and instructs the manager 1202 to generate a Count Chart 1208. The Count Chart manager 1202 creates filters 1204 based on the search criteria and retrieves a result data set from the Data Manager 114. It is appreciated that the result data set represents the set of data objects 14 that are within/match or otherwise satisfy the defined search criteria.

An example Count Chart control 1240 is illustrated in FIG. 52. The control 1240 includes a data element selector 1242, a distance selector 1244, a count selector 1246, a result Count Chart 1208 and toggles 1210. To create a Count Chart 1208, a user selects the data element using the data elements selector 1202 that the user wishes to chart. As shown, the selected data type is represented by bars 1212 in the Count Chart 1208. A user also selects the data type that the user wishes to count in relation to the selected data element. In FIG. 52, the user has chosen to count events 20 that are related to entities 24. As described above, the length of bars 1212 represents the count of data types in relation to the selected data element 1242. In FIG. 52, it is apparent that the "Taxi 2234" is related to far more events than "Dispatch A". The Count Chart 1208 also includes a count 1214 so the user can quantify the count represented by the length of bars 1212.

The Count Chart control 1240 also includes toggles 1210 for selecting and deselecting the selected data elements that the user wishes to visualize in the Count Chart 1208. For example, if the user deselects (i.e. unchecks) the toggle 1210 that is beside the entity labelled as "Victim" the row indicated by 1212a will disappear from the Count Chart 1208. As is described in more detail below, interactions with the Count Chart 1208 may affect the visual contents of the visual representation 18 and the time table 870.

User interactions with the control 1240 are processed by the Visualization Manager 300. The manager 300 communicates with the Count Chart manager and instructs the Count Chart manager 1202 to create a new Count Chart 1208. The Count Chart manager creates filters 1204 which represent the user inputs to controls 1202, 1204 and 1206. The Count Chart manager retrieves a data set from the Data Manager based on the search criteria of the filter 1204. Finally, the Count Chart manager 1202 formulates the data set as an output 1206 and instructs the VI Manager to create and draw the visual Count Chart 1208.

It is to be appreciated that a user may choose to generate a Count Chart 1208 for any data element in the table 122 available between the defined limits 841,843. For example, a user may set the selected data element to a location data object 22 (through the control 1242) and choose to count all events 20 that occur at the that location 22 (through the control 1246)

It is to be appreciated that the Count Chart Control 1250 is coupled in a dynamic relationship to the contents of visualization representation 18, the contents of the timeline bar 840 and the contents of the time table 890. The Visualization Manager 300 monitors user interaction in the form of user events with each of the above and coordinates the response of the other modules. For example, increasing the focus range 844 on the timeline bar 840 increases the number of data objects 14 that may be represented as images on the visualization representation 18. To this end, the Visualization Manager 300 generates and/or updates sprites 308 and communicates the sprites to the VI Manager 112 for rendering a new visualization representation 18 to the screen. Likewise, the Visualization Manager 300 communicates with the Count Chart manager 1202 and instructs the Count Chart manager 1202 to generate a new Count Chart 1208 to visualize and count the additional data objects 14 that are now within the amended focus range 844. Likewise, interaction with the Count Chart control 1250 may affect the visual images represented on the visualization representation 18 and the time table 890. As an example, when a user deselects a data object 14 on the Count Chart 1208 using toggles 1210, the Visualization Manager 300 instructs the Count Chart manager 1202 to create a new output 1206 and to render the new output in the form of a Count Chart 1208 via the VI Manager 112. The Visualization Manager 300 deletes sprites 308 that correspond to the deselected data element 14 and instructs the VI Manager to create and display a new visualization representation 18. The deselected data element 14 is not represented on the visualization representation 18 as the sprites 308 that facilitate rendering of the images have been deleted by the Visualization Manager 300. As another example, if a user desires to select a group of data objects 14 on the visualization representation 18 using the mouse pointer 713, the Visualization Manager 300 communicates with the Count Chart manager 1202 and instructs the manager 1202 to create a new Count Chart that represents the data objects 14 that have been selected, for example displayed as a chart annotation 21 described below. Likewise, the Visualization Manager 300 instructs the Time Table manager 862 to create a new time table 890 for the selected data objects 14.

Accordingly, in view of the above, the count chart 1208 can be used as a count summary for representing the count of the entries 891 in the selected chart 890 and/or sub-charts 890*a,b*, such that the count chart 1208 generation is associated with the entries 891, time indicators 847,856 (e.g. specific and/or range(s) thereof), and selected data objects 874 done for the chart 890 and/or sub-charts 890*a,b*.

Annotations 21

Annotations 21 in Geography and Time can be represented as manually placed lines or other shapes (e.g. pen/pencil strokes, charts, etc.) can be placed on the visual representation 18 by an operator of the tool 12 and used to annotate elements of interest with such as but not limited to arrows, circles and freeform markings and summary chart details. Some examples are shown in FIGS. 53-58, discussed below. The annotations 21 are graphics that can be selected and positioned on the visual representation 18 for use in highlighting or otherwise providing added meaning/description to the patterns uncovered by the user in the data objects 14 and associated associations 16. These annotations 21 are located in geography (e.g. spatial domain 400) and time (e.g. temporal domain 422) and so can appear and disappear on the visual representation 18 as geographic and time contexts are navigated through the user input events 109 and therefore displayed as temporal and/or spatial dependent content in the visual representation 18.

For example, one application of the tool 12 is in criminal analysis by the "information producer". An investigator, such as a police officer or other law enforcement, could use the tool 12 to review an interactive log of events 20 gathered during the course of long-term investigations. Existing reports and query results can be combined with user input data 109, assertions and hypotheses, for example using the annotations 21. Further, the tool 12 could also have a report generation module that saves a JPG format screenshot (or other picture format), with a title and description (optional—for example entered by the user) included in the screenshot image, of the visual representation 18 displayed on the visual interface 202 (see FIG. 1). For example, the screenshot image could include all displayed visual elements 410,412, including any annotations 21 or other user generated analysis related to the displayed visual representation 18, as selected or otherwise specified by the user.

The visualization tool 12 also has associated modules (e.g. an annotation module such as the visualization manager 300) for manipulating the properties of the created/defined annotations 21 as well as for creating/defining new annotations 21. For example, the user can use the visualization tool 12 to lock an annotation 21 so that it always stays visible (the location and/or orientation of the locked annotation 21 changes) in the visualization representation 18 as the user manipulates the viewing angle/zoom (e.g. panning) of the displayed objects 14 and/or annotations 16. The locked annotation 21 can remain visible (e.g. preferably displayed in the visual representation 18 in a relatively sparsely populated area (e.g. containing relatively fewer objects 16 and/or associations 16 as compared to other regions of the visual representation 18) as long as the underlying objects 14 and/or annotations 16 it is attached to are in the displayed visual representation 18.

Further, the visualization tool 12 can be used to pin an annotation so that it stays in the same position on the screen no matter the tilt or rotation (i.e. the annotation 21 remains in a predefined location and/or orientation of the visual representation 18, regardless of the tilt/rotation/zoom manipulations of the visual representation 18 by the user. It is recognized that the annotations 21 visible in the visual representation 18 can be dependent on the selected time range and/or spatial range for display of their related data objects 14 (e.g. an annotation 21 attached to a selected data object 14 would only be displayed in the visualization representation 18 if the associated data object 14—e.g. entity 24—has the parameter(s) of a time and/or a location that is in the displayed time and/or spatial ranges of the visualization representation 18).

Accordingly, annotations 21 can be defined as graphics used to highlight or describe patterns found by the user in the data objects 14 and/or associations 16. Annotations can be used for communicating findings in the data for presentation to others, or to help the remembering of performed analysis. Annotations 21 can be applied to events or other objects 14 and/or association 16 (e.g. selected grouping(s) thereof) in the visual representation 18, and the annotations 21 remain attached (e.g. via link 21*a*) to their data 14,16 as the user navigates in the visual representation 18. The annotations 21 can be locked so that they are always visible, and they can also be saved as part of a snapshot (e.g. saved in a report) so that they can be recalled when needed.

Types of Annotations 21

Referring to FIGS. 53-58, the following example annotation 21 options are available from an Annotation Toolbar dropdown button (e.g. interface controls 306—see FIG. 5), for example, such as but not limited to: Group control 306*a* that draws a circle 21*a* around selected events 20; Callout control 306b that annotates an event 20 or group of objects 14 with a descriptive text 21b; Chart Summary of information control 306c that is annotated to an event 20 or group of objects 14 displayed as a bar graph 21c (or other graph type—e.g. pie chart); Line control 306d that connects selected elementary events 20 with a (e.g. dashed) labeled line 21d; a ruler control 306e that produces an annotation ruler 21e (or other line type) that can calculate/display the time, distance and speed of an entity 20 based on the time and distance between selected events/objects 14; and a Symbols control 306f that represents a set of predefined icons 21f used to annotate selected object(s) 14 and/or association(s) 16.

The Chart Annotation 21c is used to annotate selected entities 24 with associated events 20 (e.g. number and/or type of event(s) 20) in charts similar to the one found under the Charts tab provided by the tool 12. Like all annotations 21, the Chart Annotation 21c can be captured in a snapshot used for Generating Reports. The following charting categories are available in the Chart dropdown within the Chart Annotation Category Function 306c, for example such as but not limited to: Entities 24 associated with the event 20; Label Contents of event Label Field; Size Values in the size field; Color Event display color; Places 22 associated with the event 20; Icon File Contents of the event Icon Field; Data File Contents of the event Data Field; selected times (e.g. time ranges) for events 20 to be included in the chart 21c (e.g. Hour of Day Event time by the hour it falls into of the 24 hour clock, Day of Week Event time by day of week it falls into of the 7 day week (Monday-Sunday), Month of Year Event time by month of year it falls into of the 12 month year; Time by Hour Event start time by specific hour unique to each particular day and month, Time by Month Event start time by specific month unique to each particular year, Time by Year Event start time by year); and User Data Fields. The visualization tool 12 can also provide for charting 21c by any additional event 20 attributes included as additional columns in the chart 21c when sent from Excel or other data providers.

Figure 55:
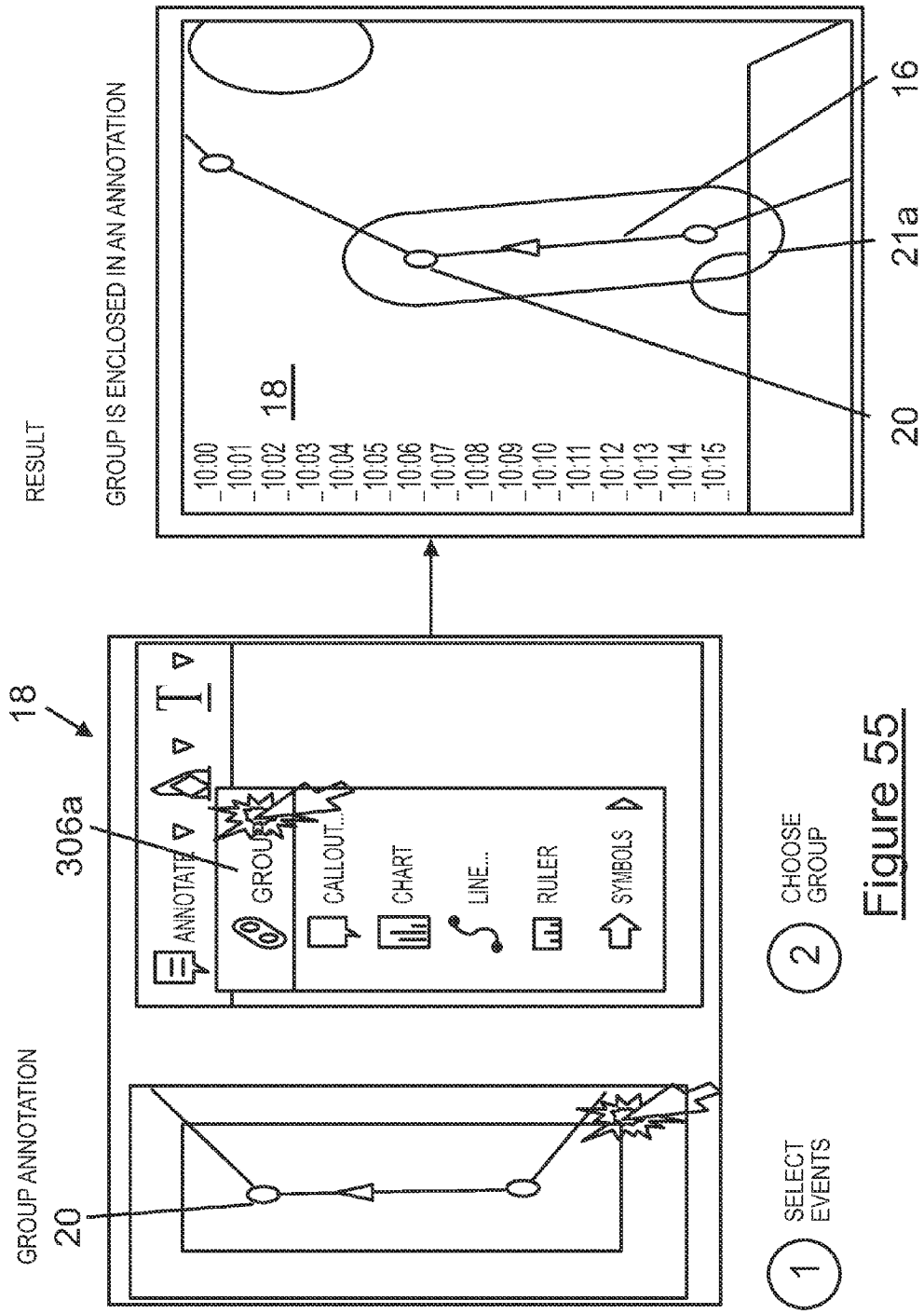
FIG. 55 shows an example operation of a group annotation of the tool of FIG. 3.
Figure 56:
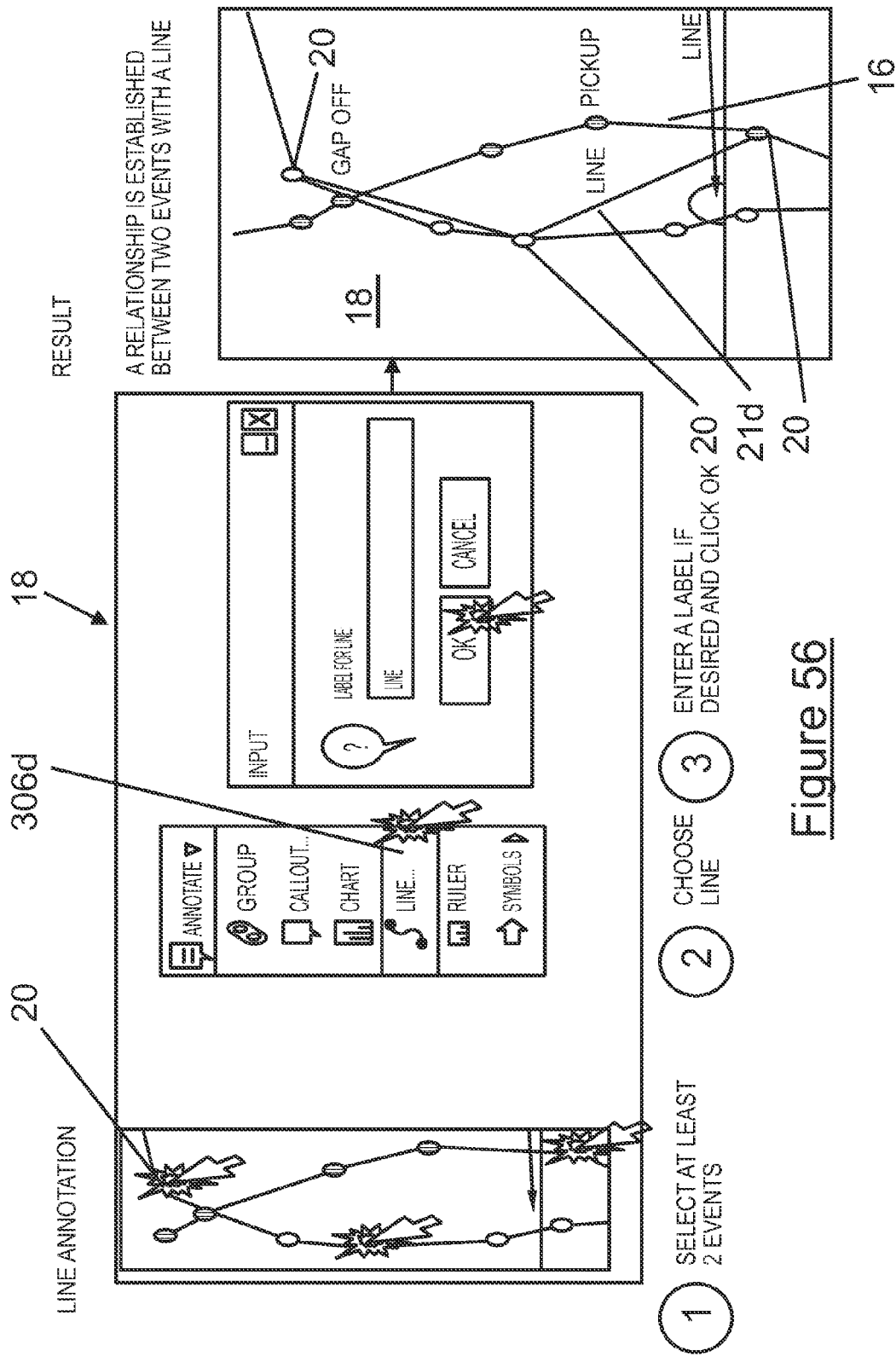
FIG. 56 shows an example operation of a line annotation of the tool of FIG. 3.
Figure 57:
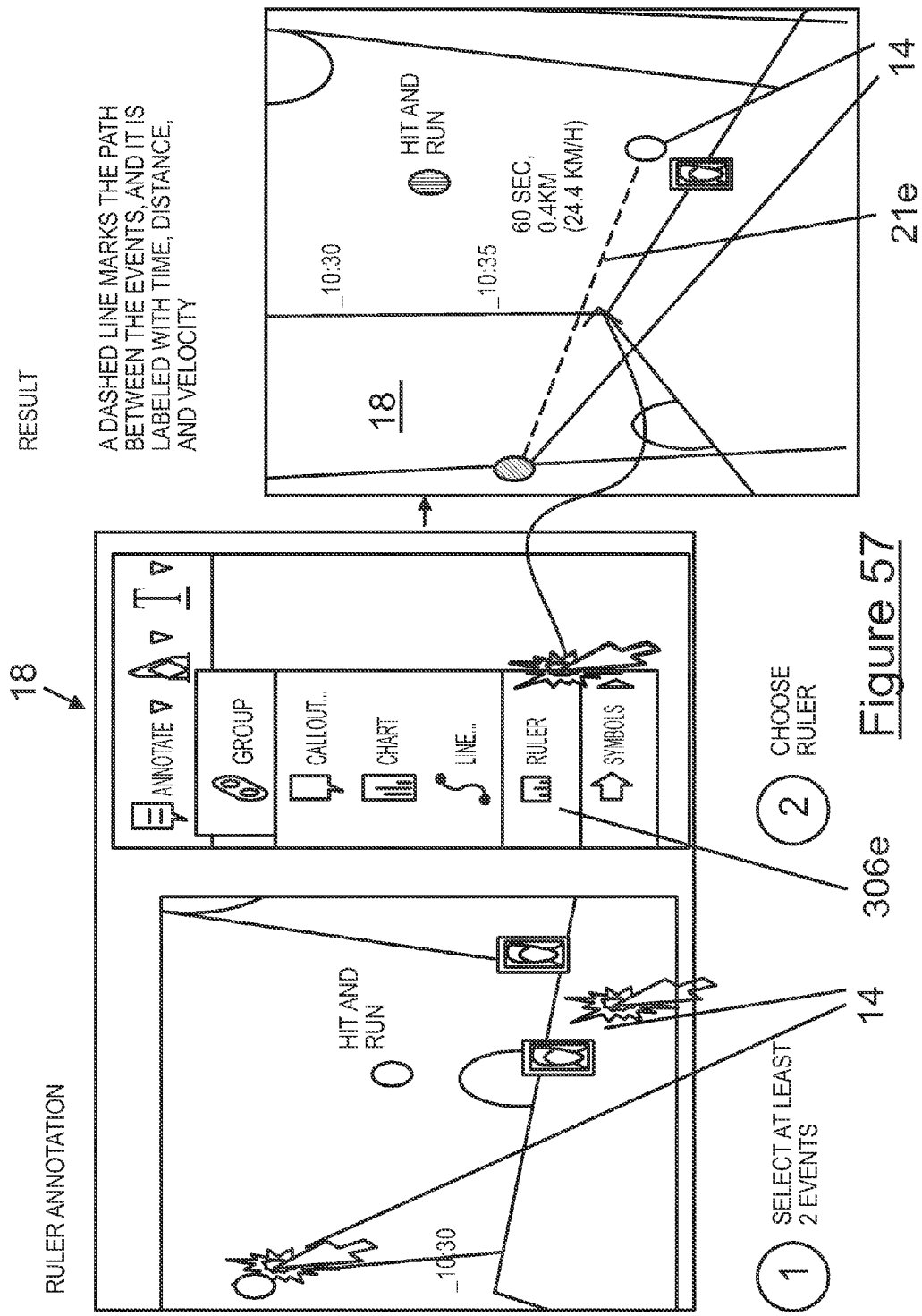
FIG. 57 shows an example operation of a ruler annotation of the tool of FIG. 3.

A further annotation 21 type is Group Annotation 21a, see FIG. 55, to highlight a specific set of object(s) 14 and/or association(s) 16 that play a determined important part of the analysis. Like all annotations 21, the Group Annotation 21a can be captured in a snapshot used for Generating reports. A further annotation 21 type is the Line Annotation 21d, see FIG. 56, to connect related events 20 with a labeled line 21d. Like all annotations 21, the Line Annotation 21d can be captured in a snapshot used for Generating Reports. A further annotation 21 type is the Ruler Annotation 21e, see FIG. 57, used to show the distance, time and velocity between two events. Like all annotations 21, the Ruler Annotation 21e can be captured in a snapshot used for Generating Reports. A further annotation 21 type is the Symbols Annotation 21f, see FIG. 58, used to mark significant selected object(s) 14 and/or association(s) 16 with a relevant symbol 21f selected by the user of the tool 12. Like all annotations 21, the Symbol Annotation 21f can be captured in a snapshot used for Generating Reports. Accordingly, chart 21c and ruler 21e annotations can be considered as having analytical functions associated with them that displays calculations of selected characteristics of the data objects 14 and associations 16 that the annotations are coupled to on the visual representation 18. Working with Annotations 21 (e.g. Right Clicking on the Annotation 21)

The following menu items can appear on the user interface 202 when the displayed annotation 21 is selected in the visual representation 18, such as but not limited to: Move Closer—zooms annotation 21 into center of view, or selected items in both space and time; Move Further—zooms annotation 21 out from center of view, or selected items in both space and time; Fit annotation 21 to a set of presets used to zoom in on data in the Space-Time Viewer; Fit Data Extent—zooms annotation 21 to the time-space extents of all data loaded into tables 122, and resets to default view position; Fit both time and space of annotation 21 to selected; Fit time of annotation 21 to selected; Fit space of annotation 21 to selected; Delete Selected annotation 21 from representation 18; Edit Annotation such that the tool 12 edits information annotated in Callouts and Charts annotations 21; Remove Annotation—deletes annotations 21; Locked—protects annotations 21 from being deleted by the Remove Annotation Button; Pinned—fixes the position of an annotation 21 in the representation 21 such that selected annotations 21 will no longer move when associated object data is moved in the representation 18; and Object Properties—opens the Object Properties Panel of the annotation 21 which contains additional information about the annotation 21 selected in fields that can be edited.

Example Operation of the Tool 12

Referring to FIG. 46a and related figures, the method implemented by the various modules of the tool 12 for configuring the presentation of a plurality of presentation elements in a visual representation on a user interface, the presentation elements having both temporal and spatial parameters, comprises at least some of the steps of: 1) defining a time bar with a time scale having time indicators as subdivisions of the time scale and having a first global temporal limit and a second temporal global limit of the time scale for defining a temporal domain of the presentation elements, 2) defining a focus range of the time bar such that the focus range has a first local temporal limit and a second local temporal limit wherein the first local temporal limit is greater than or equal to the first global temporal limit and the second local temporal limit is less than or equal to the second global temporal limit; 3) defining a focus bar having a focus time scale having focus time indicators as subdivisions of the focus time scale and having the first and second local temporal limits as the extents of the focus time scale, such that the focus time scale is an expansion of the time scale; and 4) displaying a set of presentation elements selected from the plurality of presentation elements based on the respective temporal parameter of each of the set of presentation elements is within the first and second local temporal limits.

Further steps are: 5) defining the focus range as a focus slider configured for displacement along the time scale between the first and second global limits resulting in updating of the first and second local limits, such that the focus range remains constant during the displacement of the focus slider; wherein during the displacement the set of presentation elements is updated from the plurality of presentation elements based on the respective temporal parameter of each of the updated set of presentation elements is within the updated first and second local temporal limits; 6) generating a chart for positioning in relation to the focus bar, the chart having a plurality of entries corresponding to those presentation elements selected from the plurality of presentation elements matching their temporal parameter to be within the focus range, such that the entries are relatively positioned to one another in the chart in ordered relation to their respective temporal position in the focus time scale using spacing between the entries corresponding with that spacing of the focus time indicators of the focus time scale; 7) wherein the chart is positioned adjacent to the focus bar such that the entries are lined up with their corresponding focus time indicators; 8) wherein the matching presentation elements have a spatial parameter matching a specified spatial search criterion; 9) wherein the chart is a summary chart generated for a specified data element selected from the matching presentation elements; 10) wherein the summary chary is positioned in the visual representation in defined association to the chart; 11) wherein the chart includes a series of columns and rows or other divisions; 12) using an analysis operator in generating the chart such that the plurality of entries also satisfy at least one analysis criterion of the analysis operator; 13) wherein the analysis operator is selected from analysis means selected from the group comprising: meeting finder; gap finder; speed finder; connection filtering; path between presentation elements; link analysis; and link between entities.

The invention claimed is:

1. A method for configuring the presentation of a plurality of presentation elements in a visual representation on a user interface, the plurality of presentation elements having both temporal and spatial parameters, the method comprising the steps of:
   defining a time bar with a time scale having time indicators as subdivisions representing a unit of measure of the time scale and having a first global temporal limit and a second temporal global limit of the time scale for defining a total temporal domain of the plurality of presentation elements;
   defining a focus range of the time bar such that the focus range has a first local temporal limit and a second local temporal limit wherein the first local temporal limit is greater than or equal to the first global temporal limit and the second local temporal limit is less than or equal to the second global temporal limit, the focus range being a subset of the total temporal domain;
   defining a focus bar having a focus time scale having focus time indicators as subdivisions representing a unit of measure of the focus time scale and the focus bar being in a dynamically coupled relationship with the time bar by having the first and second local temporal limits of the time bar as the extents of the focus time scale, wherein the focus time scale is an expansion of the time scale by a unit distance on the user interface between the focus time indicators being greater than a unit distance on the user interface between the time indicators;
   displaying a subset of presentation elements selected from the plurality of presentation elements based on the respective temporal parameter of each of the subset of presentation elements being within the first and second local temporal limits;
   manipulating the focus range by displacement along the time bar between the first and second global limits to result in updating of the first and second local limits being the extents of the focus time scale, wherein the focus range remains constant during the displacement; wherein during the displacement the display of the subset of presentation elements is animated over time and geography by updating from the plurality of presentation elements based on the respective temporal parameter of each of the updated subset of presentation elements is within the updated first and second local temporal limits.

2. The method of claim 1 further comprising the step of generating a chart for positioning in relation to the focus bar, the chart having a plurality of entries corresponding to the subset of presentation elements selected from the plurality of presentation elements matching their temporal parameter to be within the focus range, wherein the entries are relatively positioned to one another in the chart in ordered relation to their respective temporal position in the focus time scale using spacing between the entries corresponding with that spacing of the focus time indicators of the focus time scale.

3. The method of claim 2, wherein the chart is positioned adjacent to the focus bar wherein the entries are lined up with their corresponding focus time indicators.

4. The method of claim 2, wherein the chart is a summary chart generated for a specified data element selected from the matching presentation elements.

5. The method of claim 4, wherein the summary chart is positioned in the visual representation in defined association to the chart.

6. The method of claim 2, wherein the chart includes a series of columns and rows.

7. The method of claim 2 further comprising the step of using an analysis operator in generating the chart wherein the plurality of entries also satisfy at least one analysis criterion of the analysis operator.

8. The method of 7, wherein the analysis operator is selected from analysis means selected from the group comprising: meeting finder; gap finder; speed finder; connection filtering; path between presentation elements; link analysis; and link between entities.

9. The method of claim 1 wherein the matching presentation elements have a spatial parameter matching a specified spatial search criterion.

10. A system for configuring the presentation of a plurality of presentation elements in a visual representation on a user interface, the plurality of presentation elements having both temporal and spatial parameters, the system comprising a memory device having stored instructions thereon for execution by a processor to:
   define a time bar with a time scale having time indicators as subdivisions representing a unit of measure of the time scale and having a first global temporal limit and a second temporal global limit of the time scale for defining a total temporal domain of the plurality of presentation elements define a focus range of the time bar having a first local temporal limit and a second local temporal limit wherein the first local temporal limit is greater than or equal to the first global temporal limit and the second local temporal limit is less than or equal to the second global temporal limit, the focus range being a subset of the total temporal domain;
   define a focus bar having a focus time scale having focus time indicators as subdivisions representing a unit of measure of the focus time scale and the focus bar being in a dynamically coupled relationship with the time bar by having the first and second local temporal limits of the time bar as the extents of the focus time scale, wherein the focus time scale is an expansion of the time scale by a unit distance on the user interface between the focus time indicators being greater than a unit distance on the user interface between the time indicators;
   display a subset of presentation elements selected from the plurality of presentation elements based on the respective temporal parameter of each of the subset of presentation elements being within the first and second local temporal limits;
   manipulate the focus range by displacement along the time bar between the first and second global limits to result in updating of the first and second local limits being the extents of the focus time scale, wherein the focus range remains constant during the displacement; wherein during the displacement the display of the subset of presentation elements is animated over time and geography by updating from the plurality of presentation elements based on the respective temporal parameter of each of the updated subset of presentation elements is within the updated first and second local temporal limits.

11. The system of claim 10 further comprising generate a chart for positioning in relation to the focus bar, the chart having a plurality of entries corresponding to the subset of presentation elements selected from the plurality of presentation elements matching their temporal parameter to be within the focus range, wherein the entries are relatively positioned to one another in the chart in ordered relation to their respective temporal position in the focus time scale using spacing between the entries corresponding with that spacing of the focus time indicators of the focus time scale.

12. The system of claim 11, wherein the chart is for positioning adjacent to the focus bar wherein the entries are lined up with their corresponding focus time indicators.

13. The system of claim 11, wherein the chart is a summary chart generated for a specified data element selected from the matching presentation elements.

14. The system of claim 13, wherein the summary chary is for positioning in the visual representation in defined association to the chart.

15. The system of claim 11, wherein the chart includes a series of columns and rows.

16. The system of claim 10 wherein the matching presentation elements have a spatial parameter matching a specified spatial search criterion.

17. The system of claim 10 further comprising generate the chart wherein the plurality of entries also satisfy at least one analysis criterion of the analysis operator.

18. The system of claim 17, wherein an analysis operator used in said generate the chart is selected from the group comprising: meeting finder; gap finder; speed finder; connection filtering; path between presentation elements; link analysis; and link between entities.

* * * * *

UNITED STATES PATENT AND TRADEMARK OFFICE
CERTIFICATE OF CORRECTION

| | | |
|---|---|---|
| PATENT NO. | : 8,966,398 B2 | Page 1 of 1 |
| APPLICATION NO. | : 12/629774 | |
| DATED | : February 24, 2015 | |
| INVENTOR(S) | : William Wright et al. | |

It is certified that error appears in the above-identified patent and that said Letters Patent is hereby corrected as shown below:

Title page, insert the following Foreign Priority Data:
--(30)   December 2, 2008   (CA)........................2,646,117--.

Signed and Sealed this
Eighteenth Day of August, 2015

Michelle K. Lee
*Director of the United States Patent and Trademark Office*